(12) United States Patent
Yan

(10) Patent No.: US 9,169,958 B2
(45) Date of Patent: Oct. 27, 2015

(54) SUPPORT APPARATUS, MECHANISMS AND METHODS FOR OPERATING THE SAME

(71) Applicant: Leapers, Inc., Livonia, MI (US)

(72) Inventor: Yuedong Yan, Northville, MI (US)

(73) Assignee: Leapers, Inc., Livonia, MI (US)

( * ) Notice: Subject to any disclaimer, the term of this patent is extended or adjusted under 35 U.S.C. 154(b) by 189 days.

(21) Appl. No.: 13/689,411

(22) Filed: Nov. 29, 2012

(65) Prior Publication Data

US 2013/0134286 A1    May 30, 2013

Related U.S. Application Data

(60) Provisional application No. 61/564,667, filed on Nov. 29, 2011.

(51) Int. Cl.
| | |
|---|---|
| *F41A 31/00* | (2006.01) |
| *F16M 11/00* | (2006.01) |
| *F41A 23/10* | (2006.01) |
| *F16M 11/04* | (2006.01) |
| *F16M 11/24* | (2006.01) |
| *F16M 11/38* | (2006.01) |
| *F41A 23/08* | (2006.01) |

(52) U.S. Cl.
CPC ............ *F16M 11/00* (2013.01); *F16M 11/041* (2013.01); *F16M 11/242* (2013.01); *F16M 11/38* (2013.01); *F41A 23/08* (2013.01); *F41A 23/10* (2013.01); *Y10T 29/49826* (2015.01)

(58) Field of Classification Search
CPC ...... F41A 23/10; F41A 23/08; F16M 11/041; F16M 11/242; F16M 11/38
USPC .............. 248/544, 121, 127, 163.1, 431, 432, 248/165, 166, 434, 168, 440, 440.1; 42/94; 89/37.01, 37.04
See application file for complete search history.

(56) References Cited

U.S. PATENT DOCUMENTS

| | | | |
|---|---|---|---|
| 2,870,683 A | | 1/1959 | Wilson et al. |
| 3,870,263 A | * | 3/1975 | Hardiman ............... E01F 9/012 16/286 |

(Continued)

FOREIGN PATENT DOCUMENTS

DE         202006001450 U1    6/2007

OTHER PUBLICATIONS

International Search Report for Application No. PCT/US2012/067047 dated Apr. 3, 2013.

*Primary Examiner* — Todd M Epps
(74) *Attorney, Agent, or Firm* — Honigman Miller Schwartz and Cohn LLP

(57) ABSTRACT

An apparatus is disclosed. The apparatus includes a base member and at least one support member. The base member includes an outer side surface and at least one support-member-receiving channel formed in the outer side surface. The at least one support member is pivotably-coupled to the base member for selective arrangement relative the base member in one of a stowed orientation and a deployed orientation. The at least one support member includes a surface geometry dimension that corresponds to a spatial dimension of the at least one support-member-receiving channel such that: upon arrangement of the at least one support member in the stowed orientation, an outer surface of the at least one support member is aligned with the outer side surface of the base member, and upon arrangement of the at least one support member in the deployed orientation, the base member in combination with the at least one support member forms a pod. A method is also disclosed.

36 Claims, 40 Drawing Sheets

(56) References Cited

U.S. PATENT DOCUMENTS

| | | |
|---|---|---|
| 5,029,407 A | 7/1991 | Kirkpatrick |
| 6,487,807 B1 * | 12/2002 | Kopman .................. F41A 23/12 42/72 |
| 7,743,545 B1 * | 6/2010 | Moody .................. F41C 23/16 248/161 |
| 8,904,693 B1 * | 12/2014 | Beltz ................................. 42/94 |
| 2008/0052979 A1 * | 3/2008 | Lee et al. ........................ 42/94 |
| 2008/0134560 A1 | 6/2008 | Pierce et al. |
| 2009/0038200 A1 * | 2/2009 | Keng ................................ 42/94 |

\* cited by examiner

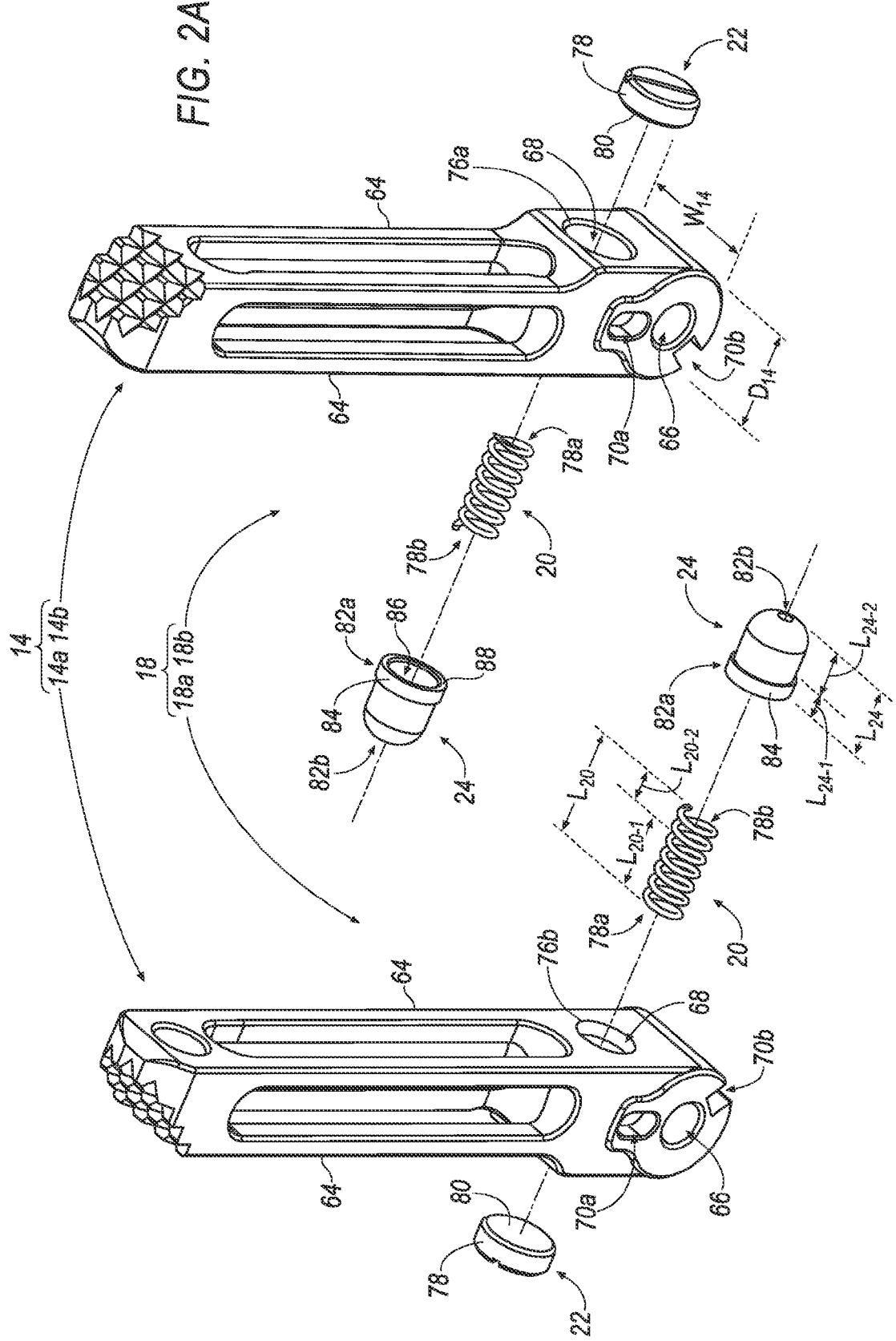

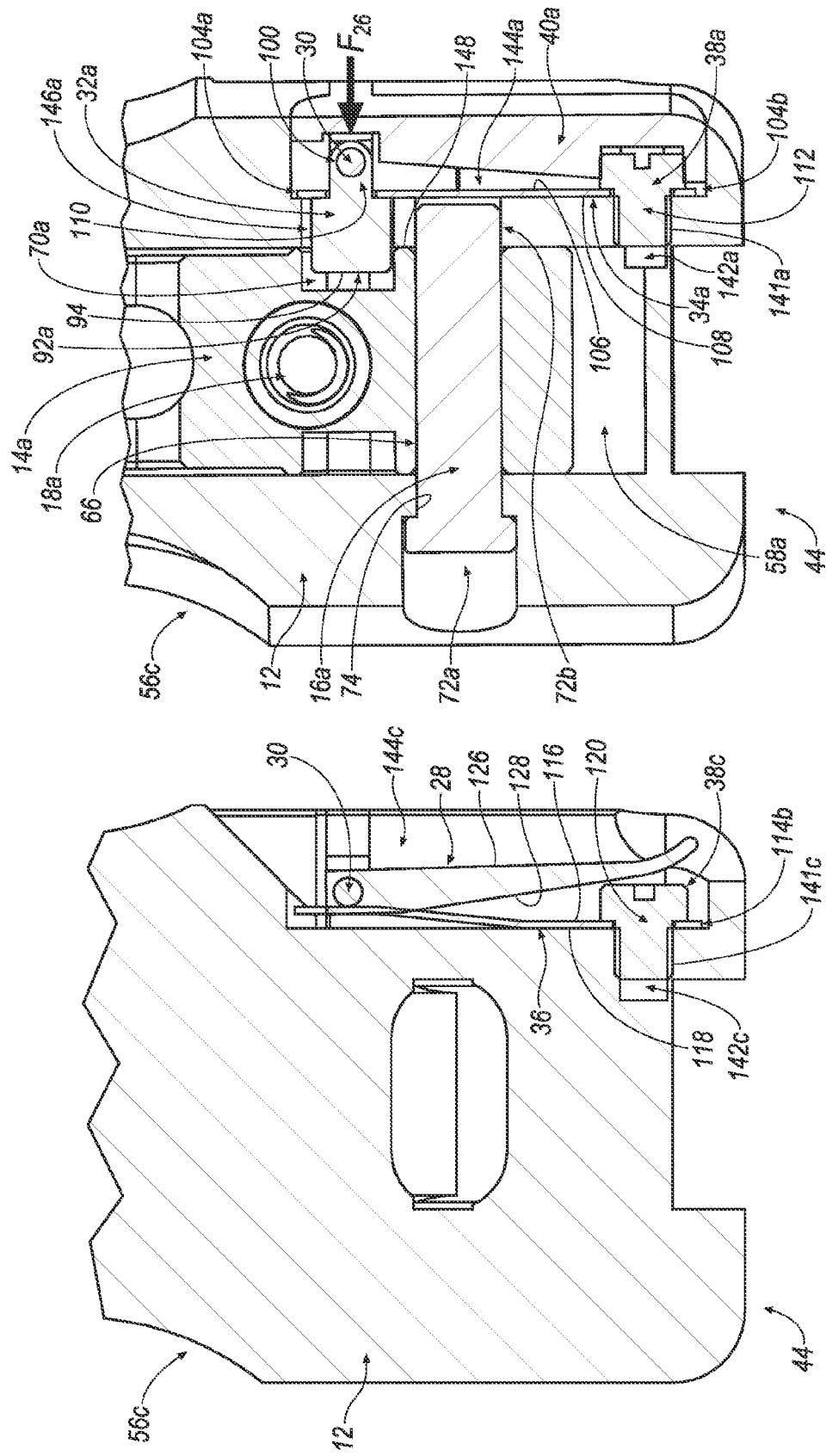

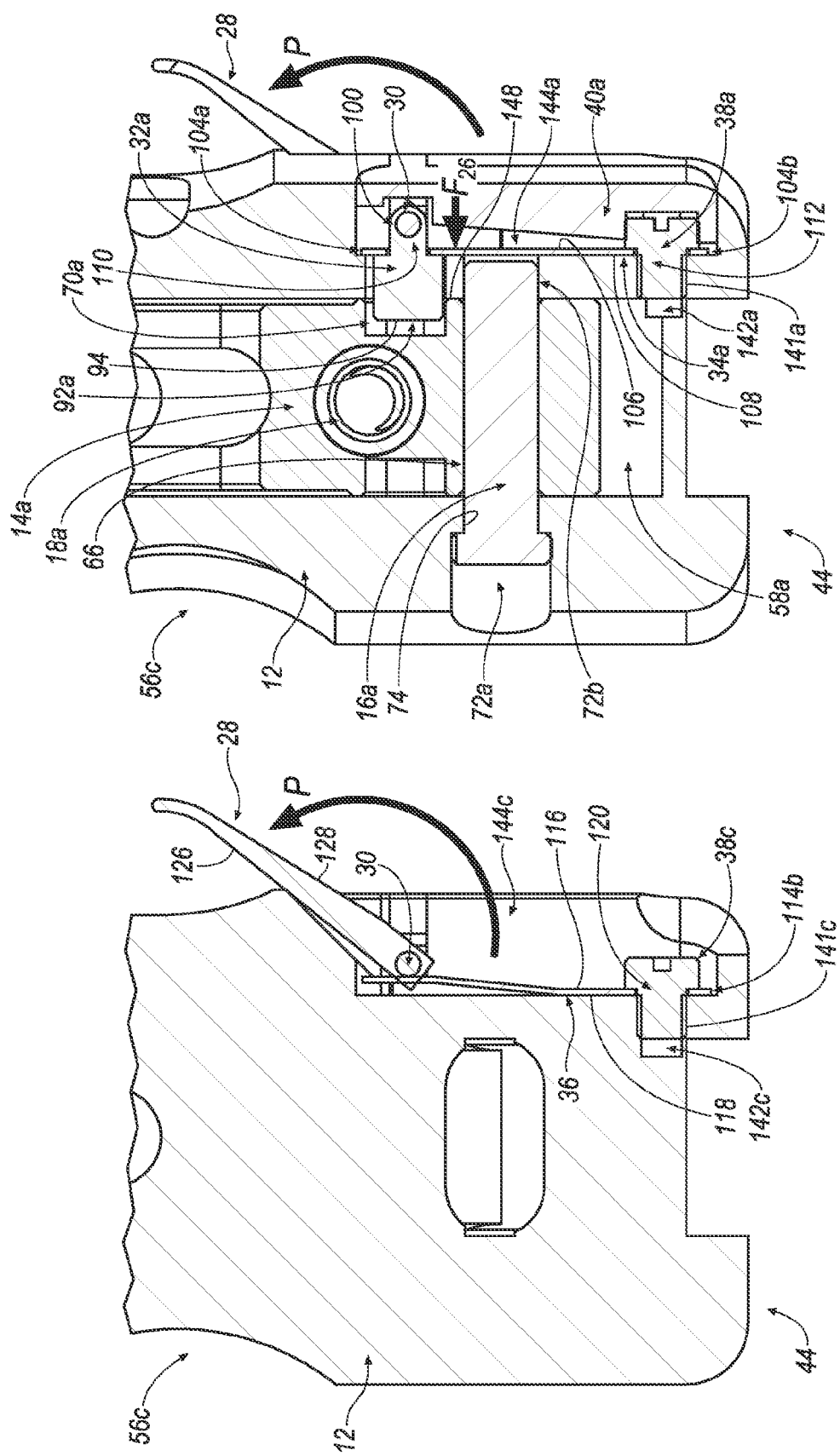

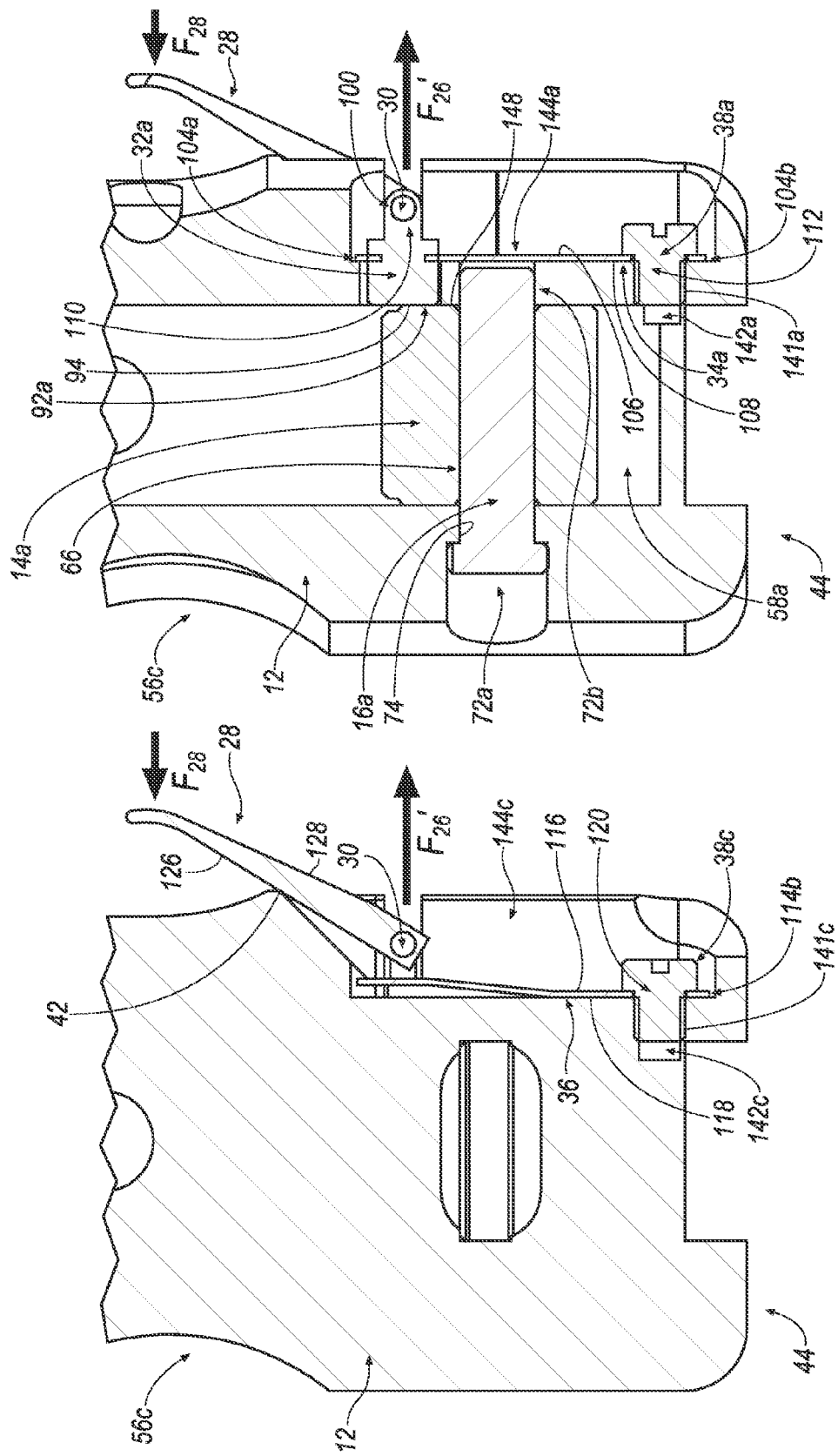

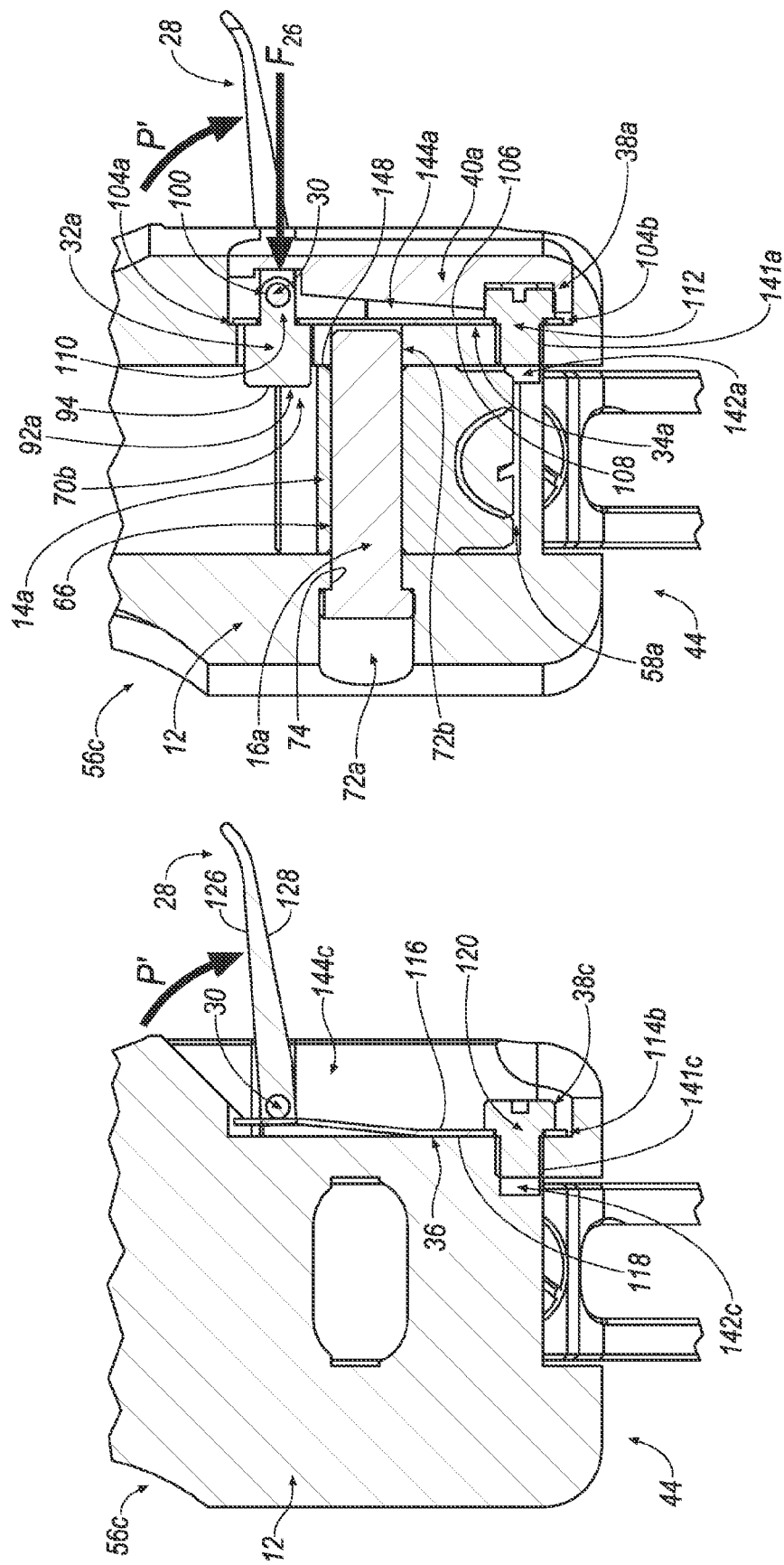

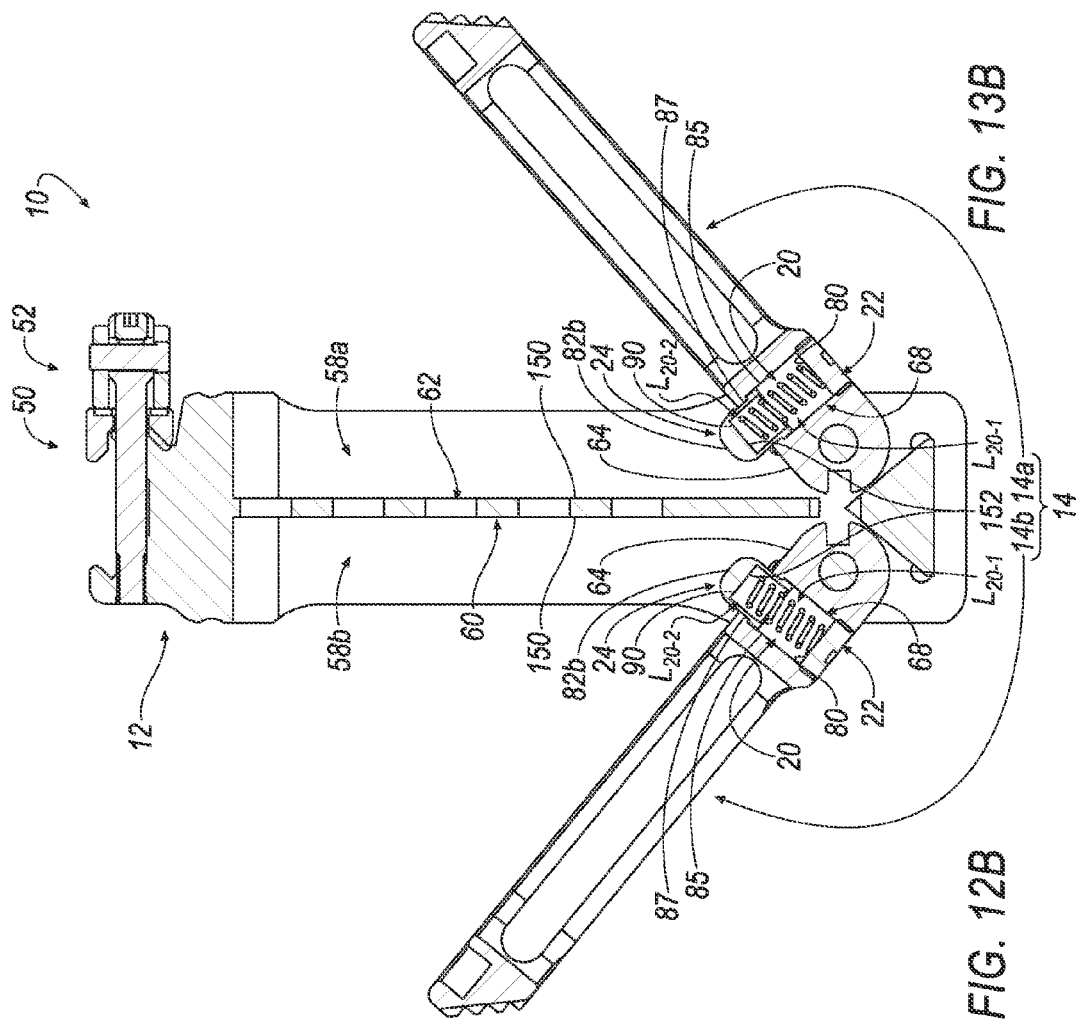
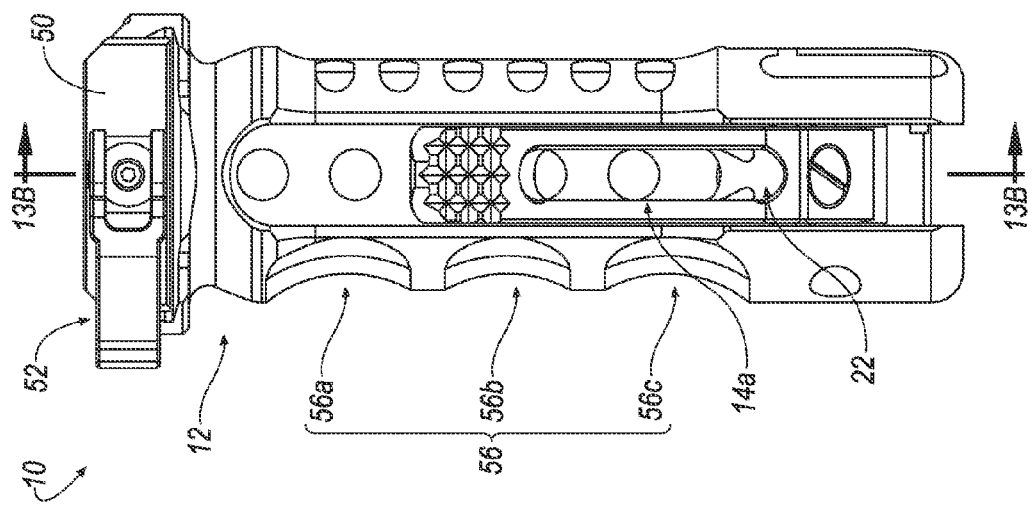

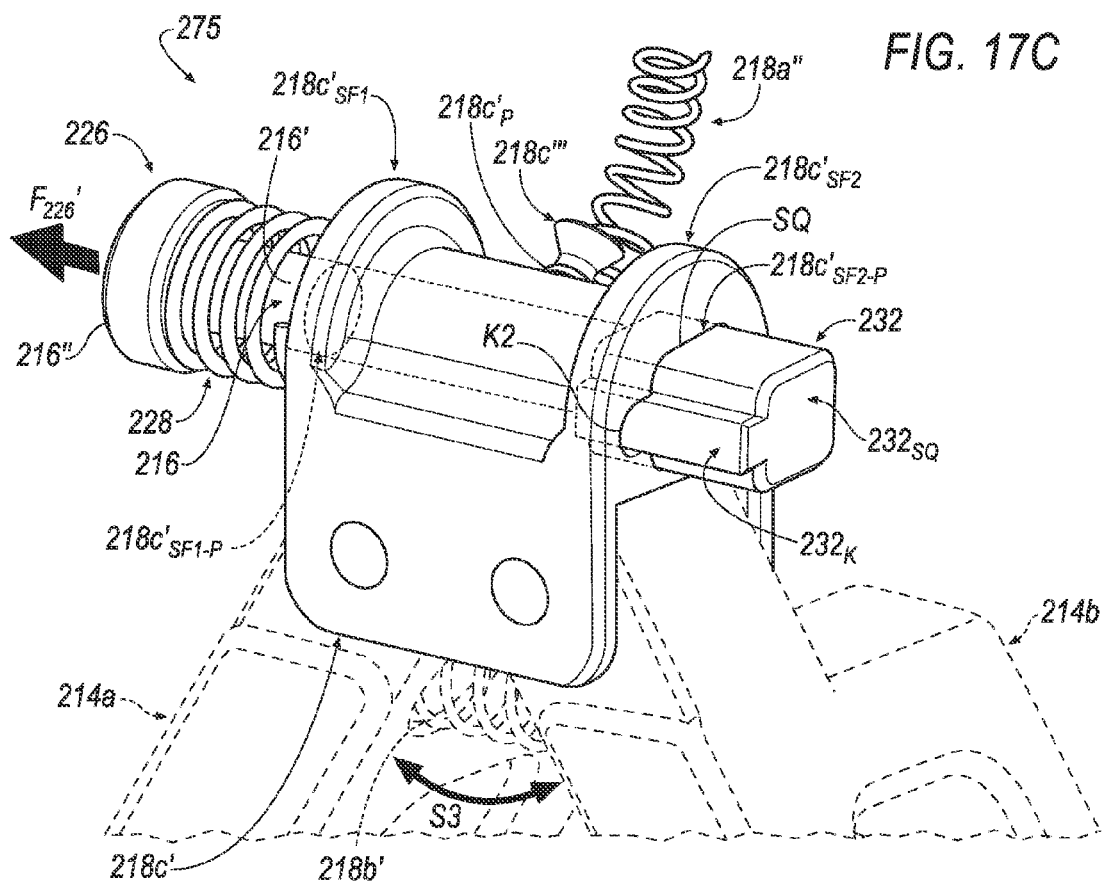
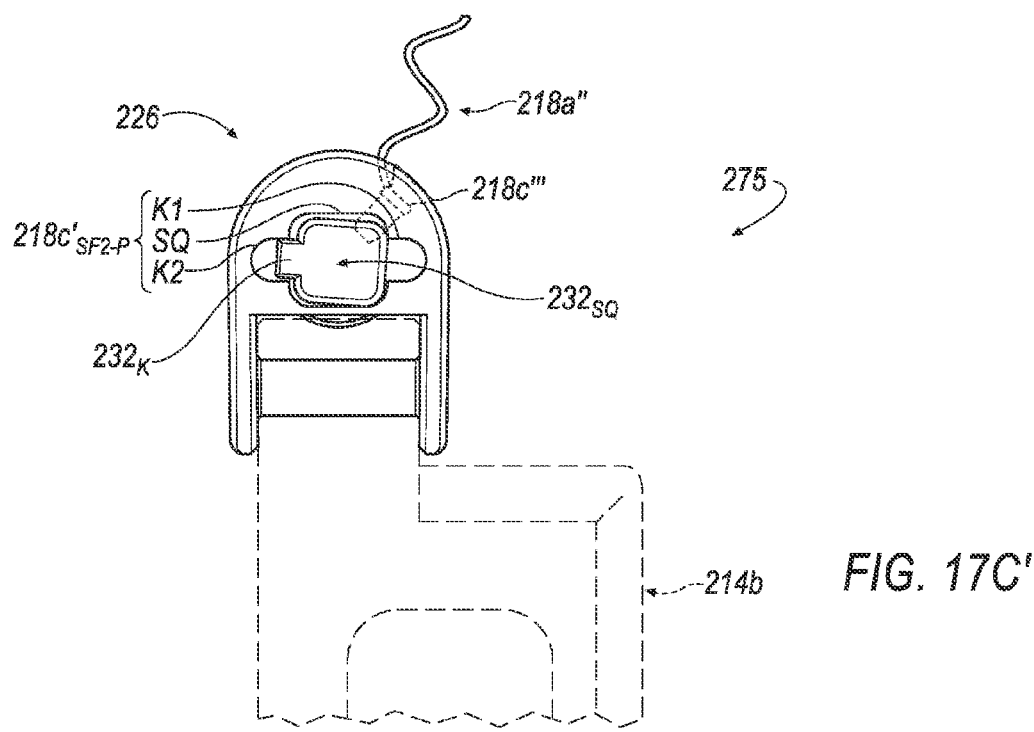
FIG. 17C
FIG. 17C'

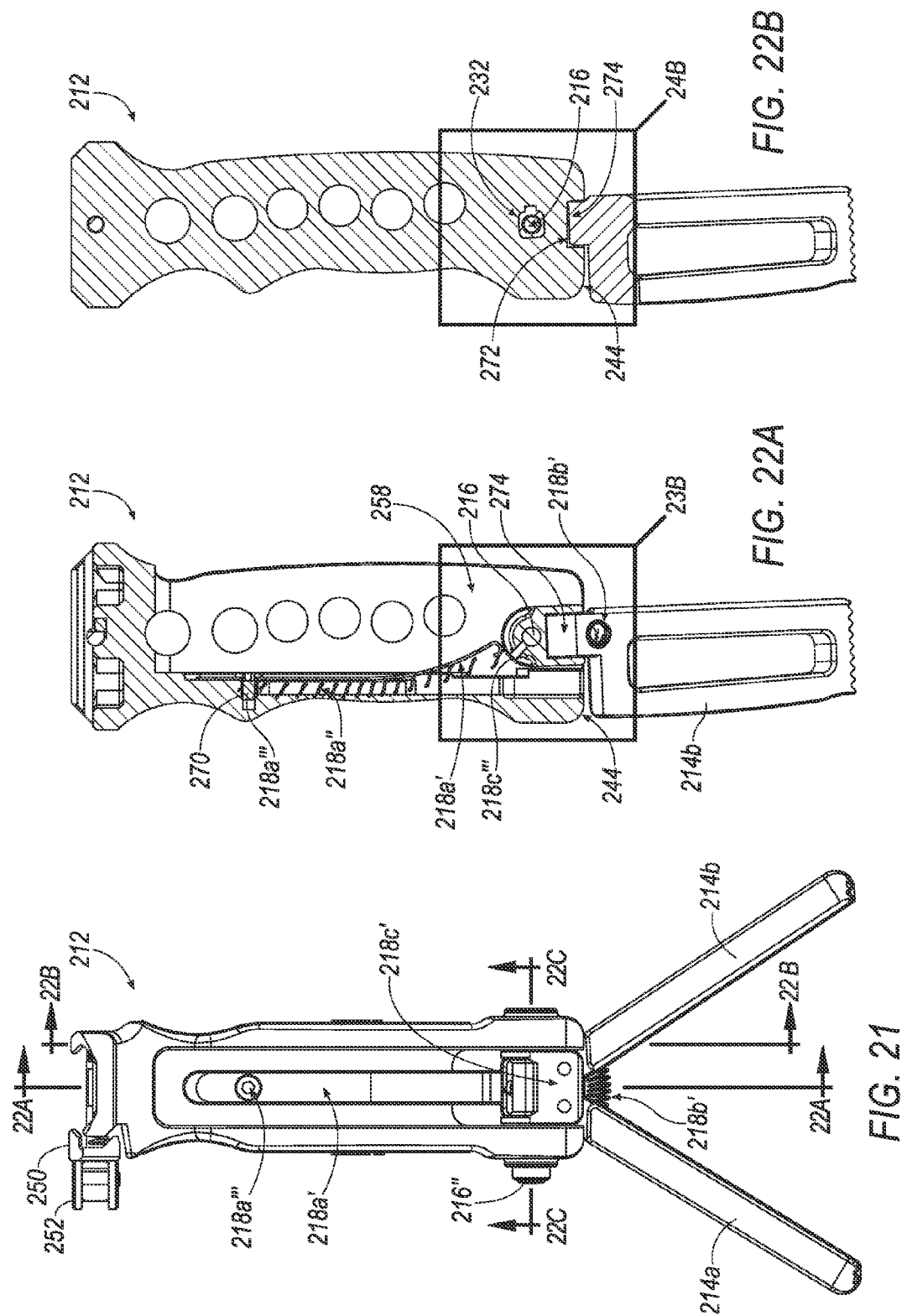

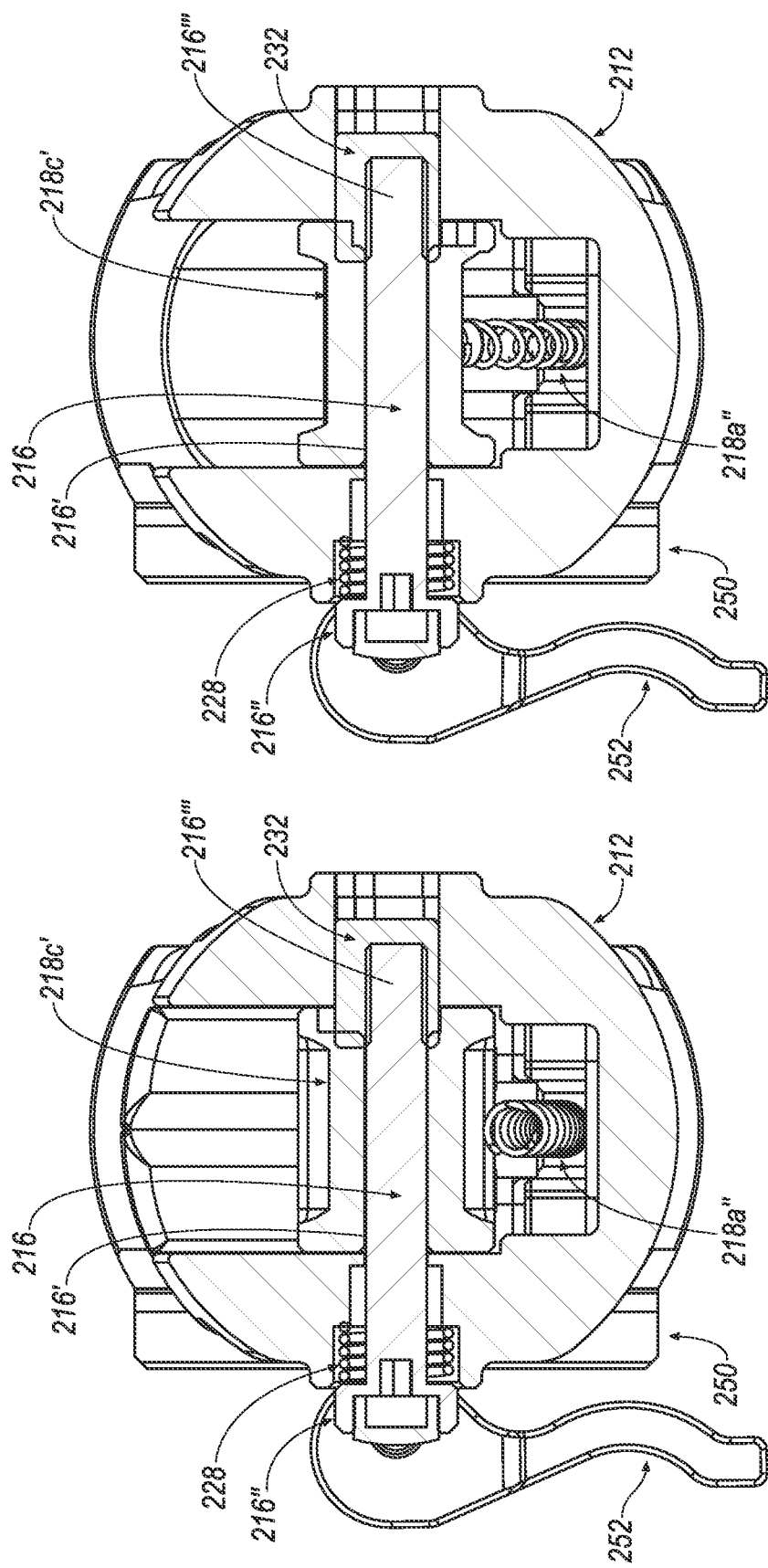

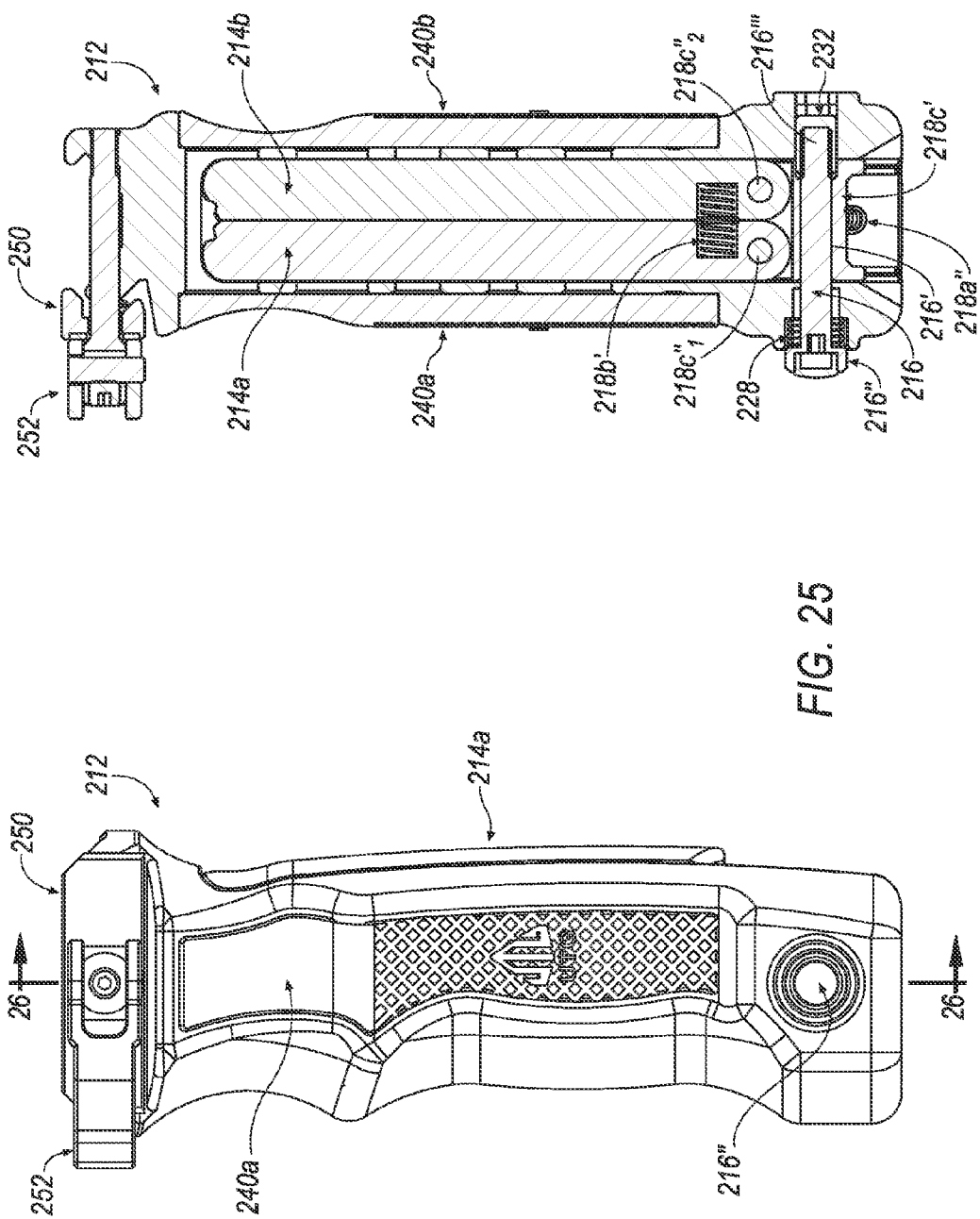

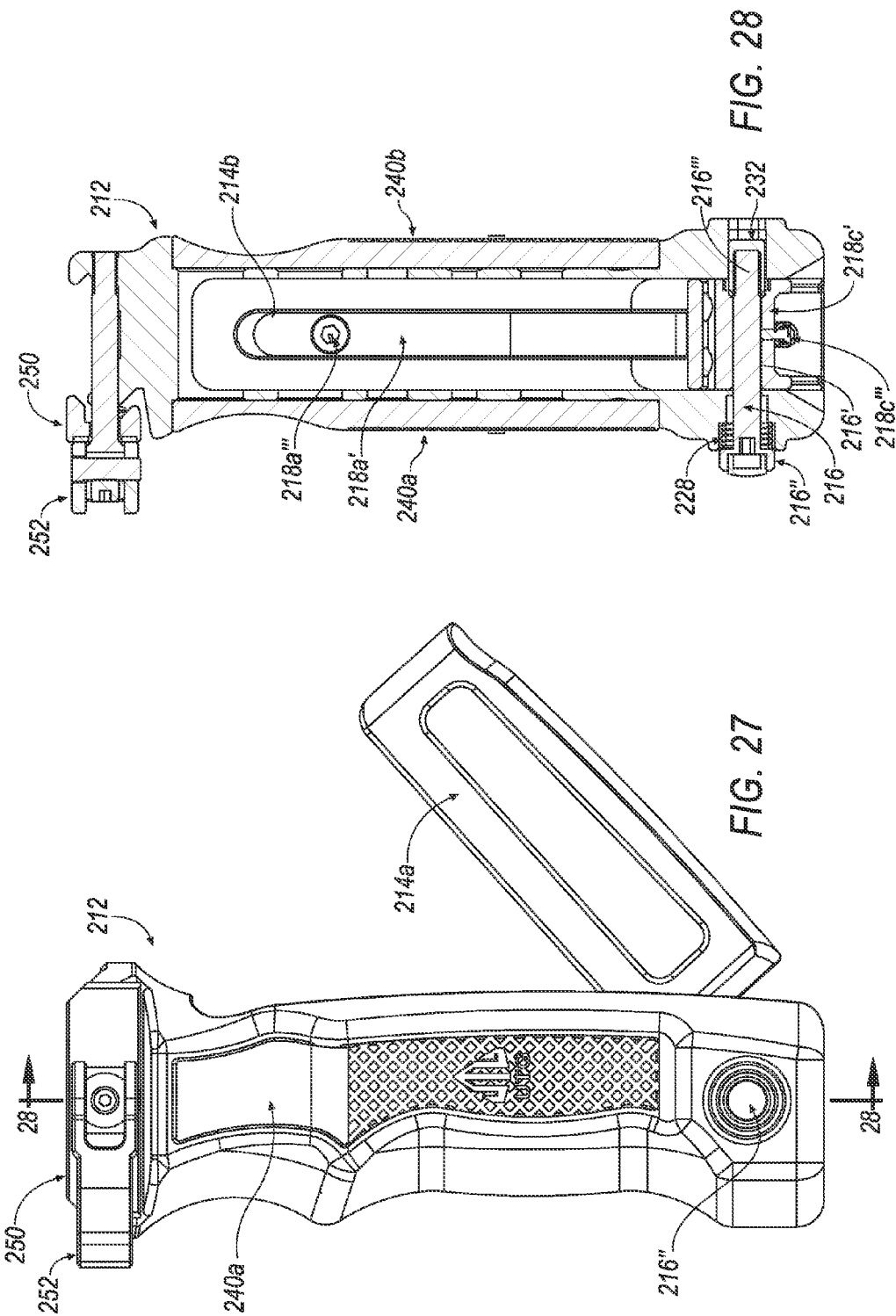

SUPPORT APPARATUS, MECHANISMS AND METHODS FOR OPERATING THE SAME

CROSS-REFERENCE TO RELATED APPLICATIONS

This U.S. Patent Application claims priority to U.S. Provisional Application 61/564,667 filed on Nov. 29, 2011, the disclosure of which is considered part of the disclosure of this application and is hereby incorporated by reference in its entirety.

TECHNICAL FIELD

The disclosure relates to a support apparatus, mechanisms and methods for operating the same.

BACKGROUND

Support apparatuses are known in the art. Improvements to support apparatuses are continuously being sought in order to advance the art.

DESCRIPTION OF THE DRAWINGS

The disclosure will now be described, by way of example, with reference to the accompanying drawings, in which:

FIG. 2A is an exploded view of a pair of exemplary sub-assemblies of the support apparatus of FIG. 1.

FIG. 10A is an enlarged view of FIG. 7A according to line 10A.

FIGS. 10B-10D are enlarged views of the support apparatus referenced from FIG. 10A as an orientation of the support apparatus is manipulated from the view of FIG. 5A to the view of FIG. 5C.

FIG. 11A is an enlarged view of FIG. 7B according to line 11A.

FIGS. 11B-11D are enlarged views of the support apparatus referenced from FIG. 11A as an orientation of the support apparatus is manipulated from the view of FIG. 5A to the view of FIG. 5C.

FIG. 12B is a side view of the support apparatus of FIG. 5B.

FIG. 13B is a cross-sectional view of the support apparatus of FIG. 12B according to line 13B-13B.

FIG. 17A' is a side view of FIG. 17A.

FIG. 17B' is a side view of FIG. 17B.

FIG. 17C is a portion of an enlarged view of a subassembly of the support apparatus of FIG. 15 arranged in the deployed orientation of FIG. 16C.

FIG. 17C' is a side view of FIG. 17C.

FIG. 20C is a cross-sectional view of the support apparatus according to line 20C-20C of FIG. 19.

FIG. 21 is a rear view of the support apparatus of FIG. 16C when arranged in the deployed orientation.

FIG. 22A is a cross-sectional view of the support apparatus according to line 22A-22A of FIG. 21.

FIG. 22B is a cross-sectional view of the support apparatus according to line 22B-22B of FIG. 21.

FIG. 22C is a cross-sectional view of the support apparatus according to line 22C-22C of FIG. 21.

FIG. 25 is a side view of the support apparatus of FIG. 16A when arranged in the stowed orientation.

FIG. 26 is a cross-sectional view of the support apparatus according to line 26-26 of FIG. 25.

FIG. 27 is a side view of the support apparatus of FIG. 16B when arranged in the intermediate orientation.

FIG. 28 is a cross-sectional view of the support apparatus according to line 28-28 of FIG. 27.

DETAILED DESCRIPTION

The figures illustrate an exemplary implementation of a support apparatus, mechanisms and methods for operating the same. Based on the foregoing, it is to be generally understood that the nomenclature used herein is simply for convenience and the terms used to describe the invention should be given the broadest meaning by one of ordinary skill in the art.

Figure 1:
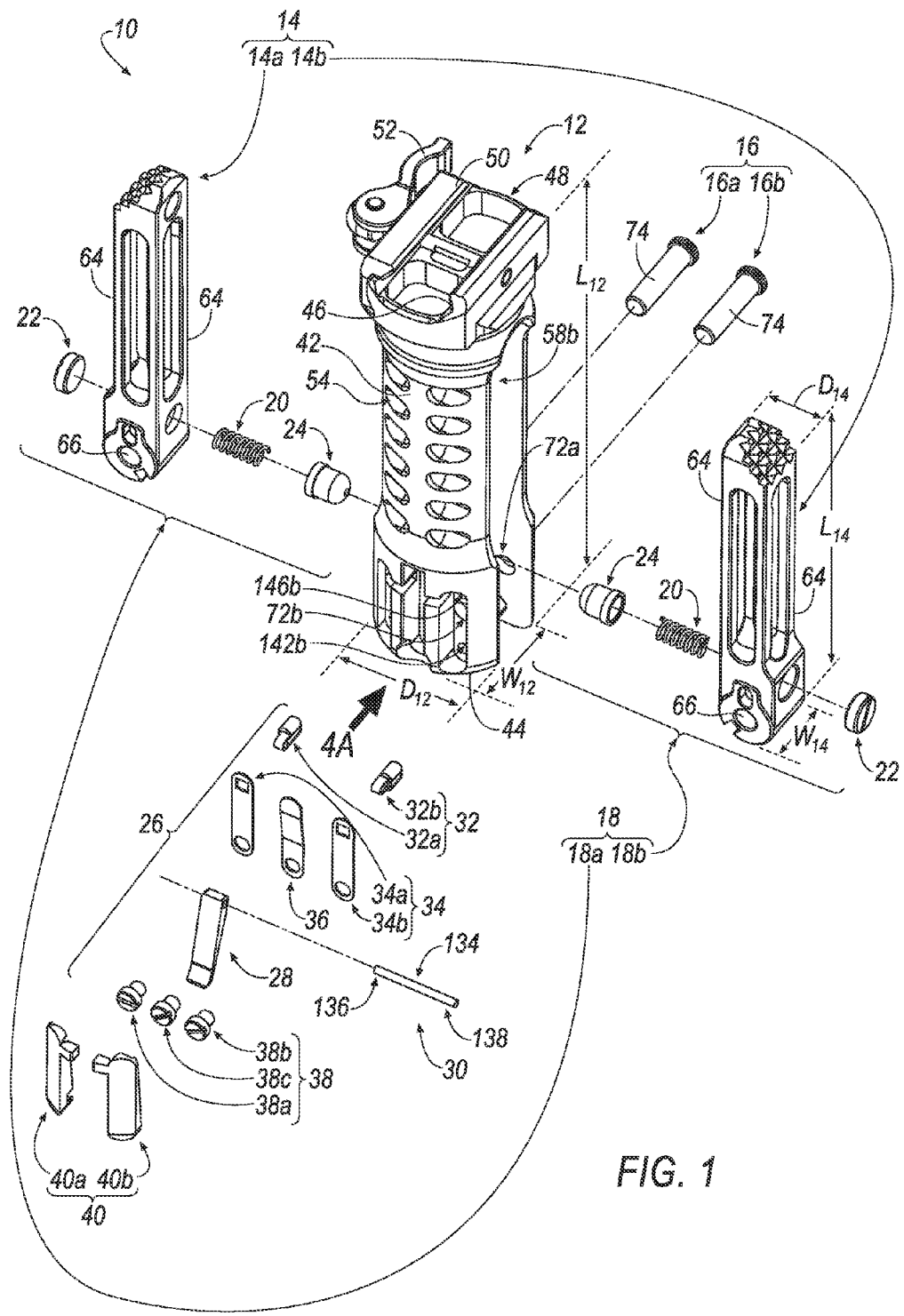
FIG. 1 is an exploded, perspective view of an exemplary support apparatus.

FIG. 1 illustrates an exemplary support apparatus shown generally at 10. The support apparatus 10 may be broadly and/or alternatively referred to as a "pod." In an implementation, the pod 10 may include one or more support members (see, e.g., 14); accordingly, if, for example, the pod 10 includes one support member, the pod may be alternatively referred to as a "mono pod." Alternatively, if, for example, the pod 10 includes two support members, the pod may be alternatively referred to as a "bi pod." Alternatively, if, for example, the pod 10 includes three support members, the pod may be alternatively referred to as a "tri pod." Accordingly, although the illustrated embodiment includes two support members, it will be understood that various modifications (e.g., the number of included support members) may be made to the design of the pod 10 without departing from the spirit and scope of a claimed embodiment of the disclosure.

Figure 14A:
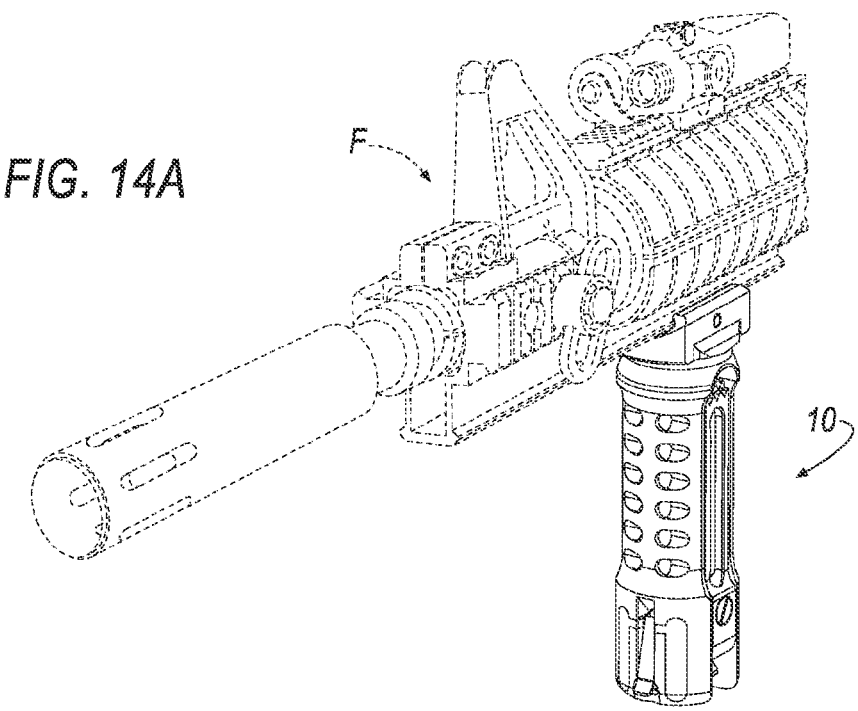
FIG. 14A is a view of the support apparatus of FIG. 5A attached to a component.
Figure 14B:
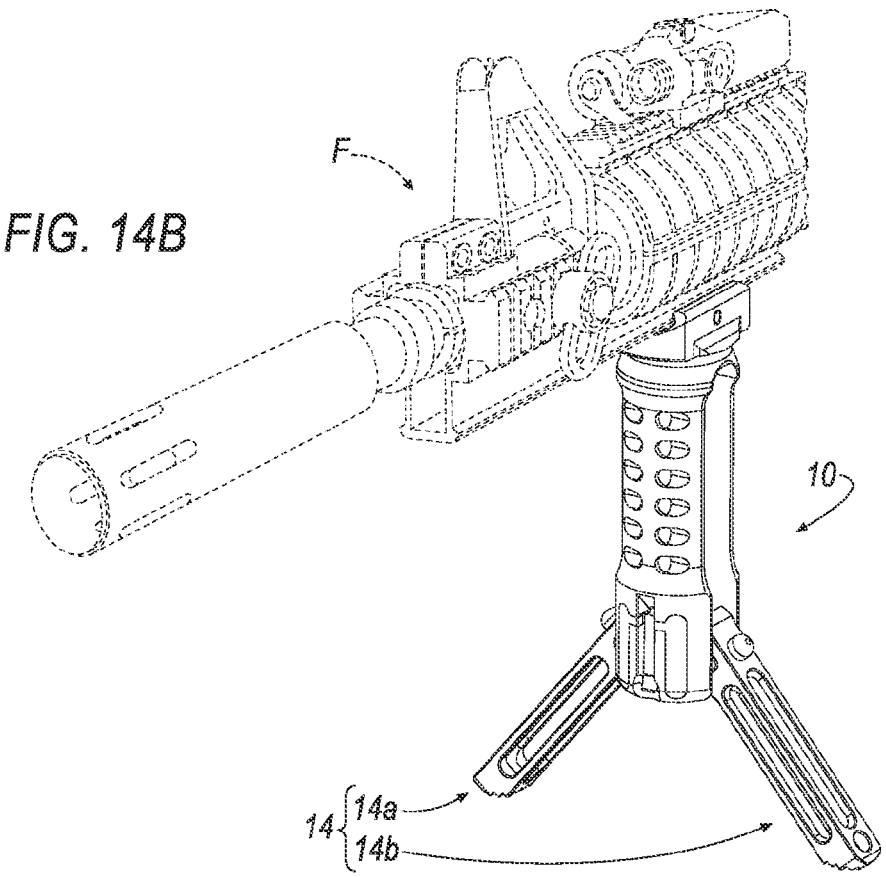
FIG. 14B is a view of the support apparatus of FIG. 5C attached to a component.

Referring to FIGS. 14A-14B, the support apparatus 10 may be attached to any desirable component, F. An exemplary component, F, may include, for example, a firearm. However, it will be appreciated that the support apparatus 10 is not limited to being attached to a firearm, F. Accordingly, although a firearm, F, is illustrated at FIGS. 14A-14B, the firearm, F, may be replaced by any other component, such as, for example, a camera, telescope, or the like. Accordingly, in some implementations, it will be appreciated that the support apparatus 10 may be attached to and support any desirable non-firearm-component.

The support apparatus 10 may be designed to include any desirable geometry. For example, as seen in FIG. 1, the support apparatus 10 may be designed to have a length, $L_{12}$, equal to approximately about five-and-a-half inches. Further, for example, the support apparatus 10 may be designed to have a diameter, $D_{12}$, equal to approximately about one-and-a-half inches. Further, for example, the at least one support member 14 may be designed to have a length, $L_{14}$, equal to approximately about three-and-three-quarter inches.

In view of the above-described exemplary geometric configuration, the diameter, $D_{12}$, may permit a user to grasp the support apparatus 10 in his/her hand; accordingly, if attached to, for example, a component, F, as described above, the support apparatus 10 may be alternatively referred to as a "grip." Further, if the grip is attached to a component, F, in a forward orientation (e.g., relative to, for example, a trigger of a firearm, F), the grip may be alternatively referred to as a "fore grip." Yet even further, depending on the stowed/deployed orientation of the at least one support member 14, the support apparatus 10 may be said to include a multi-purpose function as one or more of a: "grip" alone, or a "pod-and-grip," which may be alternatively referred to as a "pod grip."

Although the support apparatus 10 may be designed to have a length, $L_{12}$, equal to approximately about five-and-a-half inches, and, the at least one support member 14 may be designed to have a length, $L_{14}$, equal to approximately about three-and-three-quarter inches to define, in an embodiment, a "pod grip," the support apparatus 10 and the at least one support member 14 are not limited to including the above-described geometric configuration. For example, each of the lengths, $L_{12}$, $L_{14}$, may include geometries equal to approximately about one or more "feet" (i.e., a "foot" of which being equal to twelve inches and "feet" meaning more than one "foot") rather than being equal to approximately about several inches as described above.

Accordingly, depending on the geometric configuration of the support apparatus 10, a user may position himself/herself in any number of shooting positions (e.g., a laying down position, a kneeling position, a seated position, a standing position) relative to the support apparatus 10 and component, F. For example, if the support apparatus 10 is designed with dimensions that are approximately equal to several inches as described above, in a first exemplary implementation, the user may utilize the support apparatus 10 and component, F, in a chest-down (i.e., the user's chest being arranged adjacent a support surface or ground), prone orientation. Alternatively, in another exemplary implementation, if the support apparatus 10 is designed with dimensions that are approximately equal to one or more feet, the user may utilize the support apparatus 10 and component, F, in a non-prone, kneeling orientation relative to a support surface or ground. Alternatively, in another exemplary implementation, if the support apparatus 10 is designed with dimensions that are approximately equal to one or more feet, the user may utilize the support apparatus 10 and component, F, in a seated orientation relative to a support surface or ground. Alternatively, in another exemplary implementation, if the support apparatus 10 is designed with dimensions that are approximately equal to one or more feet, the user may utilize the support apparatus 10 and component, F, in a standing orientation relative to a support surface or ground.

Figure 5A:
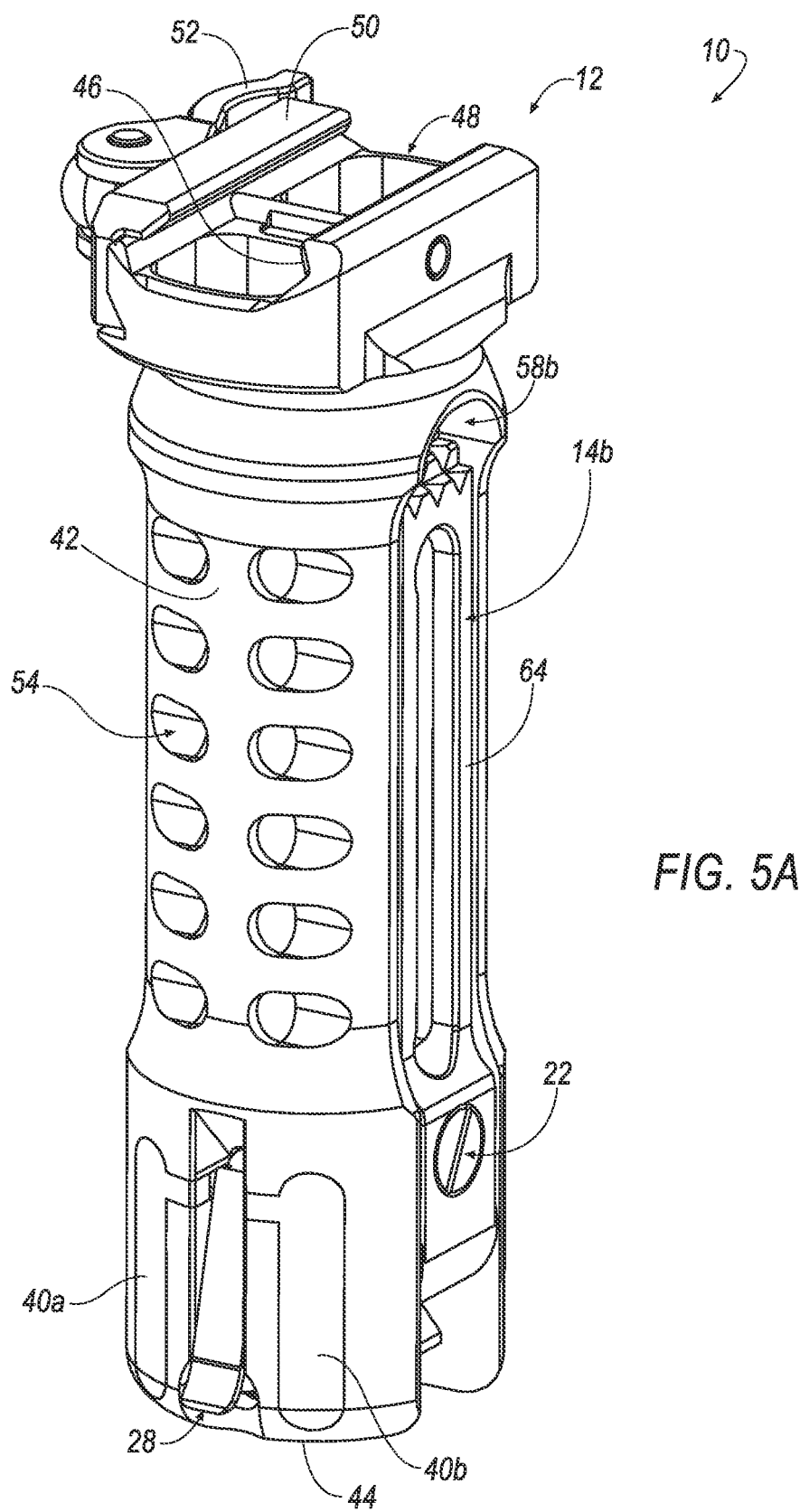
FIG. 5A is an assembled, perspective view of the support apparatus of FIG. 1 arranged in a stowed orientation.
Figure 5B:
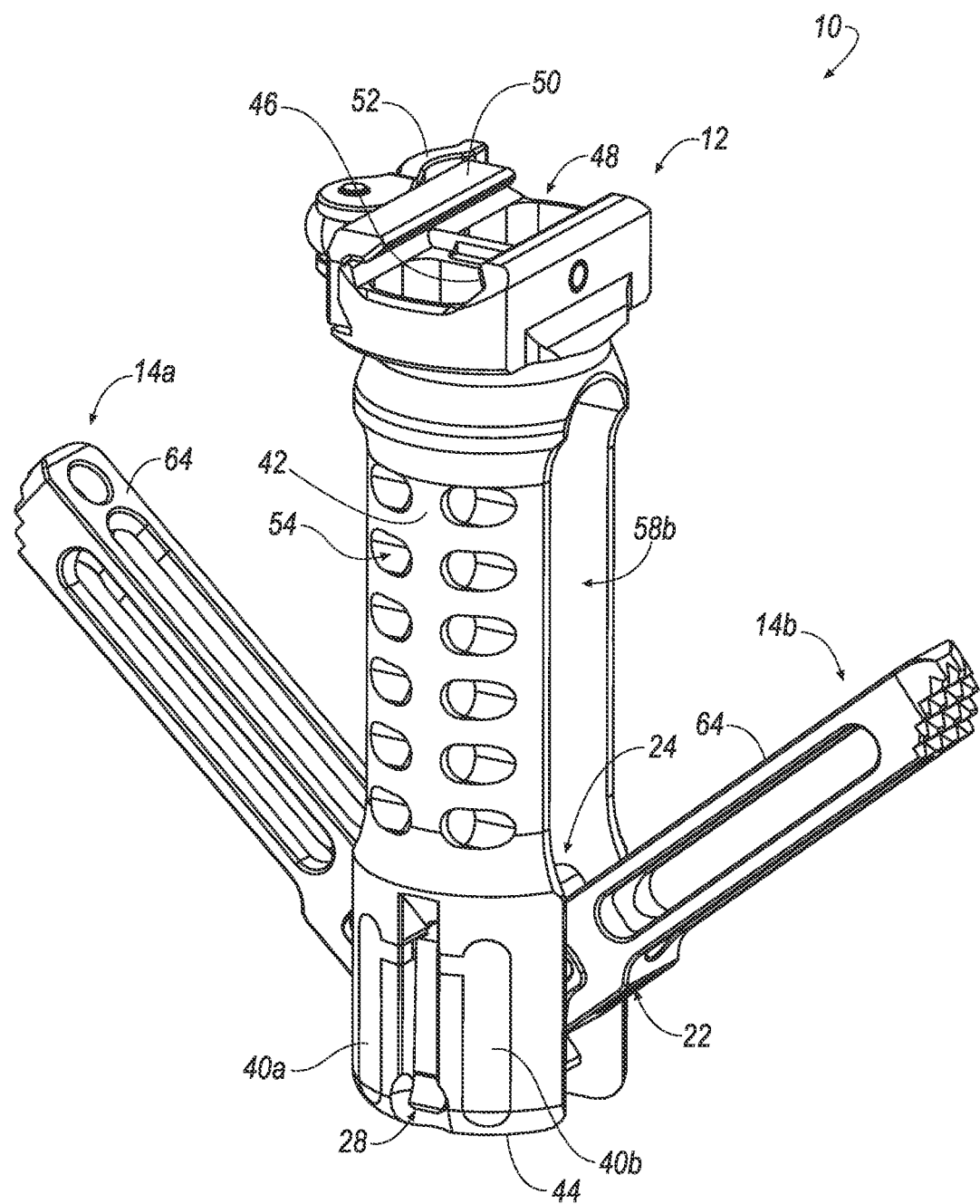
FIG. 5B is an assembled, perspective view of the support apparatus of FIG. 1 arranged in an intermediate orientation.
Figure 5C:
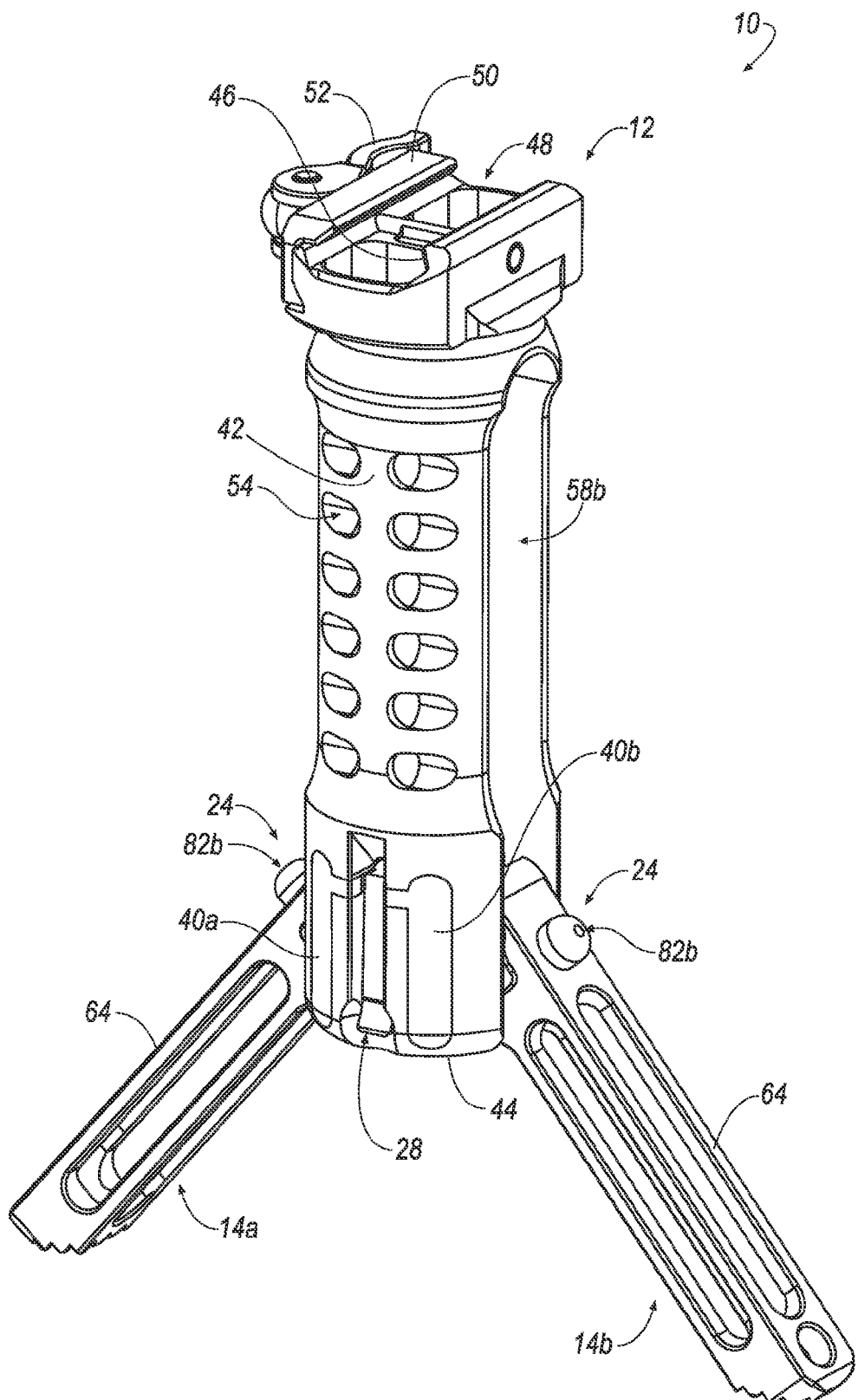
FIG. 5C is an assembled, perspective view of the support apparatus of FIG. 1 arranged in a deployed orientation.

As seen in FIG. 1, the support apparatus 10 includes a plurality of interconnected components 12-40; accordingly, the support apparatus 10 may be alternatively referred to as a "support apparatus assembly." The interconnected components 12-40 that collectively form the support apparatus assembly 10 may include at least, for example: a base member 12 and at least one support member 14. The support apparatus 10 may further include at least one pin 16 that pivotably-couples the at least one support member 14 to the base member 12 in order to permit the at least one support member 14 to be arranged in a movable orientation to/from, for example, a "stowed orientation" (see, e.g., FIG. 5A) and a "deployed orientation" (see, e.g., FIG. 5C). Further, the at least one pin 16 permits the at least one support member 14 to be pivoted relative to the base member 12 in order to be arranged in any one of a plurality of "intermediate orientations" (see, e.g., FIG. 5B) such that the at least one support member 14 is said to be not arranged in either of the "stowed orientation" and the "deployed orientation." Although the at least one pin 16 is described to pivotably-couple the at least one support member 14 to the base member 12, the at least one pin 16 is not required in an assembly; for example, the at least one support member 14 and the base member 12 may include cooperating surface configurations that permits that the at least one support member 14 to be mechanically-coupled to the base member 12.

The base member 12 may be alternatively referred to as a "body". The base member 12 may include a length, $L_{12}$, a width, $W_{12}$, and a depth, $D_{12}$. In an embodiment, the base member 12 may include a substantially cylindrical geometry; accordingly, the base member 12 may be alternatively described to include a diameter, $D_{12}$ (i.e., rather than a width, $W_{12}$, and a depth, $D_{12}$).

The at least one support member 14 may be alternatively referred to as "at least one leg." The at least one support member 14a may include a length, $L_{14}$, a width, $W_{14}$, and a depth, $D_{14}$. The at least one support member 14 may include a pair of support members 14 comprising a first support member 14a (or a "left" support member per the view of FIG. 1) and a second support member 14b (or a "right" support member per the view of FIG. 1). The at least one pin 16 may include a pair of pins 16 comprising a first pin 16a (or a "left" pin per the view of FIG. 1) and a second pin 16b (or a "right" pin per the view of FIG. 1).

Figure 2B:
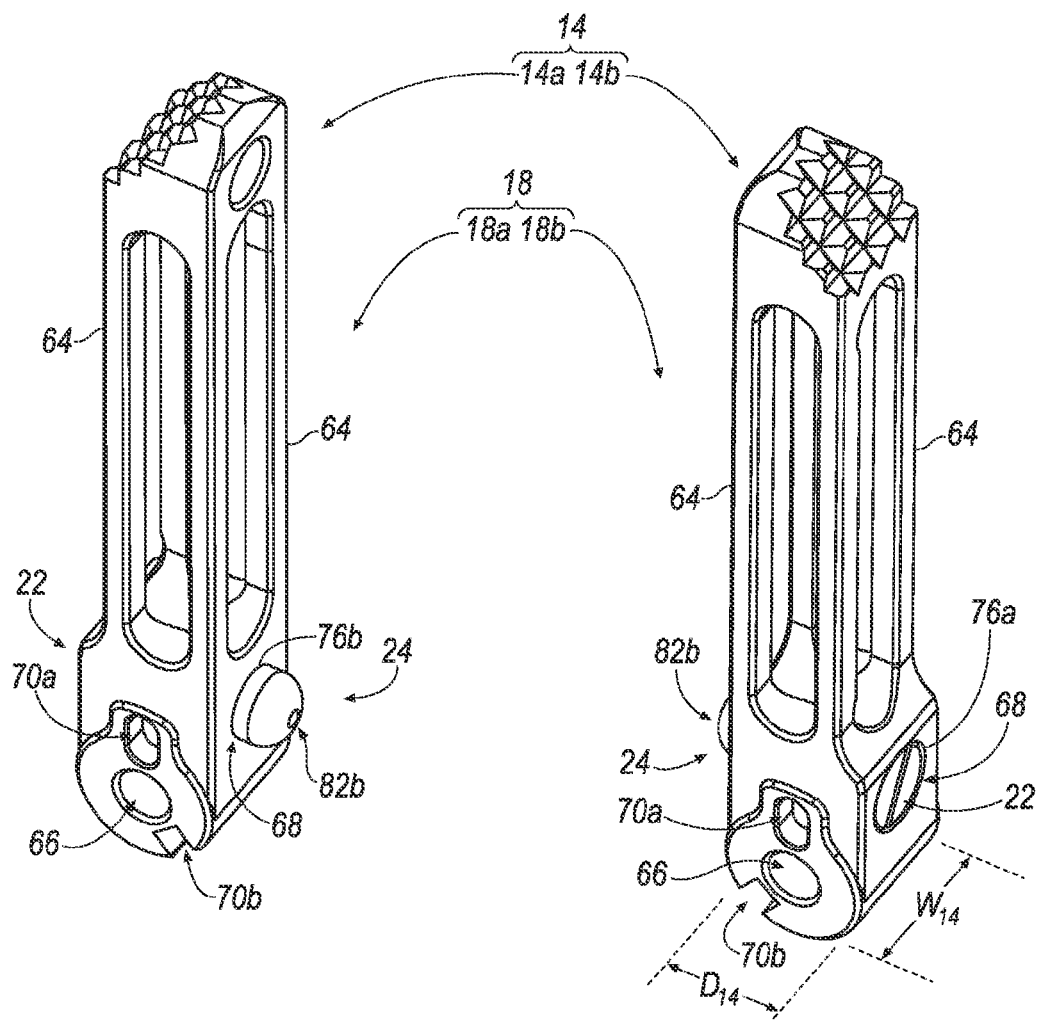
FIG. 2B is an assembled view of the pair of exemplary sub-assemblies of FIG. 2A.

Referring to FIGS. 1 and 2A-2B, the plurality of interconnected components 12-40 that collectively form the support apparatus assembly 10 may further include at least one support member deployment-assist mechanism 18. The at least one support member deployment-assist mechanism 18 includes a pair of support member deployment-assist mechanisms 18 comprising a first support member deployment-assist mechanism 18a (or a "left" support member deployment-assist mechanism per the view of FIG. 1) and a second support member deployment-assist mechanism 18b (or a "right" support member deployment-assist mechanism per the view of FIG. 1). As seen in FIG. 2B, the at least one support member deployment-assist mechanism 18 is connected to the at least one support member 14 and functions by urging the at least one support member 14 away from the base member 12 (see, e.g., FIGS. 5A and 5B) when changing the orientation of the support apparatus 10 from the stowed orientation (see, e.g., FIG. 5A) to the deployed orientation (see, e.g., FIG. 5C). In an embodiment, the at least one support member deployment-assist mechanism 18 may include a coil spring 20, a stop member 22 and a cap member 24.

Figure 3A:
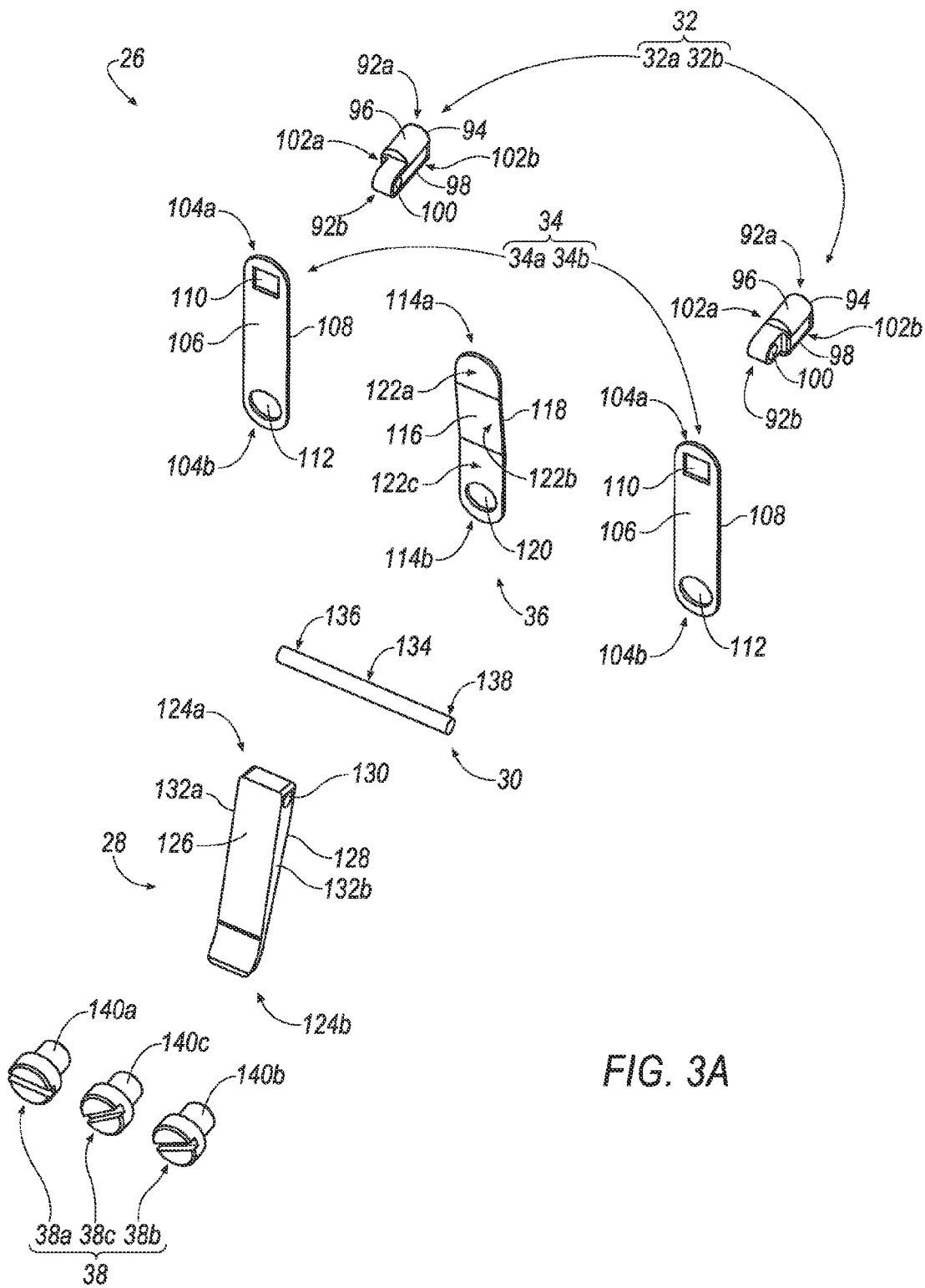
FIG. 3A is an exploded view of an exemplary sub-assembly of the support apparatus of FIG. 1.
Figure 3B:
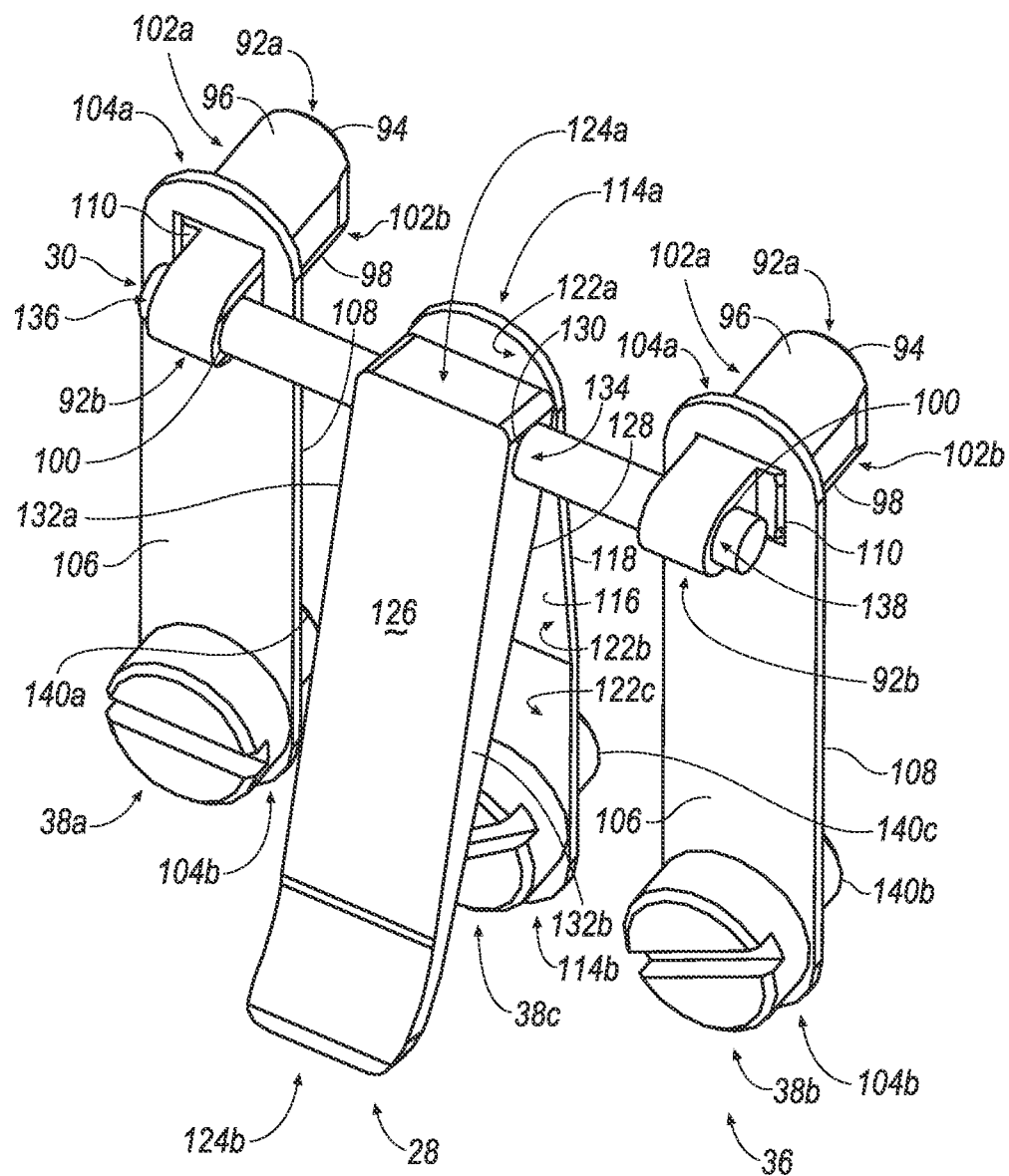
FIG. 3B is an assembled view of the exemplary sub-assembly of FIG. 3A.
Figure 4A:
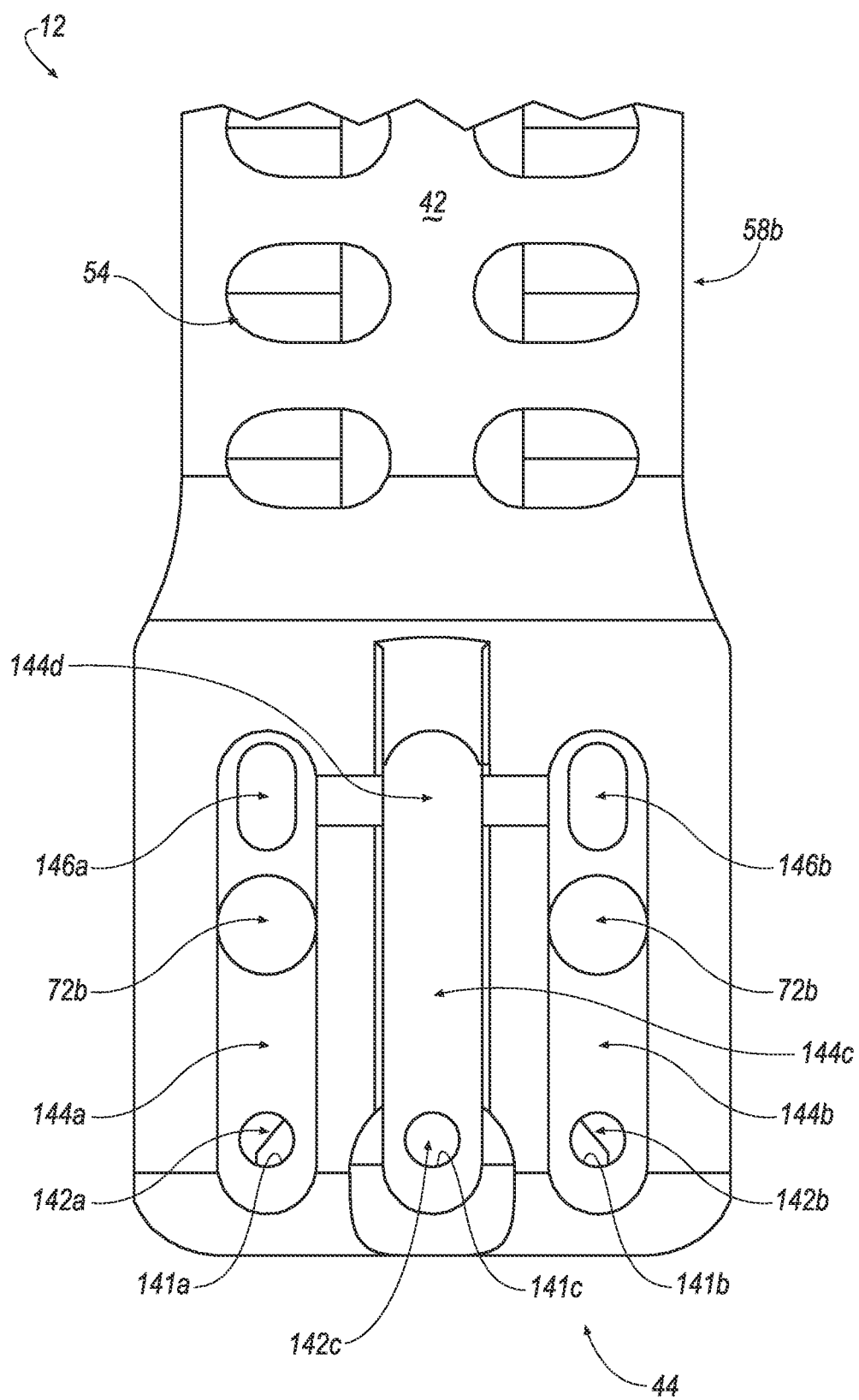
FIG. 4A is an enlarged, partial front view of a component of the support apparatus of FIG. 1 according to line 4A.
Figure 4B:
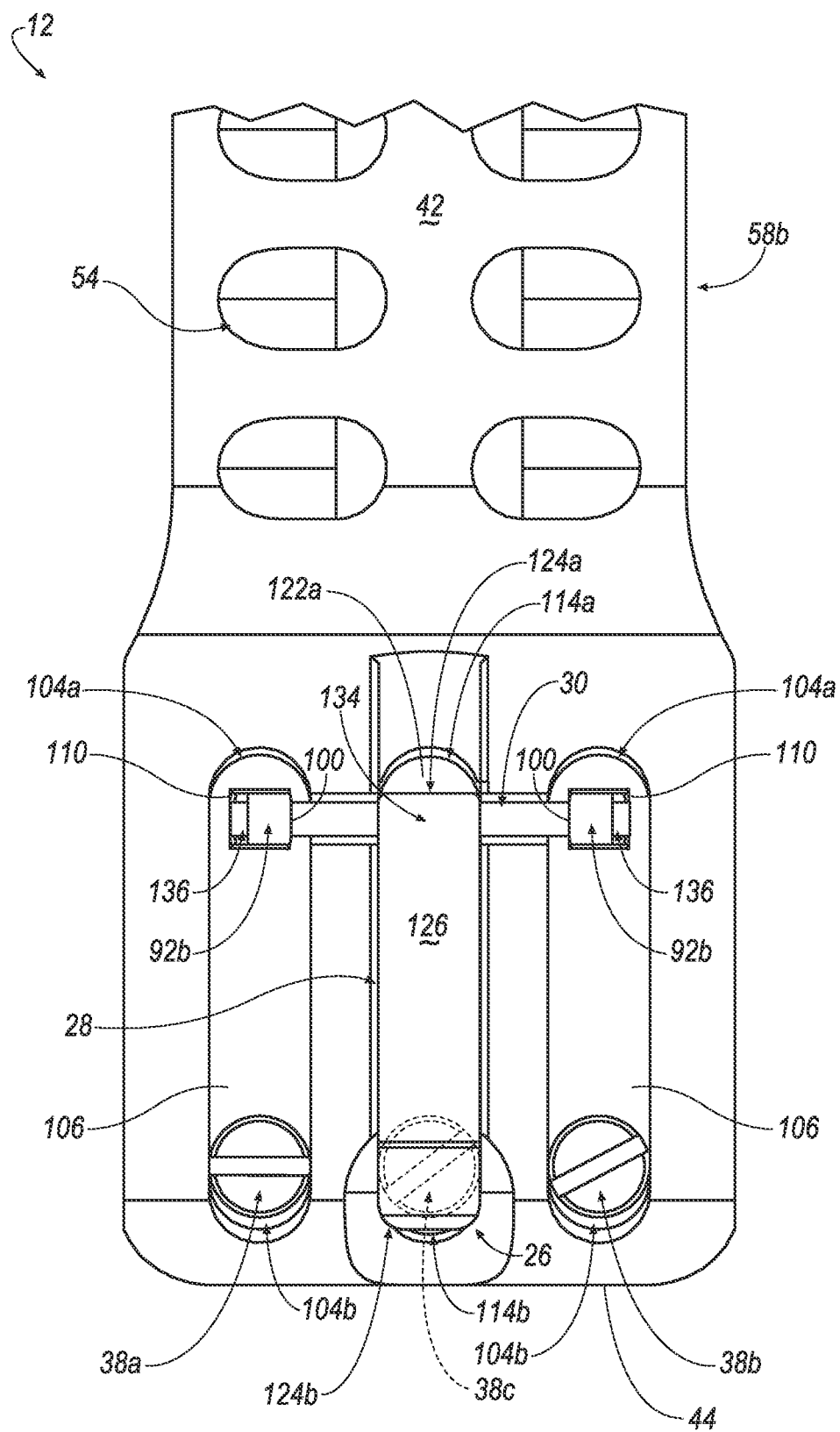
FIG. 4B is a front view of the sub-assembly of FIG. 3B joined to the component of FIG. 4A.

Referring to FIGS. 1 and 3A-3B, the plurality of interconnected components 12-40 that collectively form the support apparatus assembly 10 may further include a support member locking mechanism 26. In an embodiment, the support member locking mechanism 26 includes a lever 28, a lever pin 30, at least one reciprocating wedge 32, at least one wedge leaf spring 34, and a lever leaf spring 36. The support member locking mechanism 26 is joined to the base member 12 by one or more fasteners 38 (such as, e.g., a first/left fastener 38a, a second/right fastener 38b, and a third/middle fastener 38c). As will be explained below, the at least one reciprocating wedge 32 is selectively interfaced with the at least one support member 14 and functions by selectively locking the at least one support member 14 relative to the base member 12 in one of the stowed orientation (see, e.g., FIG. 5A) and the deployed orientation (see, e.g., FIG. 5C).

The at least one reciprocating wedge 32 includes a pair of reciprocating wedges 32 comprising a first reciprocating wedge 32a (or a "left" reciprocating wedge per the view of FIG. 1) and a second reciprocating wedge 32b (or a "right" reciprocating wedge per the view of FIG. 1). The at least one wedge leaf spring 34 includes a pair of wedge leaf springs 34 comprising a first wedge leaf spring 34a (or a "left" wedge leaf spring per the view of FIG. 1) and a second wedge leaf spring 34b (or a "right" wedge leaf spring per the view of FIG. 1).

With continued reference to FIG. 1, the plurality of interconnected components 12-40 that collectively form the support apparatus assembly 10 may further include at least one covering member 40. The at least one covering member 40 may include a pair of covering members 40 comprising a first covering member 40a (or a "left" covering member per the view of FIG. 1) and a second covering member 40b (or a "right" covering member per the view of FIG. 1).

The Base Member 12

Referring to FIG. 1, the base member 12 includes an outer side surface 42 that extends between a lower end surface 44 and an upper end surface 46. The upper end surface 46 partially forms a mounting channel 48. A clamp 50 that is joined to the base member 12 proximate the upper end surface 46 also partially forms the mounting channel 48.

The mounting channel 48 may include any geometric profile, such as, for example: a dovetail profile, a Picatinny profile or the like. The component, F, may include a mounting member that includes a geometric profile that corresponds to the geometric profile of the mounting channel 48 for the purpose of joining the support apparatus 10 to the component, F.

The clamp 50 is movable relative to the base member 12 by pivoting a cam lever 52 that is rotatably-joined to the clamp 50. The clamp 50 and cam lever 52 are described in U.S. Provisional Patent Application Ser. No. 61/322,200 filed on Apr. 8, 2010 and U.S. Non-Provisional patent application Ser. No. 13/074,397 filed on Mar. 29, 2011 the contents of which are hereby incorporated by reference in their entirety.

The outer side surface 42 forms the base member 12 to include a substantially cylindrical geometry. The substantially cylindrical geometry of the base member 12 that is formed by the outer side surface 42 may be interrupted by one or more of/a plurality of depressions. The plurality of depressions may serve a variety of purposes, such as, for example: aesthetic purposes, frictional purposes, weight-reduction purposes, component stowage purposes and the like. In some instances, as will be described below, two or more depressions of the plurality of depressions may extend into the base member 12 such that they intersect in order to permit some of the plurality of interconnected components 12-40 disposed therein to contact/engage each other.

Referring initially to FIG. 1, the plurality of depressions may include a plurality of pockets 54. The plurality of pockets 54 may be formed in the base member 12 in order to, for example, interrupt the outer side surface 42 in order to increase friction should a user grasp the base member 12 with his/her hand.

Figure 12A:
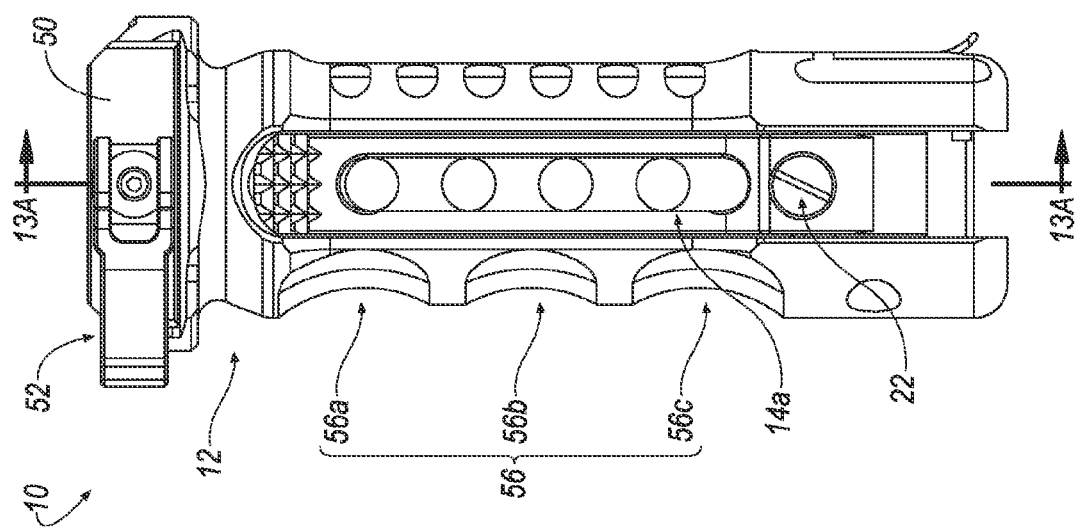
FIG. 12A is a side view of the support apparatus of FIG. 5A.
Figure 12C:
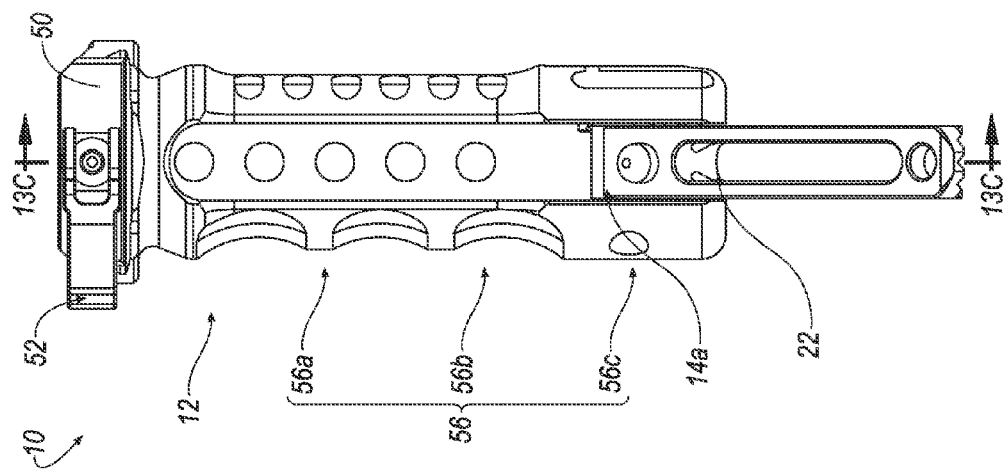
FIG. 12C is a side view of the support apparatus of FIG. 5C.

Referring to FIGS. 12A-12C, the plurality of depressions may include at least one digit groove 56. The at least one digit groove 56 may correspond to a suggested location for placing at least one of a user's digits (i.e., fingers) upon gripping the base member 12 with his/her hand. The plurality of digit grooves 56 may include, for example, three digit grooves 56a, 56b, 56c. The three digit grooves 56a, 56b, 56c may correspond to a suggested location of, for example, a user's: index finger, middle finger and ring finger.

Referring to FIGS. 1, 5A-5C, 9B, 12B-12C and 13B-13C, the plurality of depressions may include at least one support-member-receiving channel 58 (as explained below, in an embodiment, the at least one support-member-receiving channel 58 includes a first support-member-receiving channel 58a and a second support-member-receiving channel 58b). The at least one support-member-receiving channel 58 includes a length, width and depth that substantially corresponds to the length, $L_{14}$, the width, $W_{14}$, and the depth, $D_{14}$, of the at least one support member 14. In an embodiment, the at least one support-member-receiving channel 58 is/are formed in the outer side surface 42 of the base member 12 and extends along approximately about 80%-to-90% of the length, $L_{12}$, of the base member 12 from the lower end surface 44 toward the upper end surface 46 in order to provide the function of stowing the at least one support member 14.

Figure 13A:
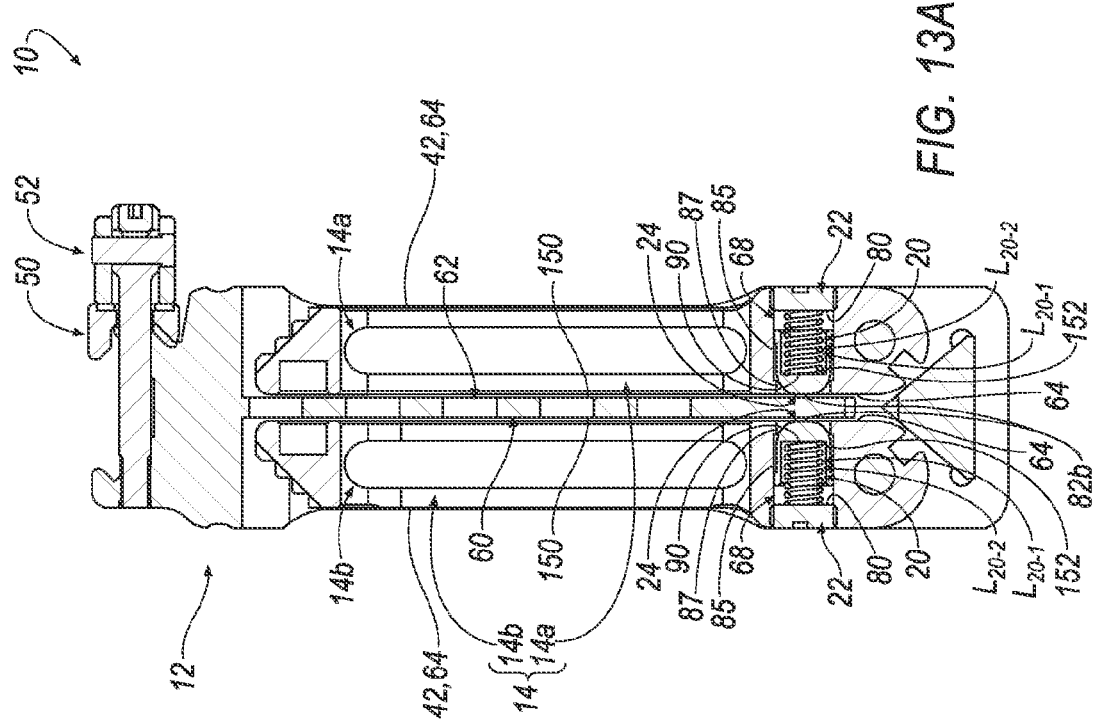
FIG. 13A is a cross-sectional view of the support apparatus of FIG. 12A according to line 13A-13A.
Figure 13C:
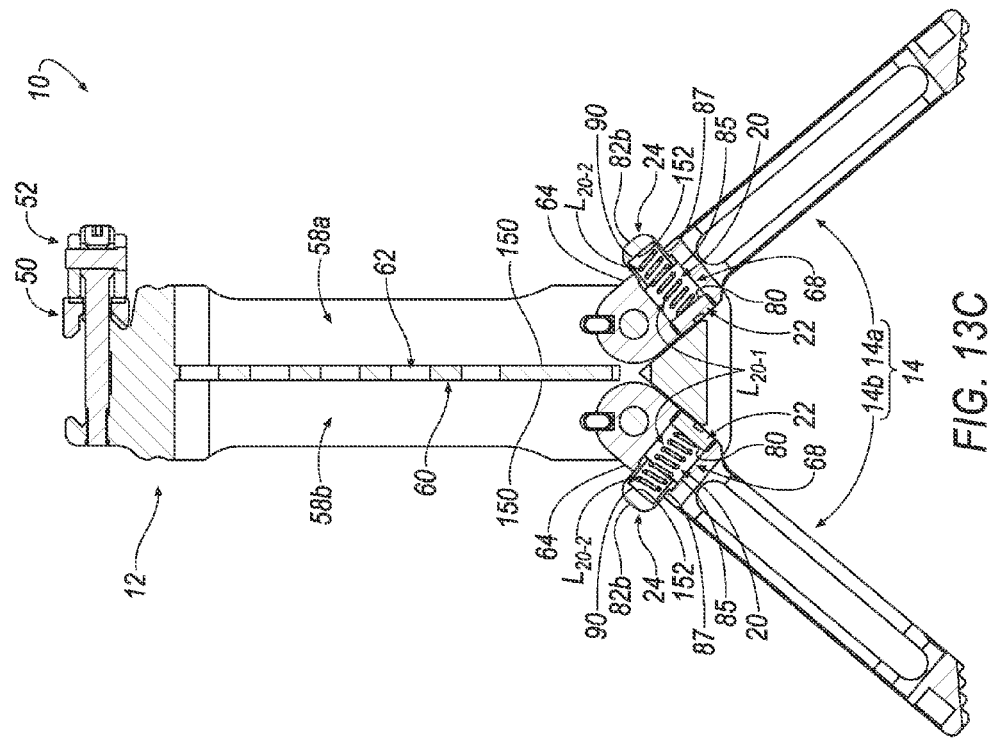
FIG. 13C is a cross-sectional view of the support apparatus of FIG. 12C according to line 13C-13C.

In an embodiment, the at least one support-member-receiving channel 58 includes a pair of laterally-opposing support-member-receiving channels 58 comprising a first support-member-receiving channel 58a (or a "left" support-member-receiving channel per a reference view of FIG. 1) and a second support-member-receiving channel 58b (or a "right" support-member-receiving channel per a reference view of FIG. 1). Referring to FIGS. 13A-13C, the pair of support-member-receiving channels 58 may be separated by a spine flange 60 that extends along a portion of the length, $L_{12}$, of the base member 12. The spine flange 60 may include a plurality of weight-reducing passages 62; the weight-reducing passages 62 serve the purpose in the elimination of material from the base member 12 in order to not only reduce the overall weight of the base member 12 but also to reduce the amount of material called for in the manufacture of the base member 12.

Further, in an embodiment, some or all of the spine flange 60 may be eliminated such that the at least one support-member-receiving channel 58 forms a passage that extends through the width, $W_{12}$/depth, $D_{12}$/diameter, $D_{12}$ of the base member 12 where the spine flange 60 would otherwise exist. Regardless of the design of a single passage 58 (i.e., the base member 12 being formed without a spine flange 60) or a pair of support-member-receiving channels 58 in the base member 12 (i.e., the base member 12 being formed to include the spine flange 60), the at least one support-member-receiving channel 58 accommodates stowage of both of the first and second support members 14a, 14b when the first and second support members 14a, 14b are arranged in the stowed orientation (see, e.g., FIG. 5A) relative to the base member 12. As seen in, for example, FIGS. 5A and 13A, when the first and second support members 14a, 14b are nested within the corresponding first and second support-member-receiving channels 58a, 58b (i.e., the first and second support members 14a, 14b are said to be arranged in the stowed orientation relative to the base member 12), an outer surface 64 of the first and second support members 14a, 14b that extends along substantially all of the length, $L_{14}$, of the first and second support members 14a, 14b is substantially aligned with the outer side surface 42 of the base member 12. Accordingly, when the first and second support members 14a, 14b are arranged in the stowed orientation as described above, the first and second support-member-receiving channels 58a, 58b may be said to be substantially "filled" by the first and second support members 14a, 14b in order to give the appearance that the base member 12 is not interrupted by a depression at least at the location of the first and second support-member-receiving channels 58a, 58b.

The at Least One Support Member 14

Referring to FIGS. 2A-2B, the at least one support member 14 may be formed to include a plurality of depressions/slots and passages 66-70b. For example, in an embodiment, the at least one support member 14 includes: (1) a pin-receiving passage 66 that extends entirely through the width, $W_{14}$, of the at least one support member 14, (2) a deployment-assist mechanism receiving passage 68 that extends entirely through the depth, $D_{14}$, of the at least one support member 14, (3) a first reciprocating wedge receiving slot 70a that extends through at least a portion of the width, $W_{14}$, of the at least one support member 14 and (4) a second reciprocating wedge receiving slot 70b that extends through at least a portion of the width, $W_{14}$ of the at least one support member 14.

Referring to FIG. 1, in order to pivotably-connect the at least one support member 14 to the base member 12, the at least one support member 14 is partially-disposed within the at least one support-member-receiving channel 58 of the base member 12 such that pin-receiving passage 66 is axially-aligned with aligned rearwardly- and forwardly-facing passages 72a, 72b formed in the base member 12 proximate the lower end surface 44. Then, the at least one pin 16 is inserted through the rearwardly-facing passage 72a, the pin-receiving passage 66 and then the forwardly-facing passage 72b. A portion of an outer side surface 74 (see, e.g., FIG. 1) of the at least one pin 16 may be frictionally fixed/interference fit to the rearwardly- and forwardly-facing passages 72a, 72b of the base member 12. Alternatively, a portion of the outer side surface 74 of the at least one pin 16 may include, for example, a threaded surface (not shown) that cooperates with a corresponding threaded surface (not shown) formed by the rearwardly- and forwardly-facing passages 72a, 72b.

The at Least One Support Member Deployment-Assist Mechanism 18

With continued reference to FIGS. 2A-2B, the stop member 22 may be inserted through a first opening 76a formed by the deployment-assist mechanism receiving passage 68 in order to dispose the stop member 22 within the deployment-assist mechanism receiving passage 68 proximate the first opening 76a. In an embodiment, the stop member 22 may include an outer side surface 78 that may form, for example, a threaded surface (not shown) that cooperates with a corresponding threaded surface (not shown) formed by the deployment-assist mechanism receiving passage 68 in order to threadingly-connect the stop member 22 to the at least one support member 14. Alternatively, an adhesive, for example, may be disposed upon the outer side surface 78 in order to adhesively-couple the stop member 22 to the at least one support member 14. Alternatively, the outer side surface 78 may define the stop member 22 to include a substantially similar dimension as that of the deployment-assist mechanism receiving passage 68 in order to frictionally-wedge/couple the stop member 22 into/with the at least one support member 14.

The coil spring 20 may be inserted through a second opening 76b formed by the deployment-assist mechanism receiving passage 68 in order to at least partially dispose a first portion, $L_{20-1}$, of a length, $L_{20}$, of the coil spring 20 within the deployment-assist mechanism receiving passage 68. The coil spring 20 may be inserted into the deployment-assist mechanism receiving passage 68 until a first end 78a of the coil spring 20 is disposed adjacent a stop surface 80 of the stop member 22.

Once a portion, $L_{20-1}$, of a length, $L_{20}$, of the coil spring 20 is disposed within the deployment-assist mechanism receiving passage 68 as described above, a first end 82a of the cap member 24 may be disposed within the deployment-assist mechanism receiving passage 68 proximate the second opening 76b. In an embodiment, the cap member 24 may include an outer side surface 84 that slidably-cooperates with a corresponding surface 85 (see, e.g., FIGS. 13A-13C) formed by the deployment-assist mechanism receiving passage 68 in order to slidably-connect the cap member 24 to the at least one support member 14. In an embodiment, as seen in FIGS. 13A-13C, the outer side surface 84 may define the cap member 24 to include a larger dimension than a lip member 87 that forms a portion of the deployment-assist mechanism receiving passage 68 in order to prevent the cap member 24 from being slidably-disconnected from the at least one support member 14.

Upon connecting the cap member 24 to the at least one support member 14, a portion, $L_{24-1}$, of a length, $L_{24}$, of the cap member 24 may be disposed within the deployment-assist mechanism receiving passage 68 while a remainder of the length (i.e., a second portion, $L_{24-2}$, of the length, $L_{24}$,) of the cap member 24 extends out of the deployment-assist mechanism receiving passage 68 and beyond the outer surface 64 of the at least one support member 14. The cap member 24 may further define a passage 86. Access to the passage 86 is provided by an opening 88 formed in the first end 82a of the cap member 24. A second end 82b of the cap member 24 is enclosed and does not include an opening. In an embodiment, the second end 82b includes a dome-shaped geometry.

Because the coil spring 20 is disposed within the deployment-assist mechanism receiving passage 68 in an un-compressed/un-biased state, the first portion, $L_{20-1}$, of the length, $L_{20}$, of the coil spring 20 is arranged within the deployment-assist mechanism receiving passage 68 while a remainder of the length (i.e., a second portion, $L_{20-2}$, of the length, $L_{20}$,) of the coil spring 20 extends out of the deployment-assist mechanism receiving passage 68 and beyond the outer surface 64 of the at least one support member 14. Upon connecting the cap member 24 to the at least one support member 14 as described above, the second portion, $L_{20-2}$, of the length, $L_{20}$, of the coil spring 20 may be inserted through the opening 88 formed in the first end 82a of the cap member 24 such that that the second portion, $L_{20-2}$, of the length, $L_{20}$, of the coil spring 20 may be disposed within the passage 86 formed by the cap member 24. Upon arranging the second portion, $L_{20-2}$, of the length, $L_{20}$, of the coil spring 20 within the passage 86 formed by the cap member 24, a second end 78b of the coil spring 20 may be arranged in an opposing relationship with, or, disposed adjacent to an interior surface 90 (see, e.g., FIG. 13A-13C) of the cap member 24 that at least partially forms the passage 86.

The Support Member Locking Mechanism 26

Referring to FIGS. 3A-3B, the at least one reciprocating wedge 32 includes a first end 92a, a second end 92b and an end surface 94 that connects an upper surface 96 to a lower surface 98. The second end 92b forms a lever pin passage 100 that extends through an outer side surface of the at least one reciprocating wedge 32 from a first side surface 102a to an opposing second side surface 102b.

The at least one wedge leaf spring 34 includes a first, upper end 104a and a second, lower end 104b. The at least one wedge leaf spring 34 includes a forwardly-facing surface 106 and an opposing, rearwardly-facing surface 108. The at least one wedge leaf spring 34 forms a first passage 110 that extends entirely through a thickness of the at least one wedge leaf spring 34 from the forwardly-facing surface 106 to the rearwardly-facing surface 108 proximate the upper end 104a and a second passage 112 that extends entirely through a thickness of the at least one wedge leaf spring 34 from the forwardly-facing surface 106 to the rearwardly-facing surface 108 proximate the lower end 104b.

The lever leaf spring 36 includes a first, upper end 114a and a second, lower end 114b. The lever leaf spring 36 includes a forwardly-facing surface 116 and an opposing, rearwardly-facing surface 118. The lever leaf spring 34 forms a passage 120 that extends entirely through a thickness of the lever leaf spring 36 from the forwardly-facing surface 116 to the rearwardly-facing surface 118 proximate the lower end 114b. The at least one wedge leaf spring 34 is substantially flat whereas the lever leaf spring 36 is not flat; for example, the lever leaf spring 36 includes a plurality of (e.g., three) angularly-offset segments 122a, 122b, 122c.

The lever 28 includes a first, upper end 124a and a second, lower end 124b. The lever 28 includes a forwardly-facing surface 126 and an opposing, rearwardly-facing surface 128. The upper end 124a forms a lever pin passage 130 that extends through an outer side surface of the lever 28 from a first side surface 132a to an opposing second side surface 132b.

Prior to joining the support member locking mechanism 26 to the base member 12 (i.e., by inserting the one or more fasteners 38 through the passages 112, 120 formed in the leaf springs 34, 36 such that the one of more fasteners 38 may be coupled to the base member 12), the support member locking mechanism 26 may be pre-assembled to form a sub-assembly, as follows. Firstly, the second end 92b of the at least one reciprocating wedge 32 is arranged within the first passage 110 proximate the upper end 104a of the at least one wedge leaf spring 34 such that the lever pin passage 100 is arranged at an orientation away from and beyond the forwardly-facing surface 106 of the at least one wedge leaf spring 34. Then, the lever pin 30 is disposed within the lever pin passage 130 of the lever 28 such that the lever 28 is arranged in a substantially centered orientation upon a middle portion 134 of the lever pin 30. Then, the lever pin 30 is disposed within the lever pin passage 100 of the left reciprocating wedge 32a of the at least one reciprocating wedge 32 such that the left reciprocating wedge 32a is arranged in a substantially left-side orientation upon a left portion 136 of the lever pin 30. Then, the lever pin 30 is disposed within the lever pin passage 100 of the right reciprocating wedge 32b of the at least one reciprocating wedge 32 such that the right reciprocating wedge 32b is arranged in a substantially right-side orientation upon a right portion 138 of the lever pin 30. Once the support member locking mechanism 26 is assembled as described above, the one or more fasteners 38 may be inserted through the passages 112, 120 formed in the leaf springs 34, 36 such that the one of more fasteners 38 may be subsequently inserted into and connected to the base member 12, as follows.

The Left Fastener 38a

Referring to FIGS. 3A-3B and 4A-4B, a portion of the left fastener 38a is arranged within the second passage 112 proximate the lower end 104b of the left leaf spring 34a of the at least one wedge leaf spring 34 while an outer side surface portion 140a of the left fastener 38a is arranged at an orientation away from and beyond the rearwardly-facing surface 108 of the left wedge leaf spring 34a of the at least one wedge leaf spring 34. In an embodiment, the outer side surface 140a may form, for example, a threaded surface (not shown) that cooperates with a corresponding threaded surface 141a (see, e.g., FIG. 4A) formed by a lower, left fastener-receiving passage 142a formed in the base member 12 proximate the lower end surface 44 in order to threadingly-connect the left fastener 38a to the base member 12. The lower, left fastener-receiving passage 142a is arranged within a first/left recessed channel 144a (see, e.g., FIGS. 4A-4B) formed in the base member 12 proximate the lower end surface 44 that houses/stows the left wedge leaf spring 34a (see, e.g., FIG. 4B).

Figure 7B:
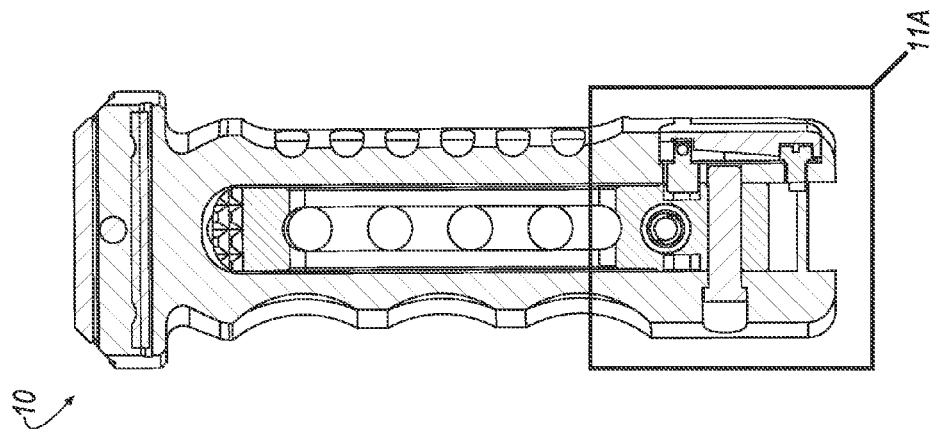
FIG. 7B is a cross-sectional view of the support apparatus of FIG. 6 according to line 7B-7B.
Figure 7A:
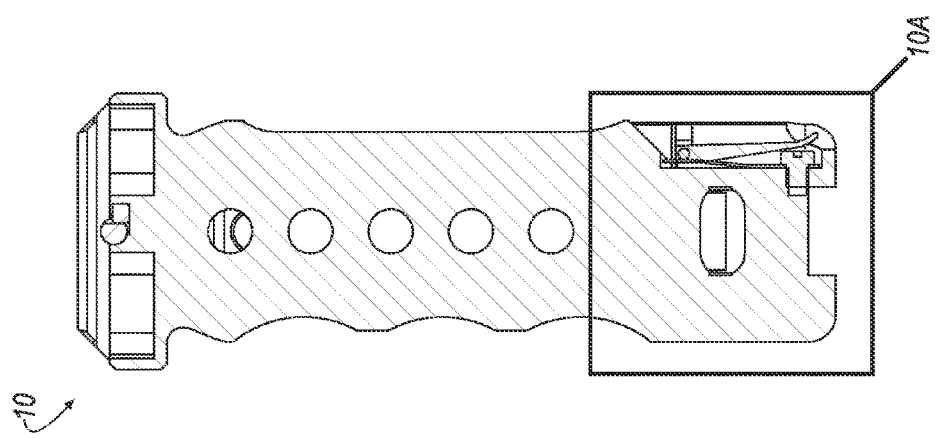
FIG. 7A is a cross-sectional view of the support apparatus of FIG. 6 according to line 7A-7A.
Figure 6:
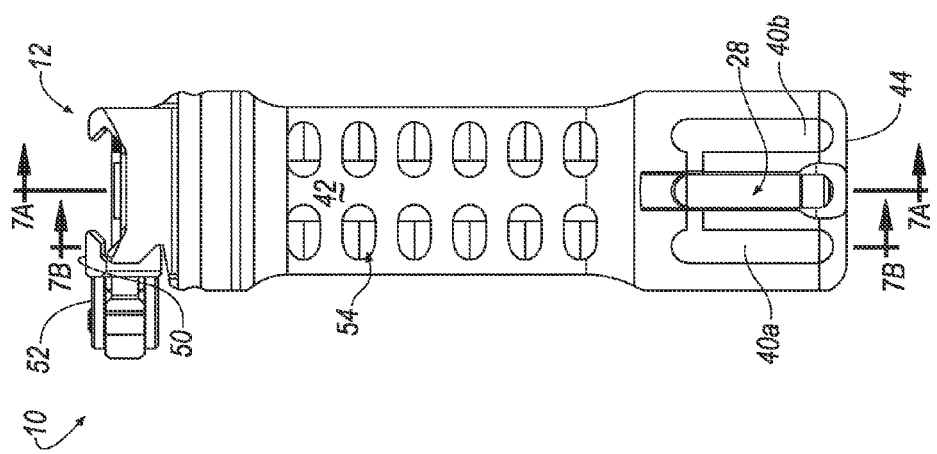
FIG. 6 is a front view of the support apparatus of FIG. 5A.
Figure 9B:
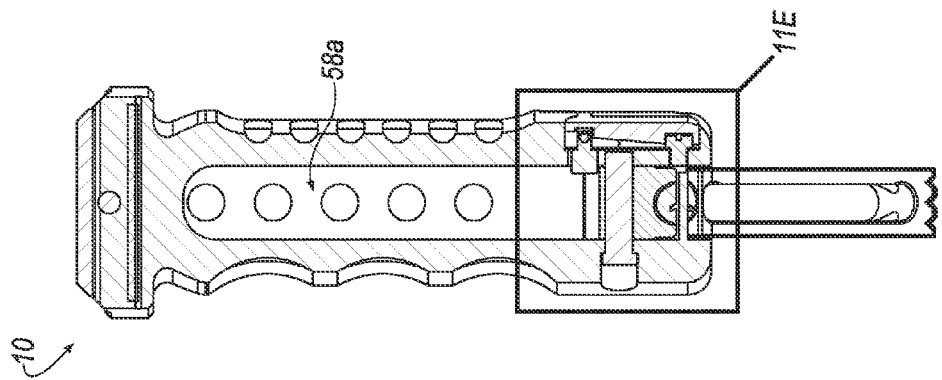
FIG. 9B is a cross-sectional view of the support apparatus of FIG. 8 according to line 9B-9B.
Figure 9A:
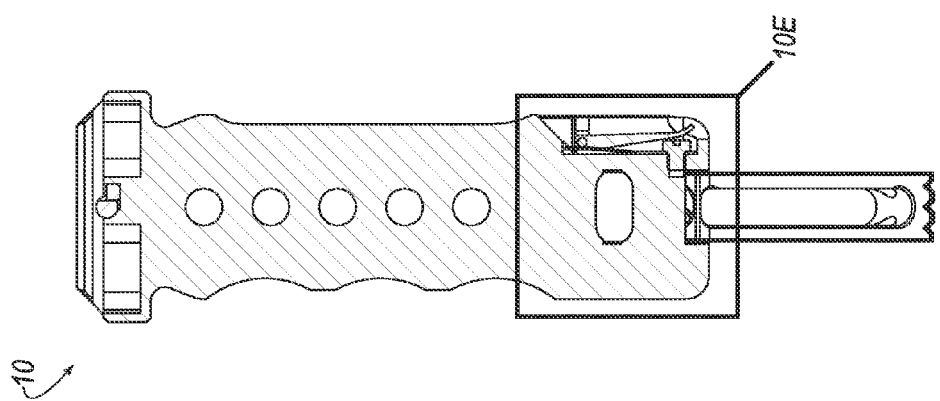
FIG. 9A is a cross-sectional view of the support apparatus of FIG. 8 according to line 9A-9A.
Figure 8:
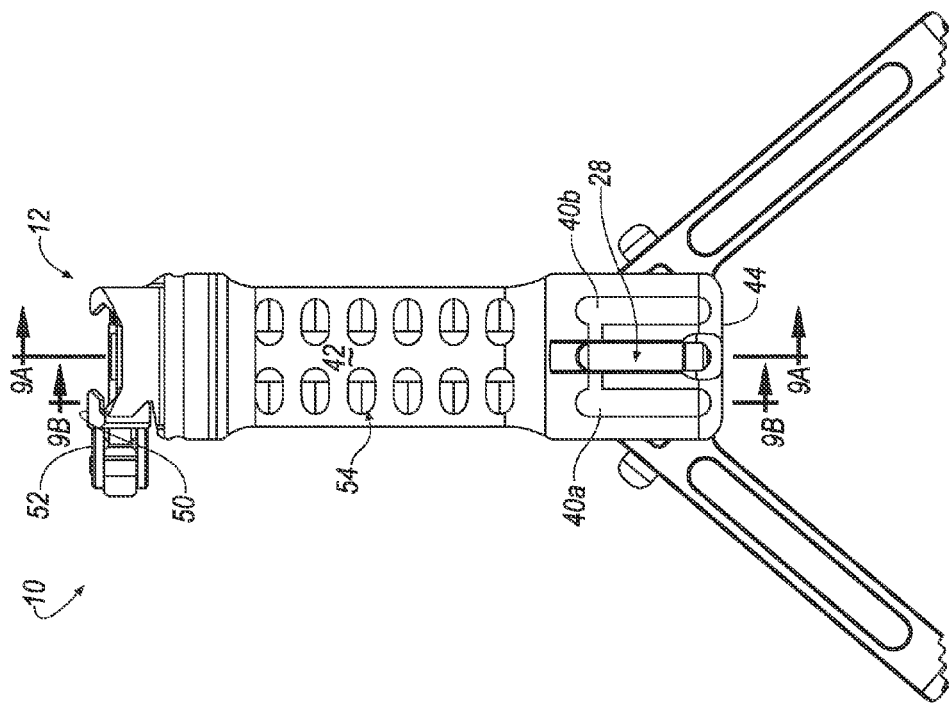
FIG. 8 is a front view of the support apparatus of FIG. 5C.

An upper, left wedge-receiving passage 146a (see, e.g., FIG. 4A) is also arranged within the first/left recessed channel 144a and receives the left reciprocating wedge 32a. The left wedge-receiving passage 146a intersects with and is in communication with the first support-member-receiving channel 58*a* such that the left reciprocating wedge 32*a* (upon being disposed within the left wedge-receiving passage 146*a*) may be in communication with one of the first reciprocating wedge receiving slot 70*a* (as seen in, e.g., FIGS. 7B, 11A) and the second reciprocating wedge receiving slot 70*b* (as seen in, e.g., FIGS. 9B, 11E) depending on the stowed/deployed orientation of the first support member 14*a* within the first support-member-receiving channel 58*a*.

The Right Fastener 38*b*

A portion of the right fastener 38*b* is arranged within the second passage 112 proximate the lower end 104*b* of the right leaf spring 34*b* of the at least one wedge leaf spring 34 while an outer side surface portion 140*b* of the right fastener 38*b* is arranged at an orientation away from and beyond the rearwardly-facing surface 108 of the right wedge leaf spring 34*b* of the at least one wedge leaf spring 34. In an embodiment, the outer side surface 140*b* may form, for example, a threaded surface (not shown) that cooperates with a corresponding threaded surface 141*b* formed by a lower, right fastener-receiving passage 142*b* (see, e.g., FIG. 4A) formed in the base member 12 proximate the lower end surface 44 in order to threadingly-connect the right fastener 38*b* to the base member 12. The lower, right fastener-receiving passage 142*b* is arranged within a second/right recessed channel 144*b* (see, e.g., FIGS. 4A-4B) formed in the base member 12 proximate the lower end surface 44 that houses/stows the right wedge leaf spring 34*b*.

An upper, right wedge-receiving passage 146*b* (see, e.g., FIG. 4A) is also arranged within the second/right recessed channel 144*b* and receives the right reciprocating wedge 32*b*. The right wedge-receiving passage 146*b* intersects with and is in communication with the second support-member-receiving channel 58*b* such that the right reciprocating wedge 32*b* (upon being disposed within the right wedge-receiving passage 146*b*) may be in communication with one of the first reciprocating wedge receiving slot 70*a* and the second reciprocating wedge receiving slot 70*b* depending on the stowed/deployed orientation of the second support member 14*b* within the second support-member-receiving channel 58*b* in a substantially similar manner as described above with respect to the left wedge-receiving passage 146*a* and the slots 70*a*, 70*b* of FIGS. 7B, 11A & 9B, 11E.

The Middle Fastener 38*c*

A portion of the middle fastener 38*c* is arranged within the passage 120 proximate the lower end 114*b* of the lever leaf spring 36 while an outer side surface portion 140*c* of the middle fastener 38*c* is arranged at an orientation away from and beyond the rearwardly-facing surface 118 of the lever leaf spring 36. In an embodiment, the outer side surface 140*c* may form, for example, a threaded surface (not shown) that cooperates with a corresponding threaded surface 141*c* formed by a lower, middle fastener-receiving passage 142*c* (see, e.g., FIG. 4A) formed in the base member 12 proximate the lower end surface 44 in order to threadingly-connect the middle fastener 38*c* to the base member 12. The lower, middle fastener-receiving passage 142*c* is arranged within a third/middle recessed channel 144*c* (see, e.g., FIGS. 4A, 4B) formed in the base member 12 proximate the lower end surface 44 that houses/stows the lever leaf spring 36.

The base member 12 also includes a fourth recessed channel 144*d* (see, e.g., FIG. 4A) that intersects the first, second and third recessed channels 144*a*, 144*b*, 144*c*. The fourth recessed channel 144*d* extends across and is located proximate the upper, right wedge-receiving passages 146*a*, 146*b* formed in the first and second recessed channels 144*a*, 144*b*. The fourth recessed channel 144*d* houses/stows the lever pin 30 when the support member locking mechanism 26 is joined to the base member 12.

The at Least One Covering Member 40

Referring to FIG. 1, after joining the support member locking mechanism 26 to the base member 12 with the one or more fasteners 38 as described above (see also, FIG. 4B), the at least one covering member 40 may be connected to the base member 12. The at least one covering member 40 may close out and obfuscate the first and second recessed channels 144*a*, 144*b* as well as a portion of the fourth recessed channel 144*d* that extends across the first and second recessed channels 144*a*, 144*b*. While providing an aesthetically-pleasing appearance of the base member 12, the at least one covering member 40 protects the at least one wedge leaf spring 34 and at least one reciprocating wedge 32 from the elements (e.g., dirt, dust, sand, water, and the like). In an embodiment, the left covering member 40*a* is disposed within the first recessed channel 144*a* formed in the base member 12, and, the right covering member 40*b* is disposed within the second recessed channel 144*b* formed in the base member 12. The left and right covering members 40*a*, 40*b* may be frictionally-coupled or adhesively-coupled to the base member 12 within the first and second recessed channels 144*a*, 144*b*.

Method for Operating the Support Member Locking Mechanism 26

As described above, the at least one support member 14 may be arranged in a movable orientation to/from, for example, a "stowed orientation" (see, e.g., FIG. 5A), a "deployed orientation" (see, e.g., FIG. 5C) and any one of a plurality of "intermediate orientations" (see, e.g., FIG. 5B) relative the base member 12. Further, as described above, the at least one reciprocating wedge 32 of the support member locking mechanism 26 is selectively interfaced with one of the slots 70*a*, 70*b* of the at least one support member 14 for selectively locking the at least one support member 14 relative to the base member 12 in one of the stowed orientation (see, e.g., FIG. 5A) and the deployed orientation (see, e.g., FIG. 5C). Selective-adjustment of the at least one reciprocating wedge 32 to an orientation within one of the slots 70*a*, 70*b* is initiated by manipulation of an orientation of the lever 28 by, for example, a user of the support apparatus 10, as follows.

Figure 10E:
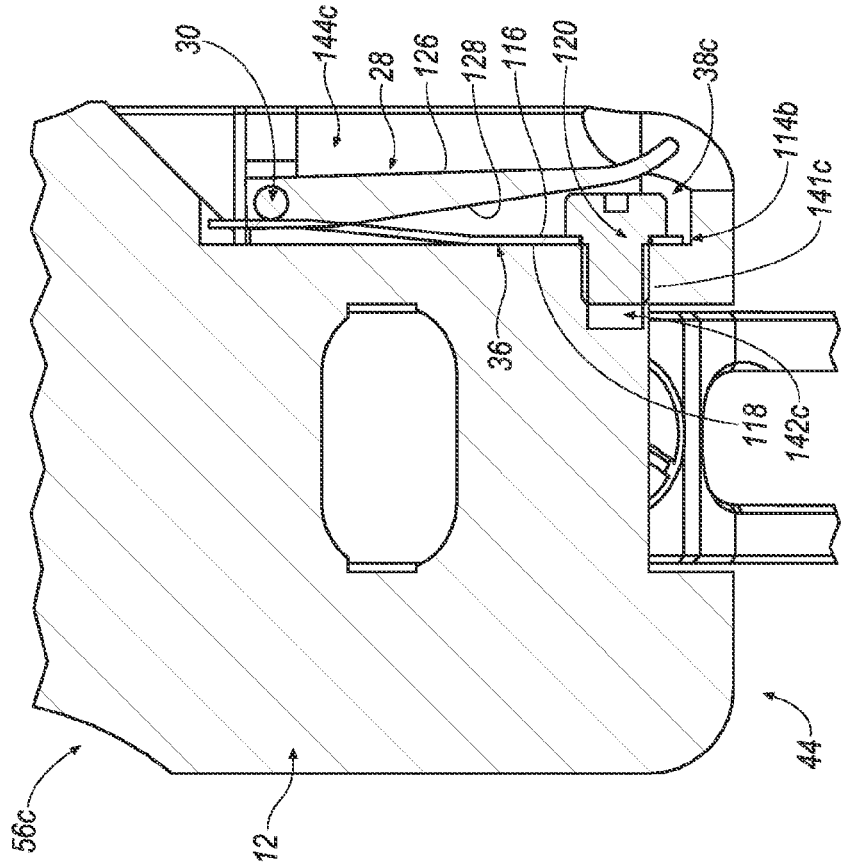
FIG. 10E is an enlarged view of FIG. 9A according to line 10E.

Referring to FIG. 10A, the lever 28 of the support member locking mechanism 26 is shown to be initially arranged in a "down" orientation. In corresponding FIG. 11A, the at least one reciprocating wedge 32 is shown in a biased orientation such that the at least one reciprocating wedge 32 is arranged at least partially within the slot 70*a* of the at least one support member 14 and the at least one support-member-receiving channel 58 of the base member 12. The biased orientation of the at least one reciprocating wedge 32 arises from a force, $F_{26}$, being imparted from one or more of the at least one wedge leaf spring 34 and the lever leaf spring 36 of the support member locking mechanism 26.

Referring to FIG. 10B, the lever 28 of the support member locking mechanism 26 is shown to be pivoted according to the direction of the arrow, P, about the lever pin 30 and away from the "down" orientation to an "up" orientation. In corresponding FIG. 11B, the at least one reciprocating wedge 32 remains in the biased orientation such that the at least one reciprocating wedge 32 remains arranged at least partially within the slot 70*a* of the at least one support member 14 and the at least one support-member-receiving channel 58 of the base member 12.

Referring to FIG. 10C, when the lever 28 of the support member locking mechanism 26 is arranged in the "up" orientation, the user may apply a pushing force, $F_{28}$, to the lever 28 in order to cause the at least one reciprocating wedge 32 to be withdrawn from an orientation at least partially within the slot 70a of the at least one support member 14 and the at least one support-member-receiving channel 58 of the base member 12. The pushing force, $F_{28}$, causes the lever 28 to be leveraged about an outer side surface 42 of the base member 12 proximate an upper end of the middle recessed channel 144c formed in the base member 12. By leveraging the lever 28 about the outer side surface 42 of the base member 12, the lever 28 pulls the lever pin 30 with a force, $F_{26}'$, that is in an opposite direction of and greater than the force, $F_{26}$, imparted from one or more of the at least one wedge leaf spring 34 and the lever leaf spring 36 of the support member locking mechanism 26. In corresponding FIG. 11C, as a result of overcoming the force, $F_{26}$, being imparted from one or more of the at least one wedge leaf spring 34 and the lever leaf spring 36, the at least one reciprocating wedge 32 is pulled out of and no longer arranged at least partially within the slot 70a of the at least one support member 14 and the at least one support-member-receiving channel 58 of the base member 12.

When the at least one reciprocating wedge 32 is arranged in the biased orientation as seen in FIGS. 11A-11B, the first end 92a of the at least one reciprocating wedge 32 is arranged within the first reciprocating wedge receiving slot 70a of the at least one support member 14; accordingly, the first end 92a of the at least one reciprocating wedge 32 interferes with rotational movement of the at least one support member 14 relative to the base member 12 such that the at least one support member 14 is said to be locked in place in the stowed orientation relative to the base member 12. Conversely, as seen in FIG. 11C, when the biasing force, $F_{26}$, applied to the at least one reciprocating wedge 32 is overcome, the at least one reciprocating wedge 32 is withdrawn from being arranged within the at least one support-member-receiving channel 58 of the base member 12 (i.e., at least the end surface 94 of the at least one reciprocating wedge 32 is aligned with a channel-forming surface 148 of the at least one support-member-receiving channel 58); accordingly, as seen in FIG. 11C, the first end 92a of the at least one reciprocating wedge 32 does not interfere with rotational movement of the at least one support member 14 relative to the base member 12 such that the at least one support member 14 may be pivoted relative to the base member 12 in order to change an orientation of the at least one support member 14 from the stowed orientation to one or more of the partially-deployed orientation (see, e.g., FIG. 5B) and the deployed orientation (see, e.g., FIG. 5C).

Once the at least one reciprocating wedge 32 has been arranged as described above, the at least one support member 14 may be pivoted about the at least one pin 16 from the stowed orientation to the partially-deployed orientation. Once the at least one support member 14 has been pivoted, the user may release the pushing force, $F_{28}$, to the lever 28. Once the user releases the pushing force, $F_{28}$, to the lever 28, the force, $F_{26}$, imparted from one or more of the at least one wedge leaf spring 34 and the lever leaf spring 36 is re-introduced, and, may cause: (1) the lever 28 to pivot according to the direction of the arrow, P' (see, e.g., FIGS. 10D, 11D), which is opposite the direction of the arrow, P, and (2) the at least one reciprocating wedge 32 to be at least partially returned to the biased orientation in a direction toward the at least one support-member-receiving channel 58. When, for example, the at least one support member 14 has been pivoted about the at least one pin 16 to a partially-deployed orientation (as seen in, e.g., FIG. 5B), the first reciprocating wedge receiving slot 70a is no longer aligned with the at least one reciprocating wedge 32; thus, the end surface 94 of the at least one reciprocating wedge 32 may be biased toward/pushed into the outer surface 64 of the at least one support member 14 as the at least one support member 14 is pivoted about the at least one pin 16.

Referring to FIGS. 10D-11D, the at least one support member 14 may be pivoted about the at least one pin 16 such that the at least one support member 14 becomes arranged in the deployed orientation. As seen in FIG. 10D, once the second reciprocating wedge receiving slot 70b is aligned with the at least one reciprocating wedge 32, the force, $F_{26}$, imparted from one or more of the at least one wedge leaf spring 34 and the lever leaf spring 36 causes the at least one reciprocating wedge 32 to be fully returned to the biased orientation such that the at least one reciprocating wedge 32 is arranged within the at least one support-member-receiving channel 58 and the slot 70b; as seen in corresponding FIG. 11D, because the second reciprocating wedge receiving slot 70b is aligned with the wedge-receiving passage 146a that contains the at least one reciprocating wedge 32, the at least one reciprocating wedge 32 may be permitted to be arranged at least partially within the at least one support-member-receiving channel 58 of the base member 12.

Figure 11E:
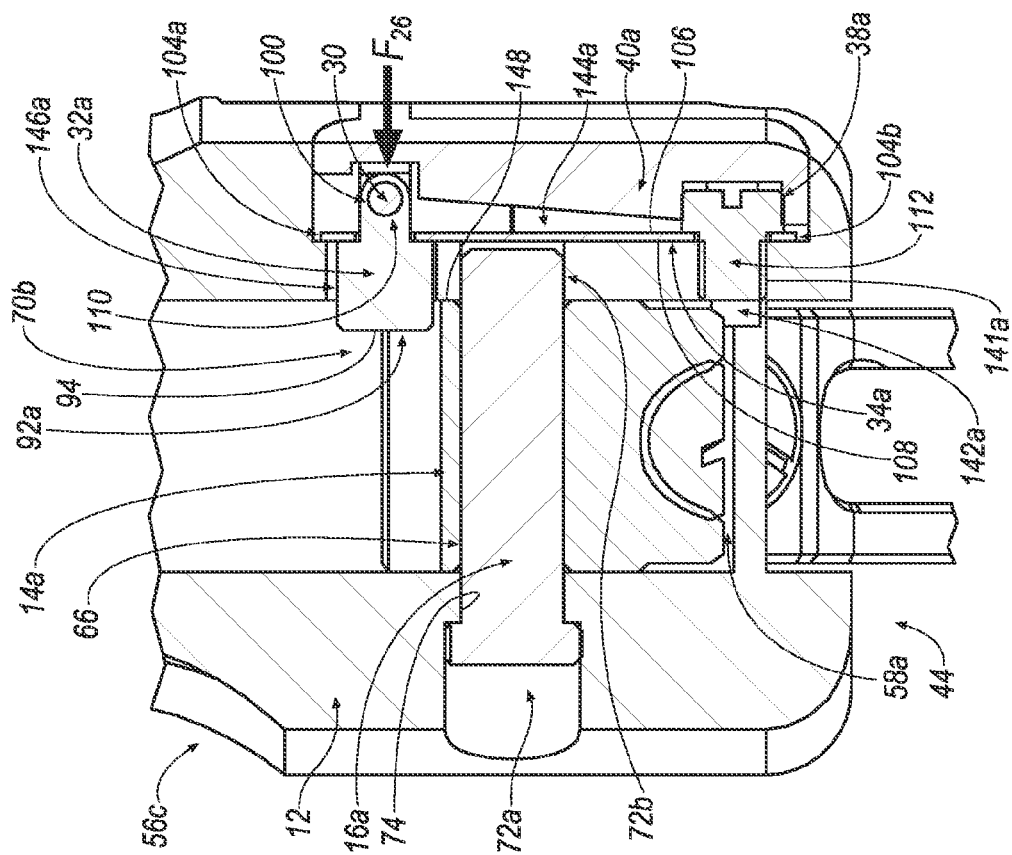
FIG. 11E is an enlarged view of FIG. 9B according to line 11E.

When the at least one reciprocating wedge 32 is arranged in the biased orientation as seen in FIG. 11D, the first end 92a of the at least one reciprocating wedge 32 is arranged within the second reciprocating wedge receiving slot 70b of the at least one support member 14; accordingly, the first end 92a of the at least one reciprocating wedge 32 interferes with rotational movement of the at least one support member 14 relative to the base member 12 such that the at least one support member 14 is locked in place in the deployed orientation relative to the base member 12. The user may then pivot the lever 28 of the support member locking mechanism 26 according to the direction of the arrow, P' (see, e.g., FIGS. 10D, 11D), about the lever pin 30 such that the lever 28 may be returned to the "down" orientation (see, e.g., FIGS. 10E, 11E) from the "up" orientation. When it is desired to return the at least one support member 14 to the stowed orientation (from the deployed orientation), the above-described steps are conducted in a reverse order.

Method for Operating the at Least One Support Member Deployment-Assist Mechanism 18

As seen in FIGS. 12A-13C, the at least one support member deployment-assist mechanism 18 may be arranged in one of two states. As seen in FIG. 13A, the at least one support member deployment-assist mechanism 18 is shown arranged in a compacted, biased state, whereas, as seen in FIGS. 13B-13C, the at least one support member 18 is shown in an expanded, un-biased state. Upon application of the pushing force, $F_{28}$, for withdrawing the at least one reciprocating wedge 32 from the slot 70a, the at least one support member deployment-assist mechanism 18 may be utilized/actuated in order to assist in moving the at least one support member 14 from the stowed orientation toward the deployed orientation. However, prior to explaining the deployment-assist function of the at least one deployment-assist mechanism 18, the expanded, un-biased state of the at least one deployment-assist mechanism 18 is described according to an embodiment.

Referring to FIG. 13C, when the at least one support member 14 is arranged in the deployed orientation relative to the base member 12, the first portion, $L_{20\text{-}1}$, of the length, $L_{20}$, of the coil spring 20 is arranged within the deployment-assist mechanism receiving passage 68 while a remainder of the length (i.e., a second portion, $L_{20\text{-}2}$, of the length, $L_{20}$,) of the coil spring 20 extends out of the deployment-assist mechanism receiving passage 68 and beyond the outer surface 64 of the at least one support member 14 and is covered by the cap member 24, which is slidably-connected to and extends beyond the outer surface 64 of the at least one support member 14. Conversely, when the at least one support member 14 is moved from the deployed orientation as seen in FIG. 13C to the partially-deployed orientation as seen in FIG. 13B, the second end 82b of the cap member 24 may come closer into contact with and subsequently engage (as seen in FIG. 13A) an outer surface 150 of the spine flange 60. Further movement of the at least one support member 14 to the stowed orientation results in the cap member 24 being slidably-moved into the deployment-assist mechanism receiving passage 68 as a result of further movement of the cap member 24 with the at least one support member 14 being inhibited due to the contacting of the second end 82b of the cap member 24 with that of the outer surface 150 of the spine flange 60. As a result of the cap member 24 being slidably-moved into the deployment-assist mechanism receiving passage 68, the coil spring 20 is compacted between an interior surface 152 of the cap member 24 and the stop surface 80 of the stop member 22. When the at least one support member 14 is arranged in the stowed orientation relative to the base member 12, the second end 82b of the cap member 24 may be aligned with the outer surface 64 of the at least one support member 14 such that all of the length of the coil spring 20 and the cap member 24 are disposed within the deployment-assist mechanism receiving passage 68.

Referring to FIG. 13A, when it is desired to arrange the at least one support member 14 in the deployed orientation, the user manipulates the support member locking mechanism 26 as described above at FIGS. 10A-10C and 11A-11C such that the at least one reciprocating wedge 32 is no longer arranged at least partially within the slot 70a of the at least one support member 14 and the at least one support-member-receiving channel 58 of the base member 12. Accordingly, when the at least one reciprocating wedge 32 is no longer arranged at least partially within the slot 70a of the at least one support member 14 and the at least one support-member-receiving channel 58 of the base member 12 in order to otherwise render the at least one support member 14 in a locked relationship with respect to the base member 12, the at least one coil spring 20 is permitted to expand from the compressed, biased state (as seen in FIG. 13A) to the expanded, un-biased state (as seen in FIG. 13B); by permitting the at least one coil spring 20 to expand, the cap member 24 is permitted to slidably-push-off of the outer surface 150 of the spine flange 60 in order to assist in movement of the at least one support member 14 away from the base member 12.

FIGS. 15 and 16A-16C illustrates an exemplary support apparatus shown generally at 200. The support apparatus 200 may be broadly and/or alternatively referred to as a "pod." In an implementation, the pod 200 may include one or more support members (see, e.g., 214); accordingly, if, for example, the pod 200 includes one support member, the pod may be alternatively referred to as a "mono pod." Alternatively, if, for example, the pod 200 includes two support members, the pod may be alternatively referred to as a "bi pod." Alternatively, if, for example, the pod 200 includes three support members, the pod may be alternatively referred to as a "tri pod." Accordingly, although the illustrated embodiment includes two support members, it will be understood that various modifications (e.g., the number of included support members) may be made to the design of the pod 200 without departing from the spirit and scope of a claimed embodiment of the disclosure.

Figure 31A:
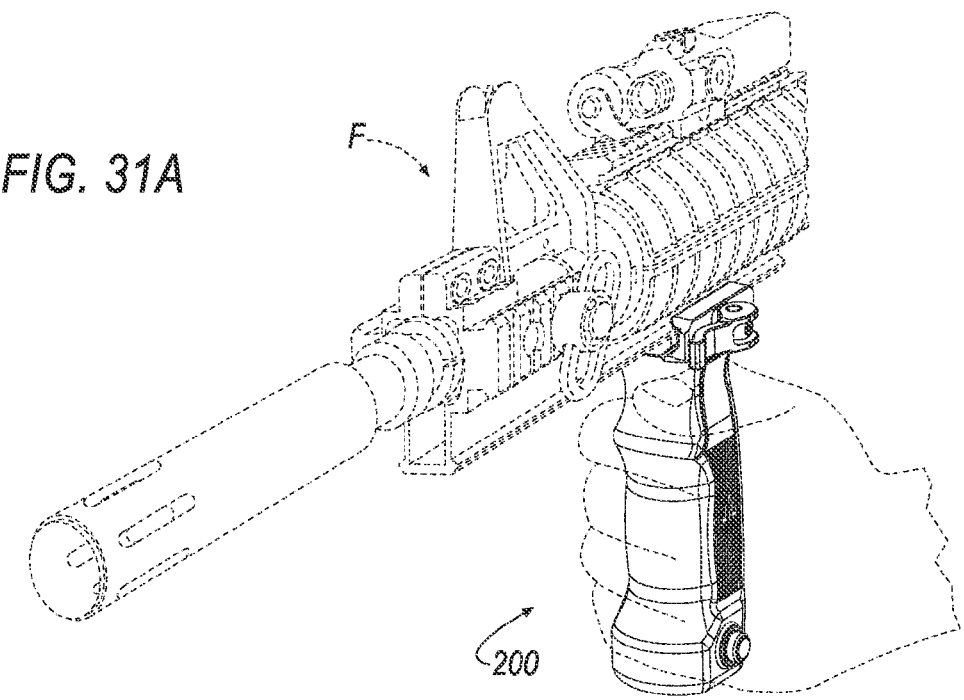
FIG. 31A is a front view of the support apparatus of FIG. 16A attached to a component.
Figure 31B:
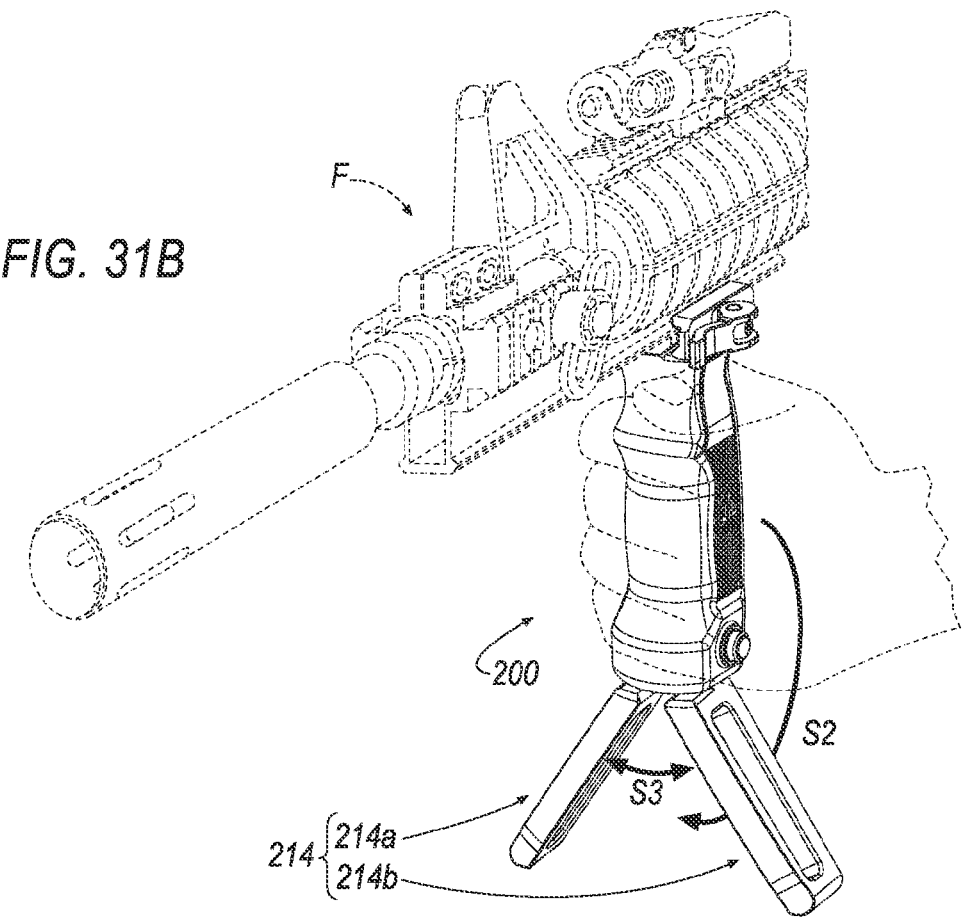
FIG. 31B is a front view of the support apparatus of FIG. 16C attached to a component.

Referring to FIGS. 31A-31B, the support apparatus 200 may be attached to any desirable component, F. An exemplary component, F, may include, for example, a firearm. However, it will be appreciated that the support apparatus 200 is not limited to being attached to a firearm, F. Accordingly, although a firearm, F, is illustrated at FIGS. 31A-31B, the firearm, F, may be replaced by any other component, such as, for example, a camera, telescope, or the like. Accordingly, in some implementations, it will be appreciated that the support apparatus 200 may be attached to and support any desirable non-firearm-component.

Figure 15:
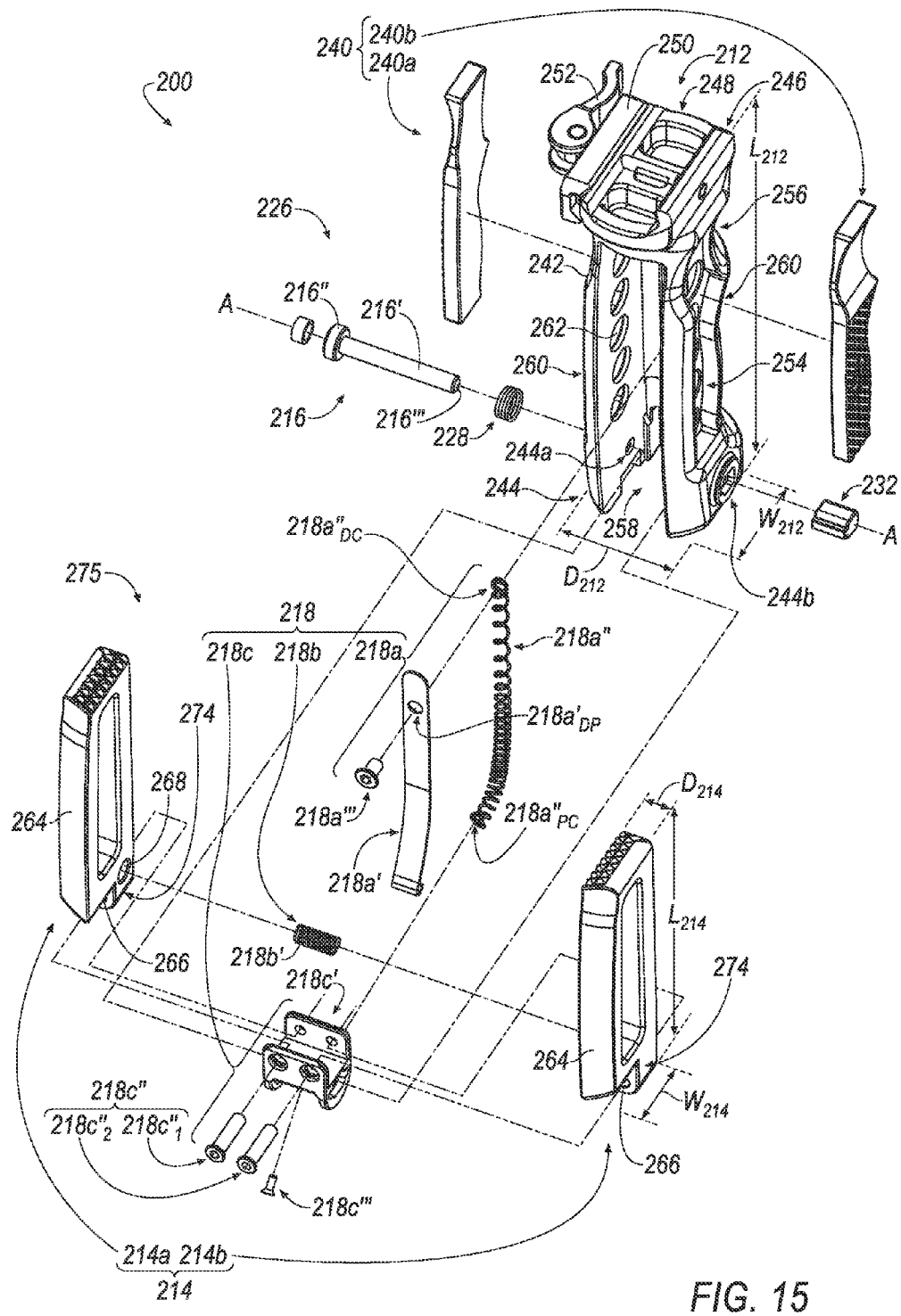
FIG. 15 is an exploded, perspective view of an exemplary support apparatus.

The support apparatus 200 may be designed to include any desirable geometry. For example, as seen in FIG. 15, the support apparatus 200 may be designed to have a length, $L_{212}$, equal to approximately about five-and-a-half inches. Further, for example, the support apparatus 200 may be designed to have a diameter, $D_{212}$, equal to approximately about one-and-a-half inches. Further, for example, the at least one support member 214 may be designed to have a length, $L_{214}$, equal to approximately about three-and-three-quarter inches.

In view of the above-described exemplary geometric configuration, the diameter, $D_{212}$, may permit a user to grasp of the support apparatus 200 in his/her hand; accordingly, if attached to, for example, a component, F, as described above, the support apparatus 200 may be alternatively referred to as a "grip." Further, if the grip is attached to a component, F, in a forwardly orientation (e.g., relative to, for example, a trigger of a firearm, F), the grip may be alternatively referred to as a "fore grip." Yet even further, depending on the stowed/deployed orientation of the at least one support member 214, the support apparatus 200 may be said to include a multi-purpose function as one or more of a: "grip," alone, or, a "pod"-and-"grip," which may be alternatively referred to as a "pod grip."

Although the support apparatus 200 may be designed to have a length, $L_{212}$, equal to approximately about five-and-a-half inches, and, the at least one support member 214 may be designed to have a length, $L_{214}$, equal to approximately about three-and-three-quarter inches to define, in an embodiment, a "pod grip," the support apparatus 200 and the at least one support member 214 are not limited to including the above-described geometric configuration. For example, each of the lengths, $L_{212}$, $L_{214}$, may include geometries equal to approximately about one or more "feet" (i.e., a "foot" of which being equal to twelve inches and "feet" meaning more than one "foot") rather than being equal to approximately about several inches as described above.

Accordingly, depending on the geometric configuration of the support apparatus 200, a user may position himself/herself in any number of shooting positions (e.g., a laying down position, a kneeling position, a seated position, a standing position) relative to the support apparatus 200 and component, F. For example, if the support apparatus 200 is designed with dimensions that are approximately equal to several inches as described above, in a first exemplary implementation, the user may utilize the support apparatus 200 and component, F, in a chest-down (i.e., the user's chest being arranged adjacent a support surface or ground), prone orientation. Alternatively, in another exemplary implementation, if the support apparatus 200 is designed with dimensions that are approximately equal to one or more feet, the user may utilize the support apparatus 200 and component, F, in a non-prone, kneeling orientation relative to a support surface or ground. Alternatively, in another exemplary implementation, if the support apparatus 200 is designed with dimensions that are approximately equal to one or more feet, the user may utilize the support apparatus 200 and component, F, in a seated orientation relative to a support surface or ground. Alternatively, in another exemplary implementation, if the support apparatus 200 is designed with dimensions that are approximately equal to one or more feet, the user may utilize the support apparatus 200 and component, F, in a standing orientation relative to a support surface or ground.

As seen in FIG. 15, the support apparatus 200 includes a plurality of interconnected components 212-240; accordingly, the support apparatus 200 may be alternatively referred to as a "support apparatus assembly." The interconnected components 212-240 that collectively form the support apparatus assembly 200 may include at least, for example: a base member 212 and at least one support member 214. The support apparatus 200 may further include a pivot pin 216 that pivotably-couples the at least one support member 214 to the base member 212 about an axis, A-A, in order to permit the at least one support member 214 to be arranged in a movable orientation to/from, for example, a "stowed orientation" (see, e.g., FIGS. 16A, 17A, 17A', 19, 20A, 20B, 20C, 23A, 24A, 25, 26 31A) and a "deployed orientation" (see, e.g., FIGS. 16C, 17C, 17C', 21, 22A, 22B, 22C, 23B, 24B, 29, 30, 31B). Further, the pivot pin 216 permits the at least one support member 214 to be pivoted about the axis, A-A, relative to the base member 212 in order to be arranged in any one of a plurality of "intermediate orientations" (see, e.g., FIGS. 16B, 17B, 17B', 27, 28) such that the at least one support member 214 is said to be not arranged in either of the "stowed orientation" and the "deployed orientation."

The base member 212 may be alternatively referred to as a "body". The base member 212 may include a length, $L_{212}$, a width, $W_{212}$, and a depth, $D_{212}$. In an embodiment, the base member 212 may include a substantially cylindrical geometry; accordingly, the base member 212 may be alternatively described to include a diameter, $D_{212}$ (i.e., rather than a width, $W_{212}$, and a depth, $D_{212}$).

The at least one support member 214 may be alternatively referred to as "at least one leg." The at least one support member 214 may include a length, $L_{214}$, a width, $W_{214}$, and a depth, $D_{214}$. The at least one support member 214 may include a pair of support members 214 comprising a first support member 214a (or a "left" support member per the view of FIG. 15) and a second support member 214b (or a "right" support member per the view of FIG. 15). The pivot pin 216 may pivotably-couple the first support member 214a and the second support member 214b about the axis, A-A, to the base member 212.

Referring to FIG. 15, the plurality of interconnected components 212-240 that collectively form the support apparatus assembly 200 may further include a support member deployment-assist mechanism 218. The support member deployment-assist mechanism 218 includes a support member pivot urging mechanism 218a and a support member splay urging mechanism 218b and a support member pivot mechanism 218c. In response to application of a force (see, e.g., a force represented by the direction of arrow $F_{226}$ in FIGS. 16A and 17A-17B) to pivot pin 216, the at least one support member deployment-assist mechanism 218 may then be selectively permitted to pivotably-urge (see, e.g., arrows S1, S2 of FIG. 16A) the at least one support member 214 away from the base member 212 in order to change the orientation of the support apparatus 200 from the stowed orientation (see, e.g., FIG. 16A) to the deployed orientation (see, e.g., FIG. 16C).

In an embodiment as seen in FIG. 15, the support member pivot urging mechanism 218a may include a leaf spring 218a', a coil spring 218a" and a fastener 218a'''. In an embodiment, the support member splay urging mechanism 218b may include a coil spring 218b'. In an embodiment, the support member pivot mechanism 218c may include a U-shaped bracket 218c', a pair of support member spaying pins 218c" (including a first support member splaying pin 218c"$_1$ and a second support member splaying pin 218c"$_2$) and a coil spring retention fastener 218c'''.

Figure 17A:
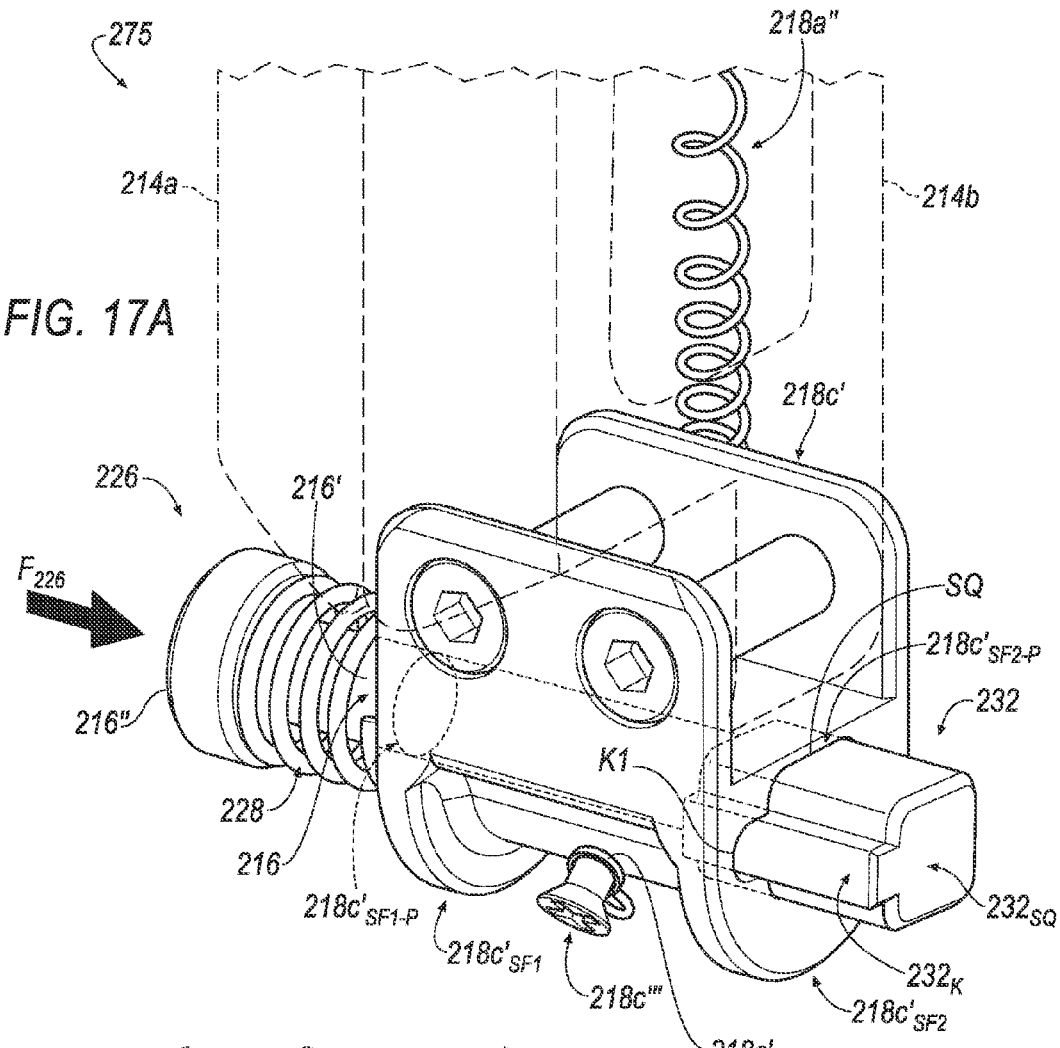
FIG. 17A is a portion of an enlarged view of a subassembly of the support apparatus of FIG. 15 arranged in the stowed orientation of FIG. 16A.
Figure 17A:
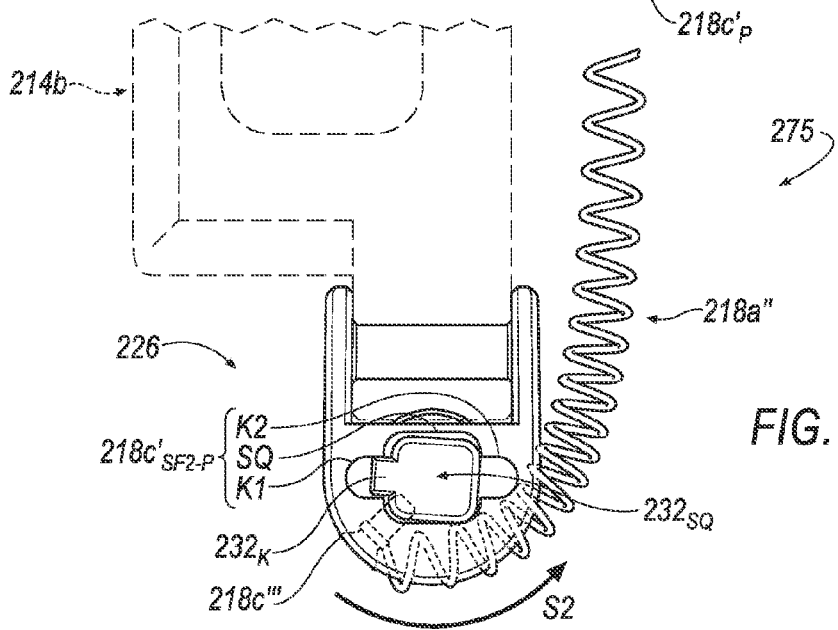

Referring to FIGS. 15, 17A-17A', 17B-17B' and 17C-17C', the plurality of interconnected components 212-240 that collectively form the support apparatus assembly 200 may further include a support member locking mechanism 226. In an embodiment, the support member locking mechanism 226 may include the pivot pin 216, a coil spring 228 and a wedge member 232. As seen in FIG. 15, the support member locking mechanism 226 is joined to the base member 212 by pivotably arranging the pivot pin 216 within first and second passages 244a, 244b extending through the base member 212 and passages 218c'$_{SF1-P}$, 218c'$_{SF2-P}$ (see FIGS. 17A-17C) of the U-shaped bracket 218c' that are axially-aligned with the axis, A-A. Prior to joining the support member locking mechanism 226 to the base member 212, the coil spring 228 may be arranged about a body 216' of the pivot pin 216. Once the pivot pint 216 is extended through the passages 244a, 244b, 218c'$_{SF1-P}$, 218c'$_{SF2-P}$, the coil spring 228 may be arranged between a distal head portion 216" of the pivot pin 216 and an outer side surface 242 of the base member 212.

The wedge member 232 may be joined to or disposed upon the proximal end 216''' of the pivot pin 216. As will be explained in the following disclosure and seen at FIGS. 17A-17C, the wedge member 232 is permitted to be slidably-arranged within one or more of a passage $218_{SF2-P}$ of the U-shaped bracket 218c' and the second passage 244b of the base member 212 in order to: retain the at least one support member 214 in a pivotably-locked-and-stowed orientation (see, e.g., FIGS. 16A and 17A) with respect to the base member 212 for arrangement of the support apparatus 200 in the stowed orientation, or, alternatively, to selectively pivotably-unlock-and-deploy the at least one support member 214 with respect to the base member 212 for arrangement of the support apparatus 200 in a deployed orientation (see, e.g., FIGS. 16C and 17C).

With continued reference to FIG. 15, the plurality of interconnected components 212-240 that collectively form the support apparatus assembly 200 may further include at least one covering member 240. The at least one covering member 240 may include a pair of covering members 240 comprising a first covering member 240a (or a "left" covering member per the view of FIG. 15) and a second covering member 240b (or a "right" covering member per the view of FIG. 15).

The Base Member 212

Referring to FIG. 15, the base member 212 includes an outer side surface 242 that extends between a lower end surface 244 and an upper end surface 246. The upper end surface 246 partially forms a mounting channel 248. A clamp 250 that is joined to the base member 212 proximate the upper end surface 246 also partially forms the mounting channel 248.

The mounting channel 248 may include any geometric profile, such as, for example: a dovetail profile, a Picatinny profile or the like. The component, F, may include a mounting member that includes a geometric profile that corresponds to the geometric profile of the mounting channel 248 for the purpose of joining the support apparatus 200 to the component, F.

The clamp 250 is movable relative to the base member 212 by pivoting a cam lever 252 that is rotatably-joined to the clamp 250. The clamp 250 and cam lever 252 are described in U.S. Provisional Patent Application Ser. No. 61/322,200 filed on Apr. 8, 2010 and U.S. Non-Provisional patent application Ser. No. 13/074,397 filed on Mar. 29, 2011 the contents of which are hereby incorporated by reference in their entirety.

The outer side surface 242 forms the base member 212 to include a substantially cylindrical geometry. The substantially cylindrical geometry of the base member 212 that is formed by the outer side surface 242 may be interrupted by one or more of/a plurality of depressions. The plurality of depressions may serve a variety of purposes, such as, for example: aesthetic purposes, frictional purposes, weight-reduction purposes, component stowage purposes and the like. In some instances, as will be described below, two or more depressions of the plurality of depressions may extend into the base member 212 such that they intersect in order to permit some of the plurality of interconnected components 212-240 disposed therein to contact/engage each other.

Referring initially to FIG. 15, the plurality of depressions may include a plurality of pockets 254. In an embodiment, the plurality of pockets 254 may include a first pocket and a second pocket that respectively receive and frictionally retain the first covering member 240a and the second covering member 240b. In some implementations, the base member 212 may be formed from a first material (e.g., metal, plastic or the like), and the first and second covering members 240a, 240b may be formed from a second material (e.g., rubber) that is different from the first material. Accordingly, if, for example, the first and second covering members 240a, 240b are formed from a rubber material, insertion of the first and second covering members 240a, 240b within the pockets 254 may increase friction of the support apparatus 200 should a user grasp the base member 212 with his/her hand.

Referring to FIG. 15, the plurality of depressions may include at least one digit groove 256. The at least one digit groove 256 may correspond to a suggested location for placing at least one of a user's digits (i.e., fingers) upon gripping the base member 212 with his/her hand. The plurality of digit grooves 256 may include, for example, three digit grooves. The three digit grooves may correspond to a suggested location of, for example, a user's: index finger, middle finger and ring finger.

Referring to FIG. 15, the plurality of depressions may include a support-member-receiving channel 258. The support-member-receiving channel 258 includes a length, width and depth that substantially corresponds to the length, $L_{214}$, the width, $W_{214}$, and the depth, $D_{214}$, of the at least one support member 214. In an embodiment, the support-member-receiving channel 258 is formed in the outer side surface 242 of the base member 212 and extends along approximately about 80%-to-90% of the length, $L_{212}$, of the base member 212 from the lower end surface 244 toward the upper end surface 246 in order to provide the function of stowing the at least one support member 214.

In an embodiment, the support-member-receiving channel 258 is centrally arranged and extends into a rear surface of the base member 212 (i.e., the at least one digit groove 256 may be formed in a front flange surface of the base member 212 such that as user's finger's may grasp the front flange surface of the base member 212 as seen in FIGS. 31A-31B in order to permit the first and second support members 214a, 214b to deploy from the rear or back of the base member 212). The base member 212 may also include left and right side flanges 260 that, in combination with the front flange surface defining the at least one digit groove 256, forms the support-member-receiving channel 258. The left and right side flanges 260 may extend along a portion of the length, $L_{212}$, of the base member 212. The spine flange 260 may include a plurality of weight-reducing passages 262; the weight-reducing passages 262 serve the purpose in the elimination of material from the base member 212 in order to not only reduce the overall weight of the base member 212 but also to reduce the amount of material called for in the manufacture of the base member 212.

Functionally, the support-member-receiving channel 258 accommodates stowage of both of the first and second support members 214a, 214b when the first and second support members 214a, 214b are arranged in the stowed orientation (see, e.g., FIG. 16A) relative to the base member 212. As seen in, for example, FIG. 16A, when the first and second support members 214a, 214b are nested within the support-member-receiving channel 258 (i.e., the first and second support members 214a, 214b are said to be arranged in the stowed orientation relative to the base member 212), an outer surface 264 of the first and second support members 214a, 214b that extends along substantially all of the length, $L_{214}$, of the first and second support members 214a, 214b is substantially aligned with the outer side surface 242 of the base member 212. Accordingly, when the first and second support members 214a, 214b are arranged in the stowed orientation as described above, the support-member-receiving channel 258 may be said to be substantially "filled" by the first and second support members 214a, 214b in order to give the appearance that the base member 212 is not interrupted by a depression at least at the location of the support-member-receiving channel 258.

The at Least One Support Member 214

Referring to FIGS. 15 and 18A-18C, the at least one support member 214 may be formed to include a plurality of depressions/slots and passages 266-268. For example, in an embodiment, the at least one support member 214 includes: (1) a pin-receiving passage 266 that extends entirely through the width, $W_{214}$, of the at least one support member 214 for receiving one of the first support member splaying pin $218c''_1$ and the second support member splaying pin $218c''_2$, and (2) a deployment-assist mechanism receiving passage 268 that extends at least partially through the depth, $D_{214}$, of the at least one support member 214 for supportably-receiving the coil spring 218b' of the support member splay urging mechanism 218b.

Subassembly 275

Referring to FIGS. 15 and 18A-18C, the at least one support member 214 is connected to the support member deployment-assist mechanism 218 to form a subassembly 275. The subassembly 275 is then pivotably-connected to the base member 212 about the axis, A-A (see FIG. 15), by inserting the pivot pint 216 through the passages 244a, 244b, $218c'_{SF1-P}$, $218c'_{SF2-P}$, as described above.

Figure 17B:
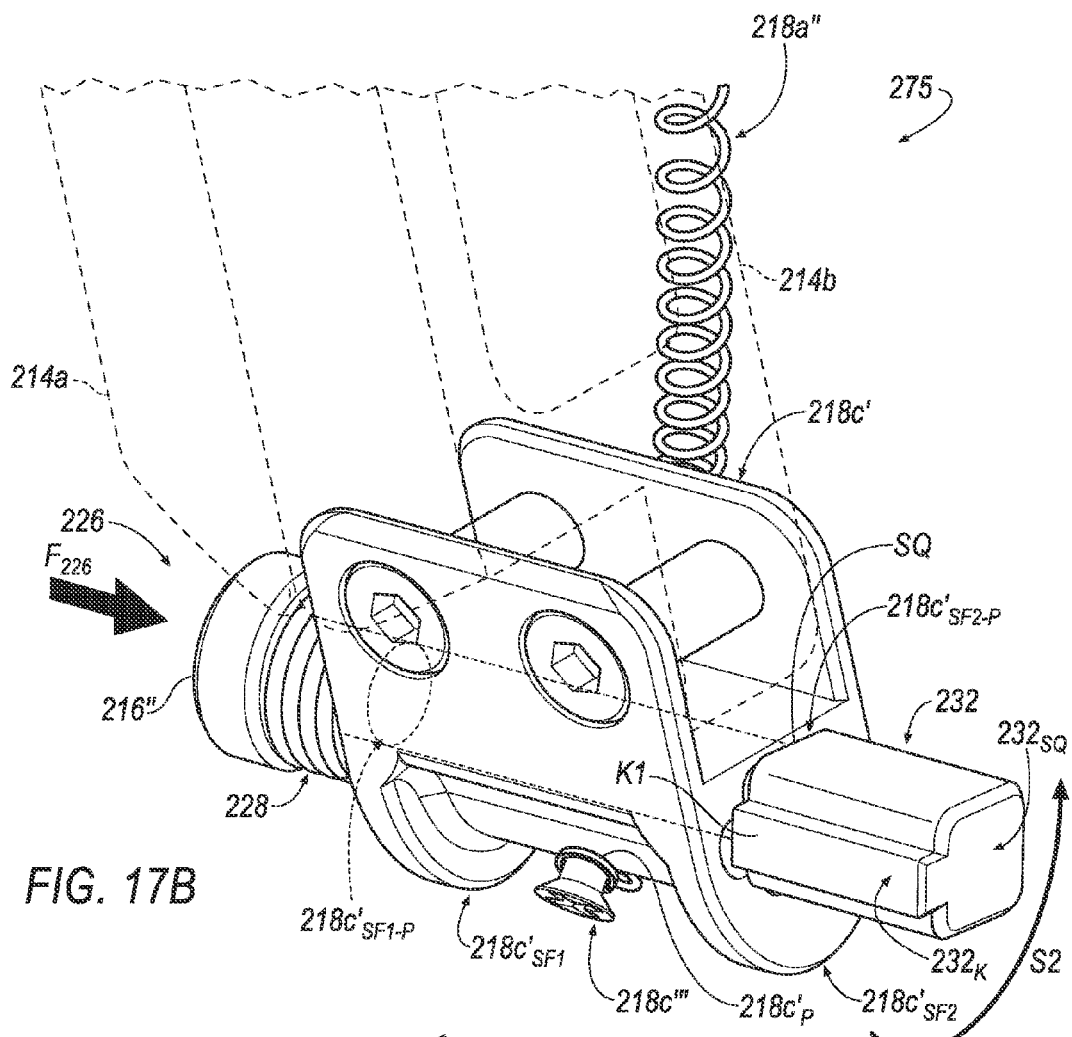
FIG. 17B is a portion of an enlarged view of a subassembly of the support apparatus of FIG. 15 arranged in the intermediate orientation of FIG. 16B.
Figure 17B:
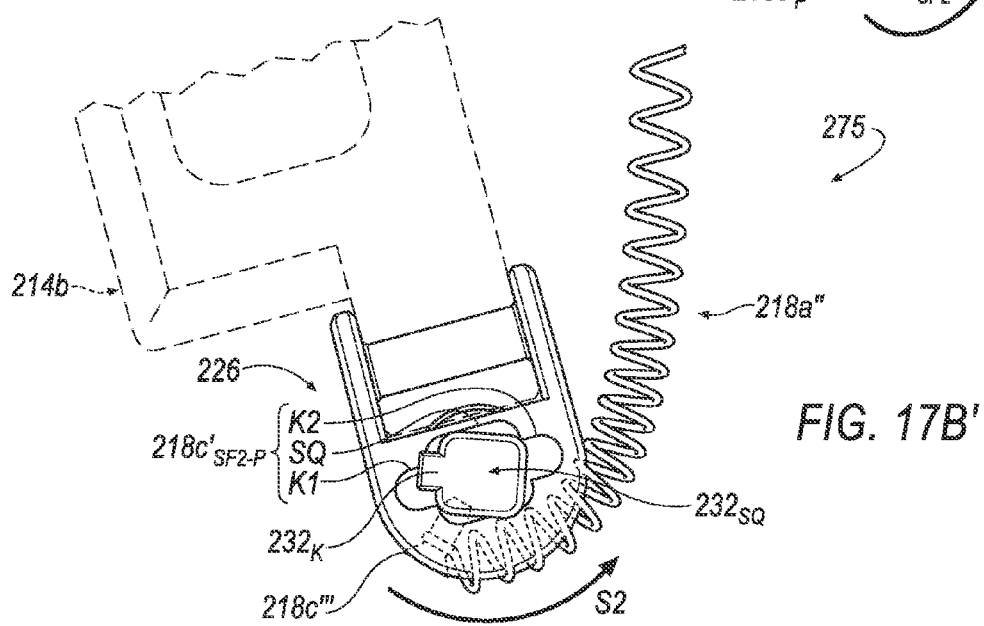
Figure 18A:
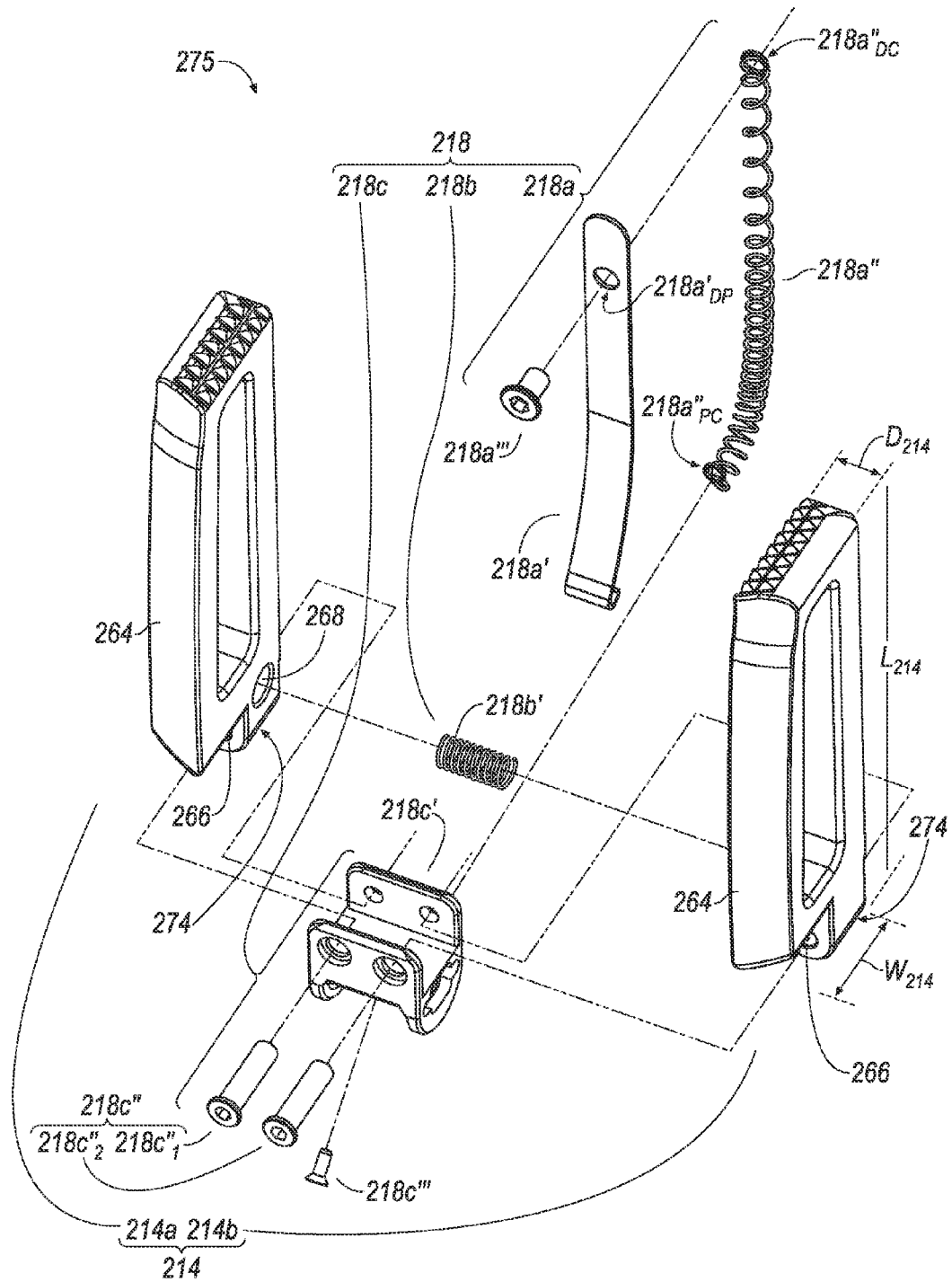
FIG. 18A is an exploded view of the subassembly of FIGS. 17A-17C.
Figure 18B:
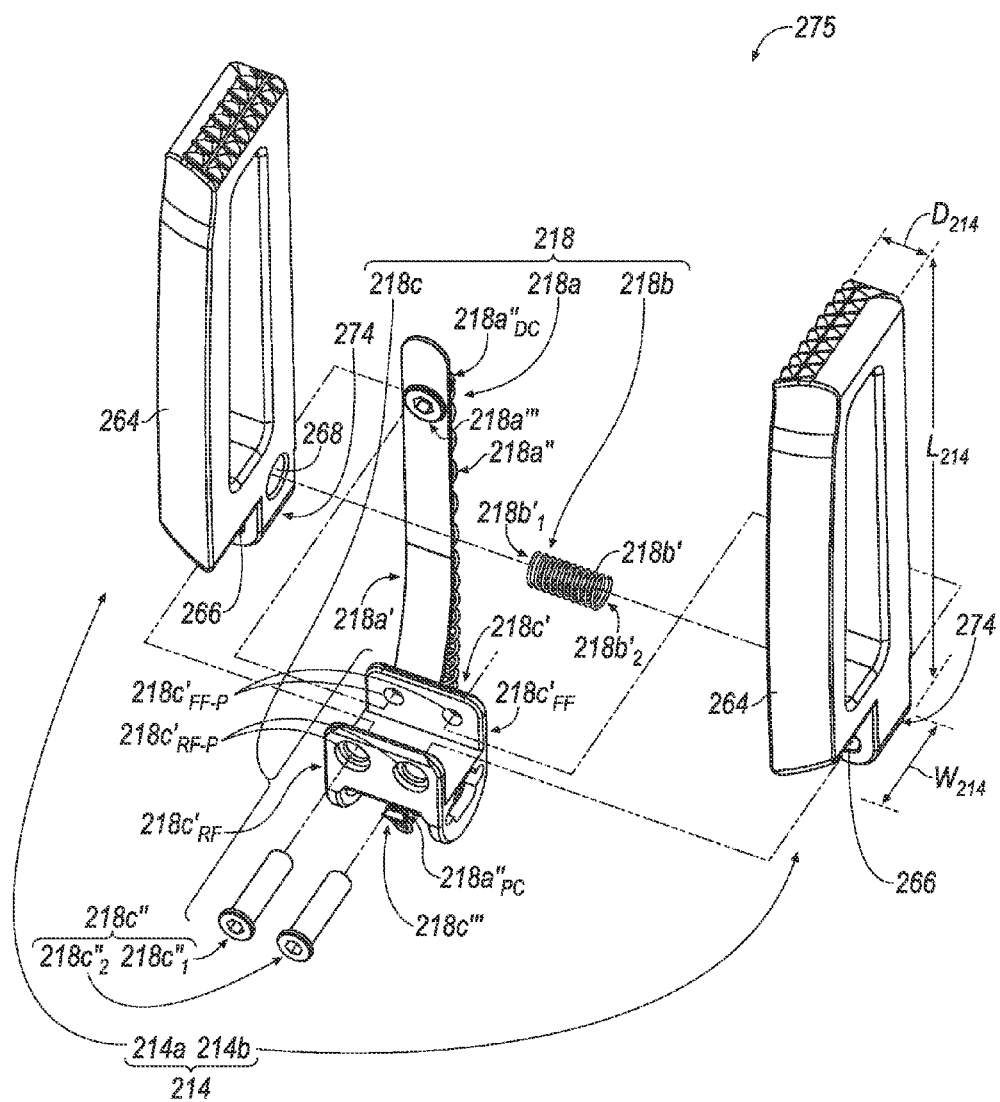
FIG. 18B is a partially assembled view of the subassembly of FIG. 18A.

As seen in FIGS. 18A-18B, formation of the subassembly 275 firstly includes assembling the support member deployment-assist mechanism 218. Firstly, the support member pivot urging mechanism 218a is assembled by joining a distal end of the leaf spring 218a' to a distal end of the coil spring 218a" with the fastener 218a'''; in an example, the fastener 218a''' may be inserted through a passage $218a'_{DP}$ formed in the distal end of the leaf spring 218a' and then through a distal coil $218a''_{DC}$ of the coil spring 218a". Then, secondly, the coil spring retention fastener 218c''' may be inserted through a passage $218c'_P$ (see FIGS. 17A, 17B) formed by the U-shaped bracket 218c'; then, once the coil spring retention fastener 218c''' is inserted through the passage $218c'_P$ formed by the U-shaped bracket 218c', a proximal coil $218a''_{PC}$ of the coil spring 218a" is attached to (e.g., hooked about) a portion of the coil spring retention fastener 218C''' that extends beyond the passage $218c'_P$ formed by the U-shaped bracket 218c'.

Figure 18C:
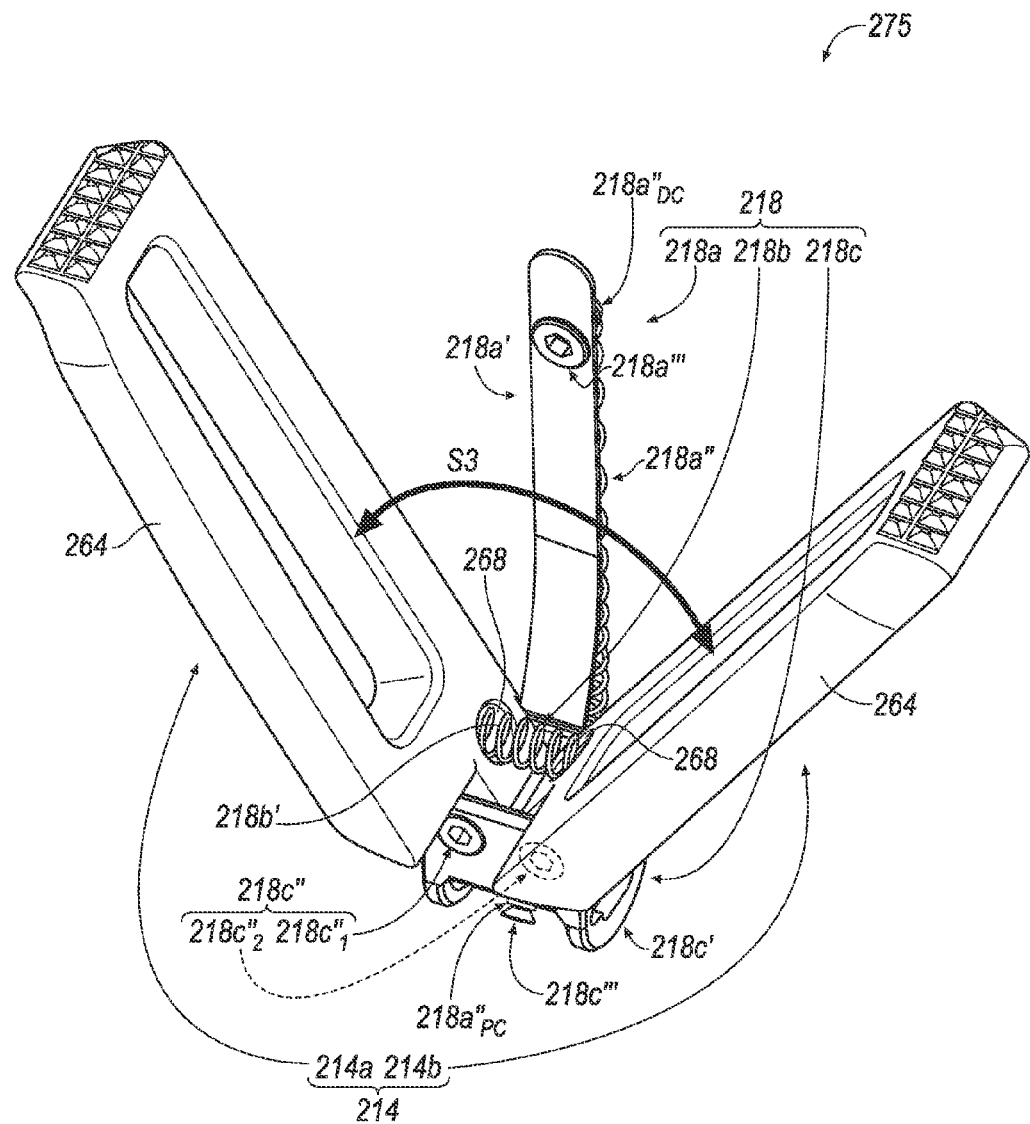
FIG. 18C is a partially assembled view of the subassembly of FIG. 18A.

Next, as seen in FIGS. 18B-18C, the first support member 214a and the second support member 214b are joined to the support member deployment-assist mechanism 218. Firstly, as seen in FIG. 18B, a first end $218b'_1$ of the coil spring 218b' is arranged within the deployment-assist mechanism receiving passage 268 of the first support member 214a and a second end 218b'$_2$ of the coil spring 218b' is arranged within the deployment-assist mechanism receiving passage 268 of the second support member 214b. Secondly, the first support member splaying pin 218c''$_1$ connects the first support member 214a to the U-shaped bracket 218c' and the second support member splaying pin 218c''$_2$ connects the second support member 214b to the U-shaped bracket 218c'. In an embodiment, the U-shaped bracket 218c' includes a rear flange 218c'$_{RF}$ and a front flange 218c'$_{FF}$. Each of the rear flange 218c'$_{RF}$ and the front flange 218c'$_{FF}$ includes a pair of passages 218c'$_{RF-P}$, 218c'$_{FF-P}$ for permitting insertion of the first support member splaying pin 218c''$_1$ and the second support member splaying pin 218c''$_2$. Upon axially-aligning the pin-receiving passage 266 of each of the first and second support member 214a, 214b with the pair of passages 218c'$_{RF-P}$, 218c'$_{FF-P}$ of the rear flange 218c'$_{RF}$ and the front flange 218c'$_{FF}$ of the U-shaped bracket 218c', the first support member splaying pin 218c''$_1$ and the second support member splaying pin 218c''$_2$ may be inserted through the axially-aligned passages 218c'$_{RF-P}$, 218c'$_{FF-P}$, 266 for permitting the first and second support members 214a 214b to be pivotably-coupled (see FIG. 18C) to the U-shaped bracket 218c' such that the first and second support members 214a, 214b may be: retained together (see FIG. 16A when the first and second support members 214a, 214b are arranged in the stowed orientation thereby compressing the coil spring 218b' within the deployment-assist mechanism receiving passage 268 of each of the first and second deployment members 214a, 214b), or, (2) pivotably-splayed apart according to the arrow, S3, as seen in FIG. 18C as a result of the coil spring 218b' expanding and pushing the first and second support members 214a, 214b away from one another.

The Support Member Locking Mechanism 226

Referring to FIG. 15, once the first and second support members 214a, 214b are attached to the U-shaped bracket 218c' as described above at FIGS. 18A-18C to form the sub-assembly 275, the sub-assembly 275 may be attached to the base member 212. The attachment of the subassembly 275 to the base member 212 may include further extending the fastener 218a''' beyond the distal coil 218a''$_{DC}$ of the coil spring 218a'' such that the fastener 218a''' may be registered within and connected to a passage 270 (see, e.g., FIG. 20A) arranged within the support-member-receiving channel 258 that is formed by the base member 212 to thereby join the support member pivot urging mechanism 218a directly to the base member 212. Additionally, the subassembly 275 may be joined to the base member 212 by the support member locking mechanism 226 according to the following embodiment.

Figure 16A:
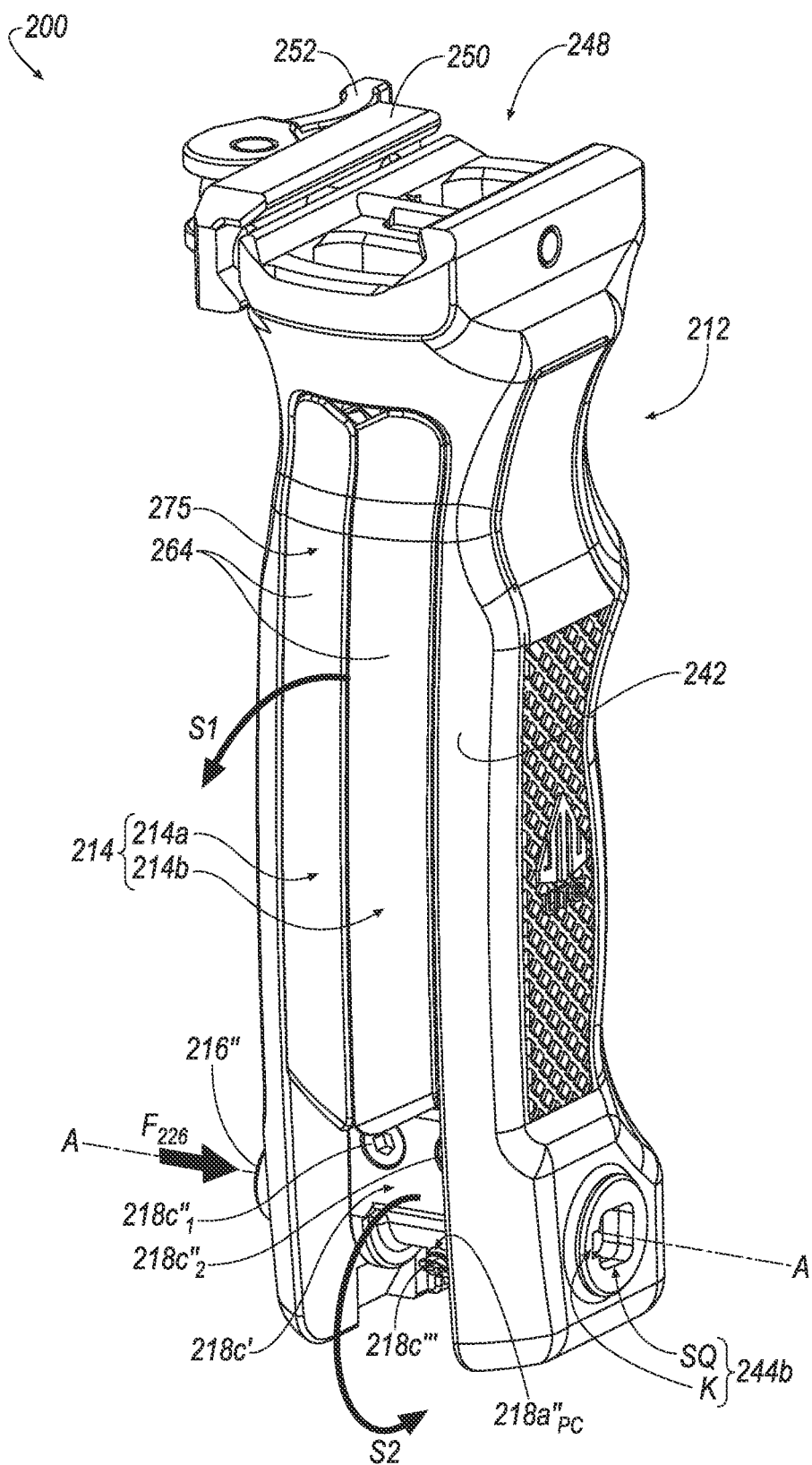
FIG. 16A is an assembled, perspective view of the support apparatus of FIG. 15 arranged in a stowed orientation.
Figure 16B:
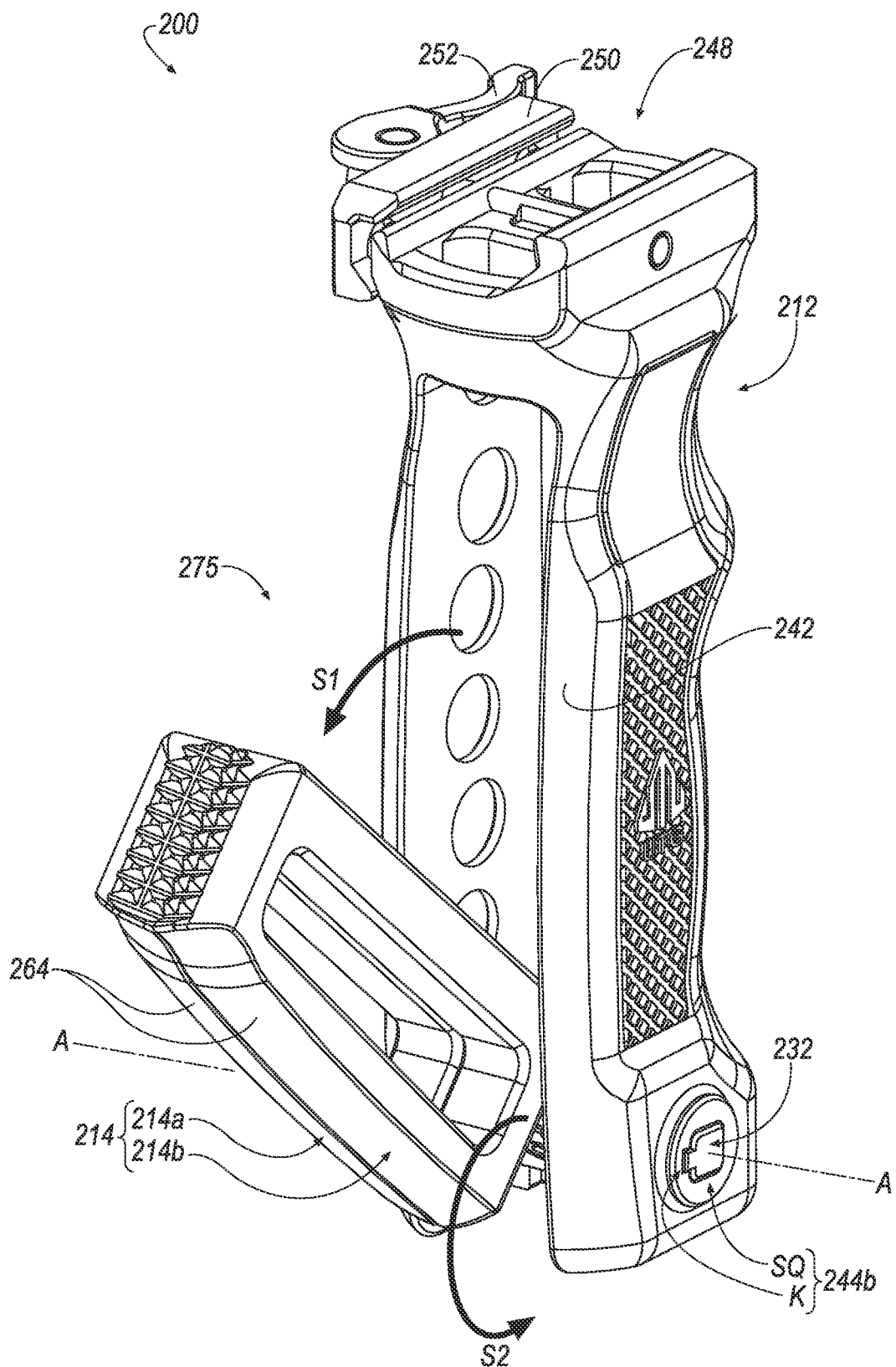
FIG. 16B is an assembled, perspective view of the support apparatus of FIG. 15 arranged in an intermediate orientation.
Figure 16C:
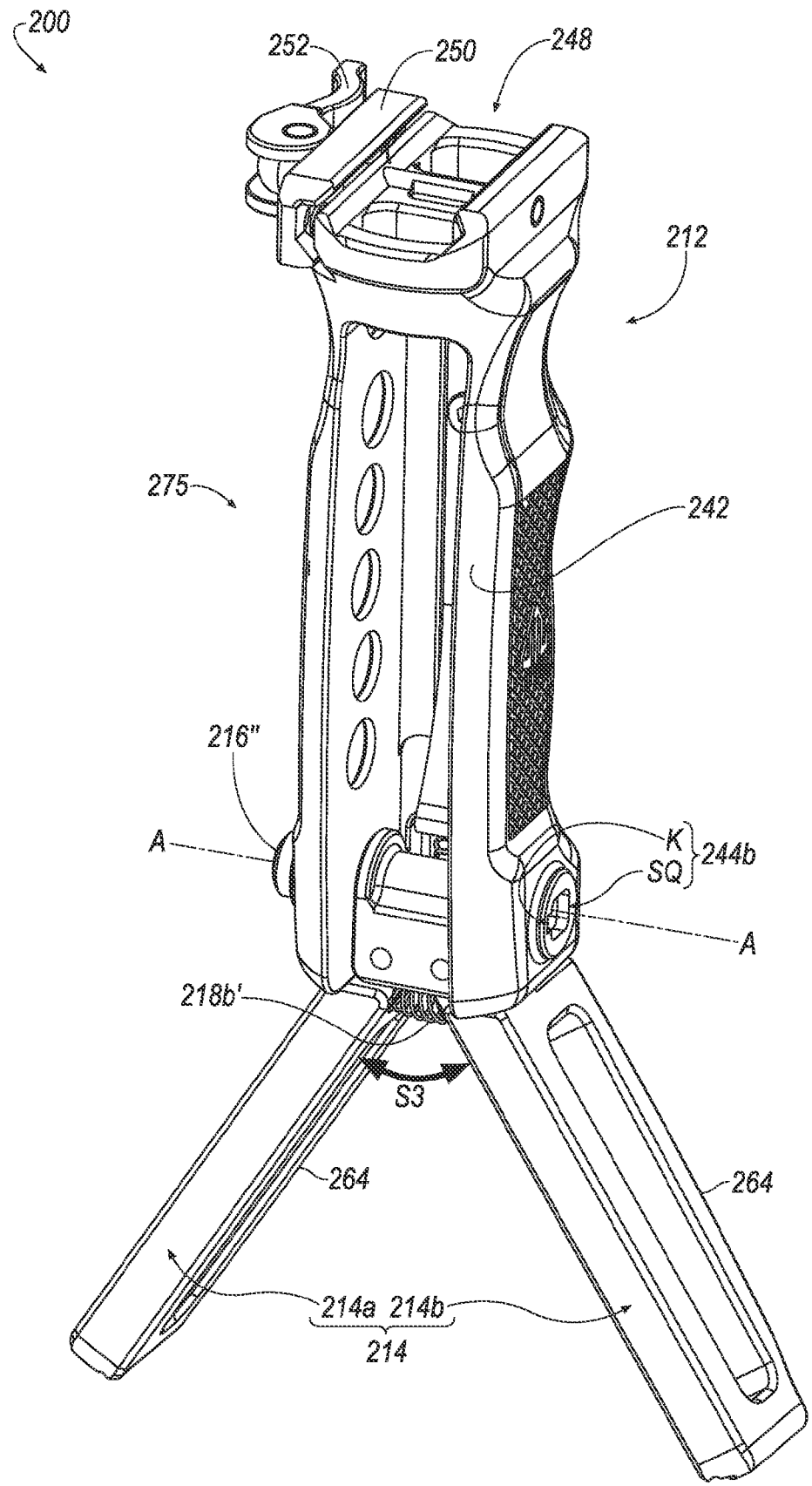
FIG. 16C is an assembled, perspective view of the support apparatus of FIG. 15 arranged in a deployed orientation.

With reference to FIGS. 17A-17C, upon arranging the subassembly 275 within the support-member-receiving channel 258 as described above, the support member locking mechanism 226 may pivotably join the subassembly 275 to the base member 212 about the axis, A-A (in order to permit the first and second support members 214a, 214b to be arranged in one of a stowed orientation of FIGS. 16A, 17A and a deployed orientation of FIGS. 16C, 17C). In an implementation, U-shaped bracket 218c' may include a first side flange 218c'$_{SF1}$ and a second side flange 218c'$_{SF2}$ each including a passage 218c'$_{SF1-P}$, 218c'$_{SF2-P}$ that are axially-aligned with the axis, A-A. Accordingly, by arranging the subassembly 275 within the support member-receiving channel 258, and axially-aligning (about the axis, A-A) the passages 218c'$_{SF1-P}$, 218c'$_{SF2-P}$ of the U-shaped bracket 218c' with the first and second passages 244a, 244b extending through the base member 212, the pivot pin 216 may be inserted through the passages 218c'$_{SF1-P}$, 218c'$_{SF2-P}$, 244a, 244b in order to pivotably-couple the subassembly 275 to the base member 212. As will be further described in the following disclosure, application of a force in the direction of arrow, $F_{226}$, to the distal head portion 216'' of the pivot pin 216 may permit the coil spring 228 to be compressed (see FIG. 17B) adjacent the outer side surface 242 of the base member 212 while also permitting the pivot pin 216 to slidably move within the passages 218c'$_{SF1-P}$, 244a according to the direction of the arrow, $F_{226}$, while the wedge member 232 also slidably-moves within the passages 218c'$_{SF2-P}$, 244b according to the direction of the arrow, $F_{226}$; conversely, upon reliving the applied force, $F_{226}$, the coil spring 228 is permitted to expand (see FIG. 17C), thereby causing the pivot pin 216 and wedge member 232 to slidably move within the passages 218c'$_{SF1-P}$, 218C'$_{SF2-P}$, 244a, 244b in a direction (see arrow, $F_{226}$', of FIG. 17C) opposite to that of the direction of the arrow, $F_{226}$.

In an implementation as seen in FIG. 17A, the passages 218c'$_{SF1-P}$ and 244a may include a substantially circular geometry having a diameter that is about the same as but slightly larger than the diameter formed by the body 216' of the pivot pin 216. The passage 244b may include a geometry that conforms to but is slightly larger than the wedge member 232; as seen in, for example, FIG. 16A, the wedge member 232 and passage 244b may correspondingly include a square-shape geometry, SQ, that is in communication with a key portion geometry, K. Because the subassembly 275 is permitted to pivot approximately 180° relative to the base member 212, as seen in, for example, FIGS. 17A', 17B', 17C', the passage 218c'$_{SF2-P}$ of the U-shaped bracket 218c' is formed to include a geometry substantially similar to the passage 244b with the exception that the square-shape geometry, SQ, may be in communication with diametrically-opposed first and second key portion geometries, K1 and K2; accordingly, when the subassembly 275 is arranged in the stowed orientation of FIG. 17A', the first key portion, K1, of the passage 218c'$_{SF2-P}$ of the U-shaped bracket 218c' is aligned with the key portion, K, of the passage 244b, and, conversely, when the subassembly 275 is arranged in the deployed orientation of FIG. 17C', the second key portion, K2, of the passage 218c'$_{SF2-P}$ of the U-shaped bracket 218c' is aligned with the key portion, K, of the passage 244b.

Method for Operating the Support Member Locking Mechanism 226

As described above, the at least one support member 214 may be arranged in a movable orientation to/from, for example, a "stowed orientation" (see, e.g., FIG. 16A), a "deployed orientation" (see, e.g., FIG. 16C) and any one of a plurality of "intermediate orientations" (see, e.g., FIG. 16B) relative the base member 212. Movement of the at least one support member 214 from the stowed orientation to the deployed orientation occurs in response to actuation (by way of the applied force, $F_{226}$) of the support member locking mechanism 226.

As seen in FIGS. 16A and 17A, the subassembly 275 is shown initially arranged in a locked and stowed orientation relative to the base member 212; in order to achieve the locked orientation (in order to prevent the subassembly 275 to pivot relative to the base member 212), a projection 232$_K$ (see FIG. 17A) of the wedge member 232 extending from a body portion 232$_{SQ}$ (see FIG. 17A) of the wedge member 232 is arranged within: (1) the first key portion, K1, of the passage 218c'$_{SF2-P}$ of the U-shaped bracket 218c' and (2) the key portion, K, of the passage 244b formed by the base member 212.

While arranged in the locked orientation, the support member pivot urging mechanism 218a imparts several spring forces, S1-S2 (see FIG. 16A), to the subassembly 275 in order to urge the subassembly 275 to pivot away from the base member 212 upon actuating the support member locking mechanism 226. In an example, the spring force, S1, may be imparted by the leaf spring 218a' in order to urge or "kick" the first and second support members 214a, 214b of the subassembly 275 such that the subassembly 275 may pivot about the axis, A-A, extending through the pivot pin 216 and passages $218c'_{SF1-P}$, $218c'_{SF2-P}$, 244a, 244b. Additionally, the spring force, S2, may be imparted by the coil spring 218a" in order to pivotably pull or pivotably tug on the coil spring retention fastener 218c''', which also contributes to pivoting the subassembly 275 about the axis, A-A.

Actuation of the support member locking mechanism 226 is ultimately carried out by applying the force in the direction of the arrow, $F_{226}$, to the distal head portion 216" of the pivot pin 216. In some examples, the force, $F_{226}$, may be applied by a user by pressing the distal head portion 216" of the pivot pin 216 with a finger or palm.

As seen in FIG. 17B, as a result of the application of the force in the direction of the arrow, $F_{226}$, the wedge member 232 is selectively arranged beyond the passage $218c'_{SF2-P}$ of the U-shaped bracket 218c' such that the projection $232_K$ of the wedge member 232 is no longer arranged within the first key portion, K1, of the passage $218c'_{SF2-P}$ of the U-shaped bracket 218c'. When the projection $232_K$ of the wedge member 232 is concurrently arranged within the first key portion, K1, and the key portion K, the wedge member 232 prevents the subassembly 275 to pivot about the axis, A-A; accordingly, as a result of the projection $232_K$ of the wedge member 232 no longer being arranged within the first key portion, K1, the body 216' of the pivot pin 216, which includes a circular geometry that is free of an interfering portion (such as, e.g., the projection $232_K$ of the wedge member 232) permits the subassembly 275 to pivot about the axis, A-A. The pivoting of the subassembly 275 about the axis, A-A, is automatically conducted as a result of: (1) the wedge member 232 is selectively arranged beyond the passage $218c'_{SF2-P}$ of the U-shaped bracket 218c' and (2) the spring forces, S1-S2, being released by the support member pivot urging mechanism 218a.

Referring to FIGS. 17A', 17B' and 17C', as the subassembly 275 is pivoted about the axis, A-A, the U-shaped bracket 218c' transitions from a stowed/"right-side-up orientation" (see FIG. 17A') to a deployed/"upside-down orientation" (see FIG. 17C'). Accordingly, when the subassembly 275 is arranged in the deployed/"upside-down orientation," the projection $232_K$ of the wedge member 232 is aligned with the second key portion, K2, defined by the passage $218_{SF2-P}$ of the U-shaped bracket 218c'. Referring to FIGS. 17C and 17C', upon aligning the projection $232_K$ of the wedge member 232 with the second key portion, K2, defined by the passage $218_{SF2-P}$ of the U-shaped bracket 218c', the coil spring 228 may exert a force, $F_{226}'$, in direction opposite the direction of the arrow of the user-applied force, $F_{226}$, in order to arrange the projection $232_K$ of the wedge member 232 within the second key portion, K2, defined by the passage $218c'_{SF2-P}$ of the U-shaped bracket 218c' to thereby lock the subassembly 275 in the deployed/"upside-down orientation."

Referring to FIG. 17C, when the subassembly 275 is arranged in the deployed/"upside-down orientation" the coil spring 218b' of the support member splay urging mechanism 218b applies a spring force, S3, to the first and second support members 214a, 214b. The spring force, S3, causes the first and second support members 214a, 214b to splay/spread apart. Once the first and second support members 214a, 214b are splayed apart, the support apparatus 200 is said to be arranged in the deployed orientation.

Figure 20B:
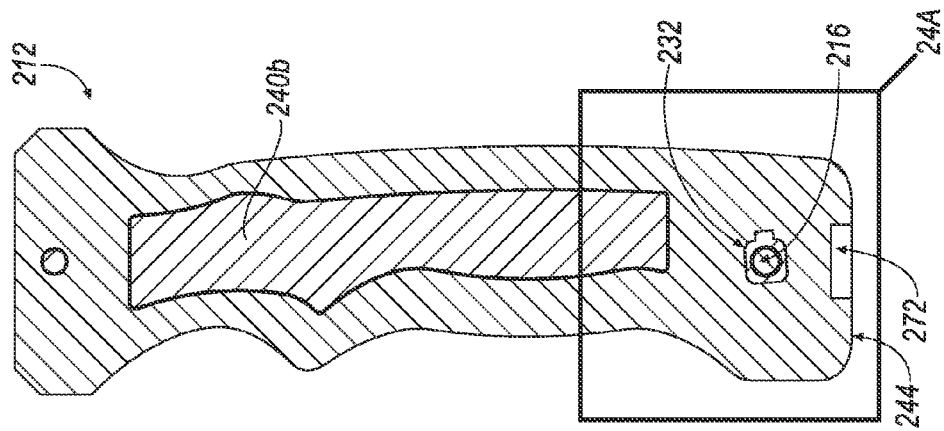
FIG. 20B is a cross-sectional view of the support apparatus according to line 20B-20B of FIG. 19.
Figure 20A:
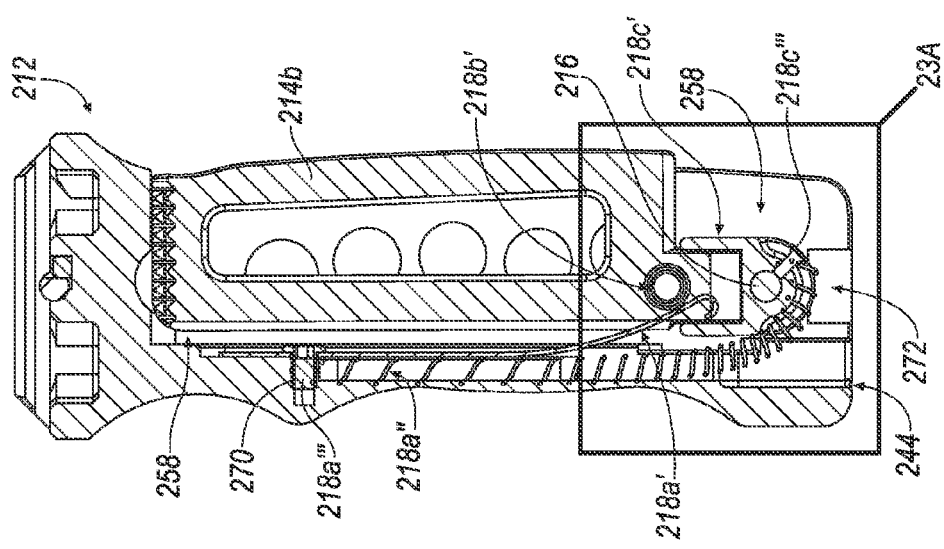
FIG. 20A is a cross-sectional view of the support apparatus according to line 20A-20A of FIG. 19.
Figure 19:
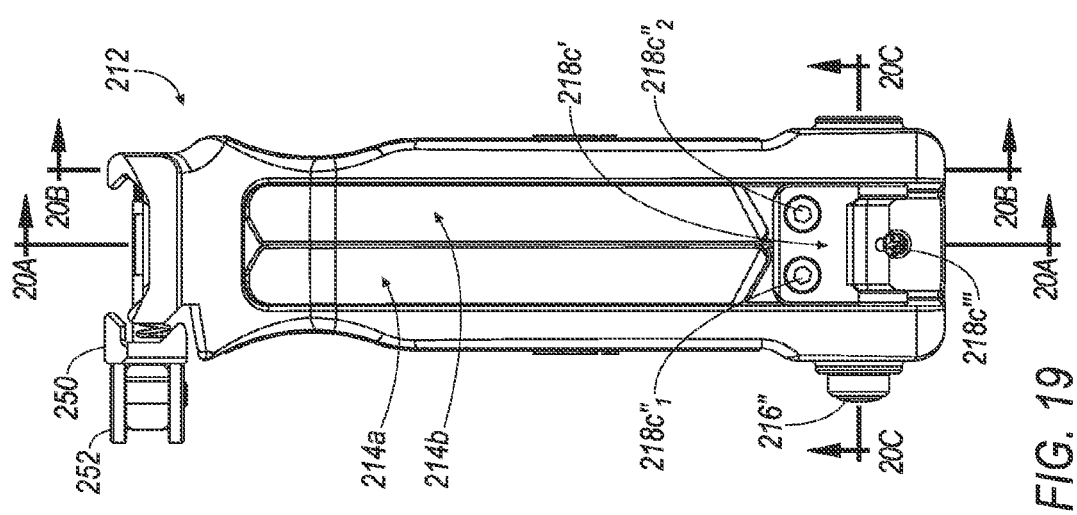
FIG. 19 is a rear view of the support apparatus of FIG. 16A when arranged in the stowed orientation.
Figure 24A:
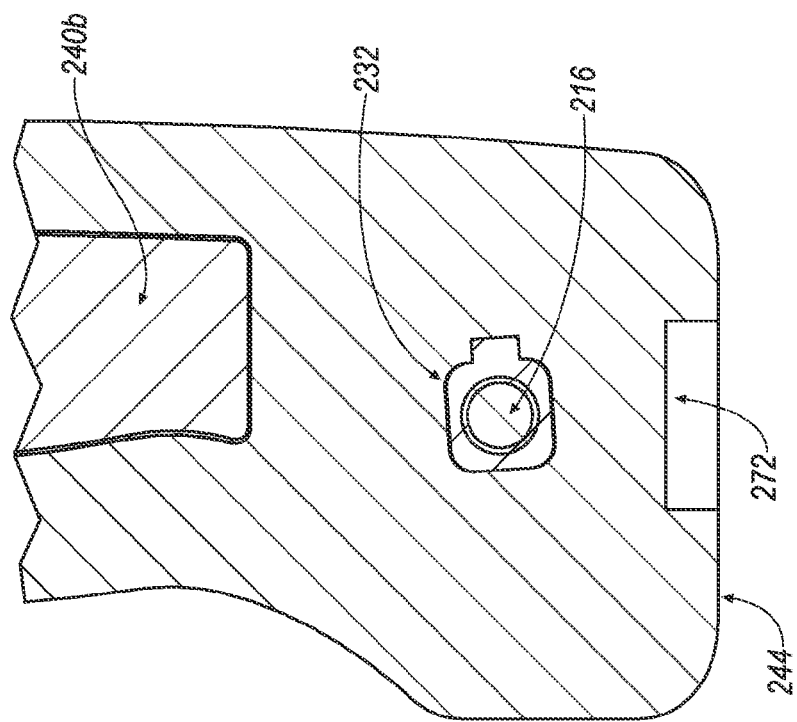
FIG. 24A is an enlarged view of the support apparatus according to line 24A of FIG. 20B.
Figure 23A:
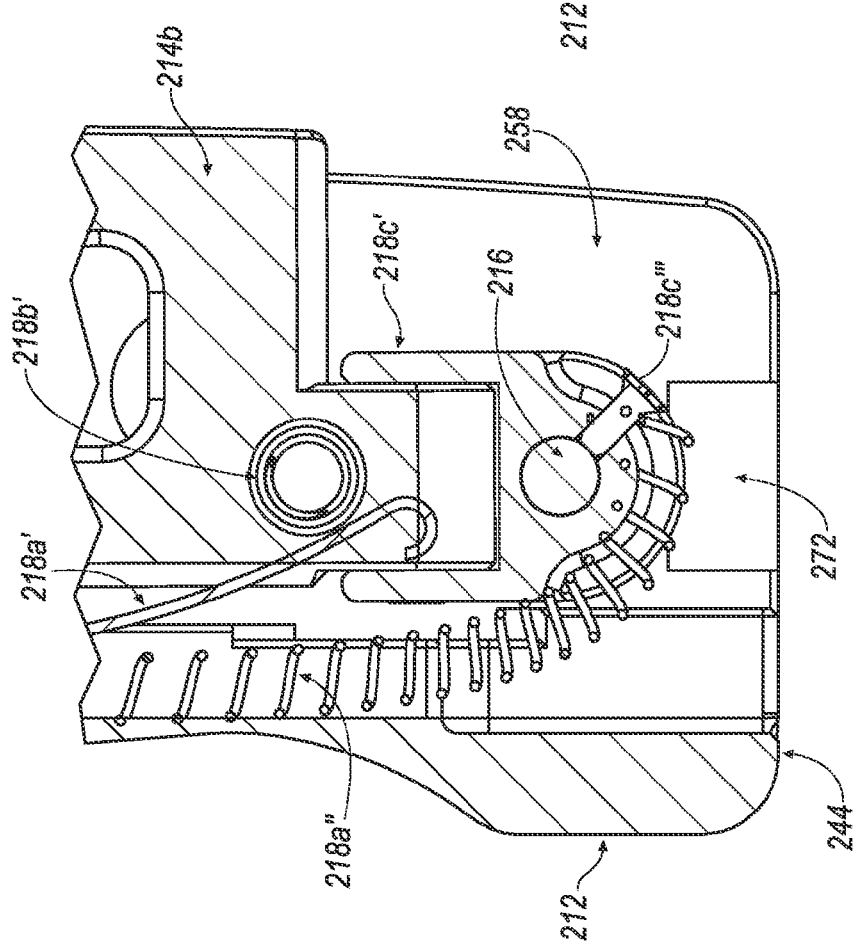
FIG. 23A is an enlarged view of the support apparatus according to line 23A of FIG. 20A.
Figure 24B:
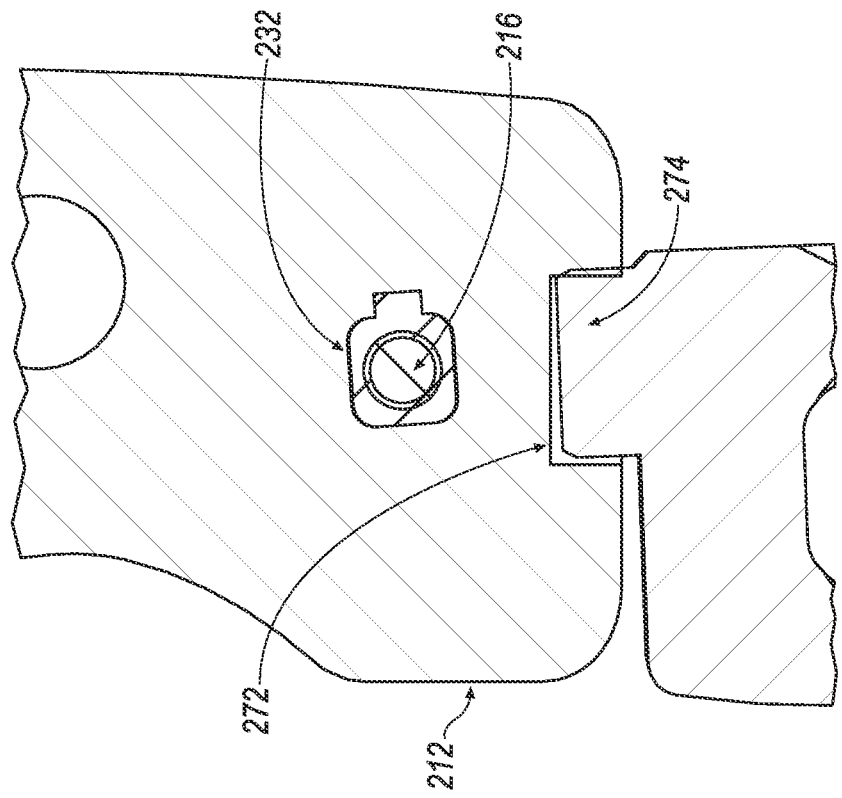
FIG. 24B is an enlarged view of the support apparatus according to line 24B of FIG. 22B.
Figure 23B:
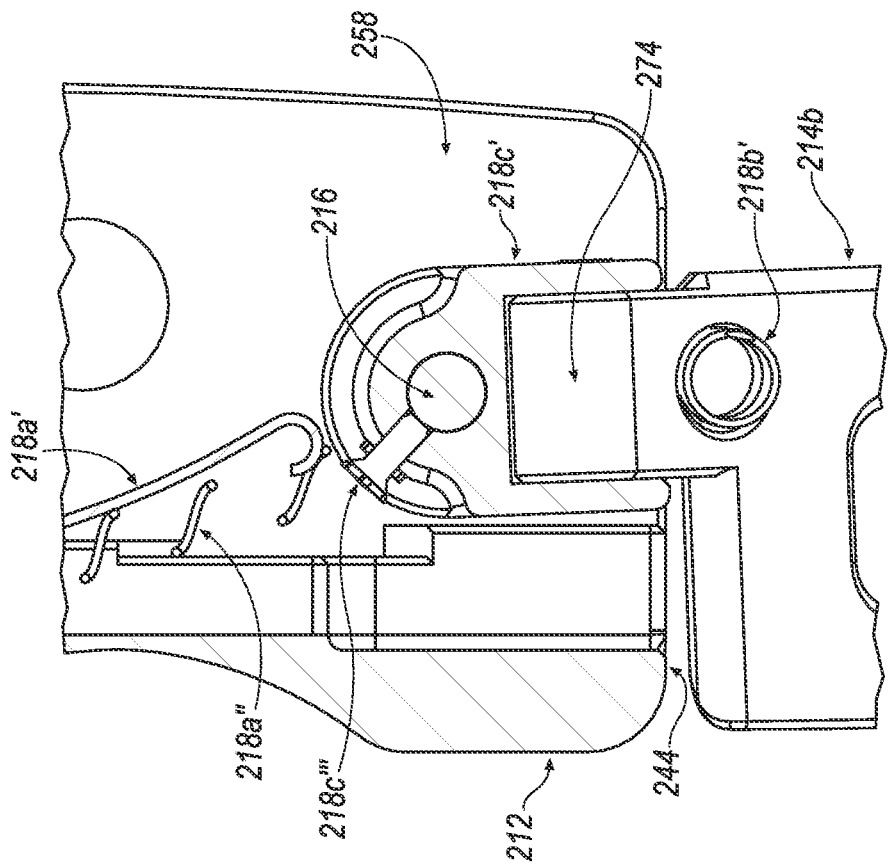
FIG. 23B is an enlarged view of the support apparatus according to line 23B of FIG. 22A.
Figure 30:
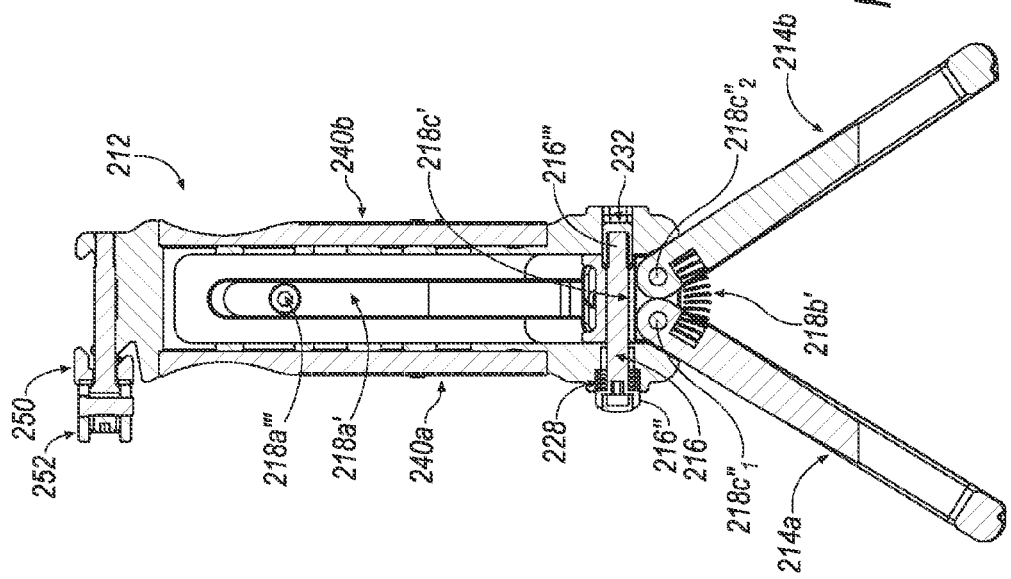
FIG. 30 is a cross-sectional view of the support apparatus according to line 30-30 of FIG. 29.
Figure 29:
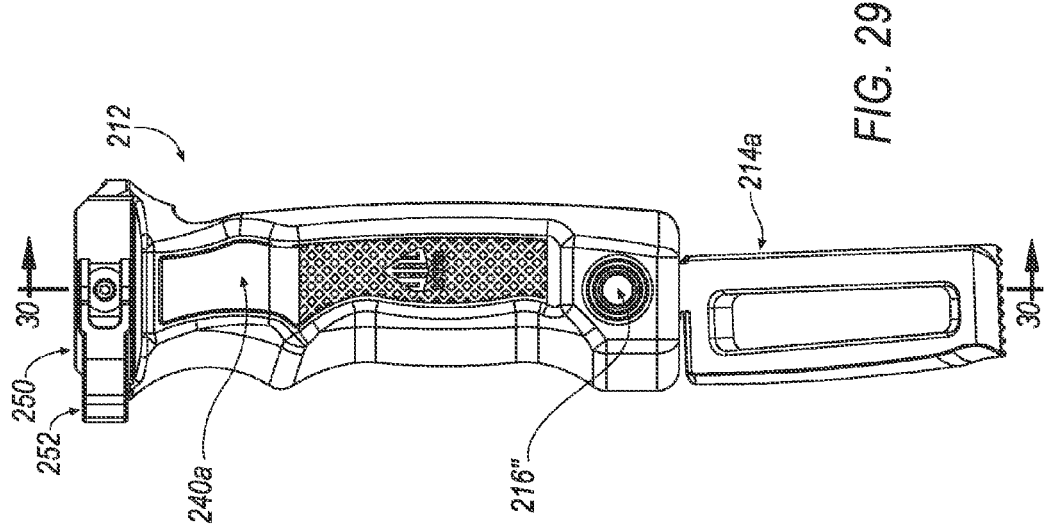
FIG. 29 is a side view of the support apparatus of FIG. 16C when arranged in the deployed orientation.

In some implementations, the subassembly 275 may be pivotably locked about the axis, A-A, in the deployed/"upside-down orientation" by means other than forming the U-shaped bracket 218c' to include a second key portion, K2, defined by the passage $218_{SF2-P}$ of the U-shaped bracket 218c'. For example, as seen in FIGS. 20A-20B, the lower end surface 244 of the base member 212 may be formed to include a pair of lateral recesses 272 that are in communication with the support-member-receiving channel 258. Accordingly, once: (1) the first and second support members 214a, 214b are pivoted with the subassembly 275 about the axis, A-A, and (2) the coil spring 218b' imparts the spring force, S3, to splay the first and second support members 214a, 214b, an upper flange portion 274 (see FIGS. 22A, 22B) of each of the first and second support members 214a, 214b may be respectively registered within each lateral recess 272 to thereby pivotably lock the subassembly 275 about the axis, A-A, in the deployed/"upside-down orientation."

In order to return the subassembly 275 to the stowed orientation, the user may operate the support apparatus 200 as follows (the following embodiment includes a design of the U-shaped bracket 218c' that only includes the first portion, K1, and not the second key portion, K2). If, for example, the upper flange portion 274 of each of the first and second support members 214a, 214b is respectively registered within each lateral recess 272, the user may grasp the first and second support members 214a, 214b in order to overcome the spring force, S3, thereby pressing the first and second support members 214a, 214b directly adjacent one another and de-registering the upper flange portion 274 of each of the first support member 214a and the second support member 214b from within the pair of lateral recess 272 to pivotably unlock the first support member 214a and the second support member 214b with respect to the base member 212. Then, the user may apply a pivoting force greater than the spring force, S2, in order to pivot the subassembly 275 about the axis, A-A, that is opposite the direction of the arrow, S2. Upon returning the subassembly 275 to the stowed orientation, the coil spring 228 may exert the force, $F_{226}'$, in the direction opposite the direction of the arrow of the user-applied force, $F_{226}$, in order to arrange the projection $232_K$ of the wedge member 232 within the first key portion, K1, of the passage $218c'_{SF2-P}$ of the U-shaped bracket 218c' to thereby lock the subassembly 275 in the stowed orientation relative to the base member 212.

Alternatively or in addition to the above, in some implementations, if the U-shaped bracket 218c' is designed to include both of the first and second key portions, K1, K2, the user may return the subassembly 275 to the stowed orientation by firstly applying the force, $F_{226}$, in order to selectively arrange the wedge member 232 beyond the passage $218c'_{SF2-P}$ of the U-shaped bracket 218c' such that the projection $232_K$ of the wedge member 232 is no longer arranged within the second key portion, K2, of the passage $218c'_{SF2-P}$ of the U-shaped bracket 218c'. Then, the user may grasp the first and second support members 214a, 214b in order to overcome the spring force, S3, thereby pressing the first and second support members 214a, 214b directly adjacent one another. Then, the user may apply a pivoting force greater than the spring force, S2, in order to pivot the subassembly 275 about the axis, A-A, that is opposite the direction of the arrow, S2. Upon returning the subassembly 275 to the stowed orientation, the coil spring 228 may exert the force, $F_{226}'$, in the direction opposite the direction of the arrow of the user-applied force, $F_{226}$, in order to arrange the projection $232_K$ of the wedge member 232 within the first key portion, K1, of the passage $218c'_{SF2-P}$ of the U-shaped bracket $218c'$ to thereby lock the subassembly 275 in the stowed orientation relative to the base member 212.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An apparatus, comprising:
a base member including an outer side surface, wherein the base member includes at least one support-member-receiving channel formed in the outer side surface;
at least one support member that is pivotably-coupled to the base member for selective arrangement relative the base member in one of a stowed orientation and a deployed orientation such that:
upon arrangement of the at least one support member in the stowed orientation, an outer surface of the at least one support member is aligned with the outer side surface of the base member, and
upon arrangement of the at least one support member in the deployed orientation,
the base member in combination with the at least one support member forms a pod, wherein the at least one support member includes a pair of support members such that the
base member in combination with the pair of support members forms a bi pod when the pair of support members are selectively arranged in the deployed orientation relative to the base member; and
a support member deployment-assist mechanism including:
a support member pivot urging mechanism,
a support member splay urging mechanism, and
a support member pivot mechanism.

2. The apparatus according to claim 1, wherein the at least one support-member-receiving channel extends along approximately 80%-to-90% of a length of the base member.

3. The apparatus according to claim 1, wherein the outer side surface of the base member forms at least one digit groove such that the base member forms a grip member.

4. The apparatus according to claim 1, wherein the pair of support members includes a first support member and a second support member, wherein the first support member is connected to a bracket of the support member pivot mechanism by a first support member splaying pin, wherein the second support member is connected to the support member pivot mechanism by a second support member splaying pin, wherein connection of the pair of support members to the support member deployment-assist mechanism by the first support member splaying pin and the second support member splaying pin forms a subassembly that is pivotably-coupled to the base member for selective arrangement relative the base member in one of a stowed orientation and a deployed orientation.

5. The apparatus according to claim 4, wherein the support member splay urging mechanism includes a coil spring arranged between the first support member and the second support member for pivotably biasing the first support member and the second support member relative to the support member pivot mechanism in a splayed orientation.

6. The apparatus according to claim 4, wherein the support member pivot urging mechanism includes a leaf spring connected to a coil spring by a fastener, wherein the fastener extends through a passage formed in the distal end of the leaf spring and a distal coil of the coil spring.

7. The apparatus according to claim 5, wherein the bracket includes a coil spring retention member, wherein a proximal coil of the coil spring of the support member pivot urging mechanism is attached to the coil spring retention member.

8. The apparatus according to claim 5, wherein the bracket includes a rear flange and a front flange, wherein an upper flange portion of each of the first and second support members is arranged between the rear flange, a front flange, wherein each of: the rear flange, the front flange and the first and second support members includes axially-aligned passages that permits insertion of the first support member splaying pin and the second support member splaying pin for connecting the first and second support members to the bracket.

9. The apparatus according to claim 5, wherein the bracket includes a first side flange forming a first side flange passage and a second side flange forming a second side flange passage, wherein the first side flange passage and the second side flange passage are axially aligned with first and second passages extending through the base member.

10. The apparatus according to claim 9, further comprising:
a support member locking mechanism including
a pivot pin having a body extending between a distal head portion and a proximal end, and
a coil spring arranged about the body of the pivot pin, wherein the proximal end of the pivot pin includes a wedge member having a projection that extends away from a body portion.

11. The apparatus according to claim 10, wherein the pivot pin extends through the first side flange passage and the second side flange passage of the bracket and the first and second passages of the base member for pivotably-coupling the subassembly to the base member.

12. The apparatus according to claim 11, wherein the coil spring of the support member locking mechanism is arranged between the distal head portion and an outer side surface of the base member in order to slidably-bias the wedge member within both of the second side flange passage of the bracket and the second passage extending through the base member.

13. A method for operating a pod, comprising the steps of:
providing a base member having an outer side surface, wherein a support-member-receiving channel is formed in the outer side surface of the base member;
pivotably-coupling at least one support member to the base member about a pivot axis with a pivot pin for selective arrangement of the at least one support member relative the base member in one of a locked-and-stowed orientation and a deployed orientation; and
utilizing a wedge member that is arranged upon a proximal end of the pivot pin for selectively-retaining the at least one support member to the base member in the locked-and-stowed orientation; and
slidably-biasing the pivot pin about the pivot axis with a biasing member that applies a slidably-biasing force for maintaining the wedge member in a first orientation that selectively-retains the at least one support member to the base member in the locked-and-stowed orientation.

14. The method according to claim 13, further comprising the step of:
applying a force to a distal end of the pivot pin for overcoming the slidably-biasing force for arranging the wedge member in a second orientation that permits the at least one support member to pivot about the pivot axis relative to the base member for arranging the at least one support member relative the base member in the deployed orientation.

15. The method according to claim 14, further comprising the step of:
providing a support member deployment-assist mechanism that is arranged within the support-member-receiving channel for assisting the at least one support member to move from the locked-and-stowed orientation to the deployed orientation after application of the force to the distal end of the pivot pin.

16. The method according to claim 15, wherein the support member deployment-assist mechanism includes:
a support member pivot urging mechanism for
imparting a first spring force that pushes the at least one support member away from the base member, and
imparting a second spring force that pivotably pulls the at least one support member in a pivoting motion about the pivot axis.

17. The method according to claim 16, wherein the support member deployment-assist mechanism includes:
a support member splay urging mechanism for
imparting a third spring force that splays a first support member and a second support member of the at least one support member.

18. The method according to claim 17, further comprising the steps of:
providing a pair of lateral recesses in a lower end surface of the base member; and
after imparting the third spring force, respectively registering an upper flange portion of each of the first support member and the second support member within a lateral recess of the pair of lateral recess to pivotably lock the first support member and the second support member with respect to the base member in the deployed orientation.

19. The method according to claim 18, further comprising the steps of:
returning the first support member and the second support member to the locked-and-stowed orientation by:
respectively de-registering the upper flange portion of each of the first support member and the second support member from within the pair of lateral recess by applying a force to both of the first support member and the second support member that is greater than the third spring force to pivotably unlock the first support member and the second support member with respect to the base member;
applying a pivoting force that is opposite to and greater than the second spring force that pivotably pushes the first support member and the second support member in a pivoting motion about the pivot axis; and
utilizing the slidably-biasing force of the biasing member for returning the wedge member from the second orientation to the first orientation that selectively-retains the first support member and the second support member to the base member in the locked-and-stowed orientation.

20. The method according to claim 17, further comprising the steps of including, with the support member deployment-assist mechanism, a support member pivot mechanism having a bracket joined to the at least one support member, wherein the pivot pin extends through the bracket for
permitting the bracket and the at least one support member to pivot about the pivot axis.

21. The method according to claim 20, further comprising the steps of:
providing the bracket with a passage, wherein wedge member and at least a portion of a length of the pivot pin is permitted to selectively slidably reciprocate within the passage in response to application of either of the force applied to the distal end of the pivot pin and the slidably-biasing force of the biasing member; and
forming the passage of the bracket to include at least:
a first key recess, and
a second key recess.

22. The method according to claim 21, further comprising the step of:
wherein, when the wedge member is maintained in the first orientation as a result of the slidably-biasing force of the biasing member imparted to the pivot pin,
registering a projection of the wedge member within the first key recess (for selectively-retaining the first support member and the second support member to the base member in the locked-and-stowed orientation.

23. The method according to claim 22, further comprising the step of:
wherein, when the wedge member is arranged in the second orientation after the first support member and the second support member have been pivoted about the pivot axis relative to the base member for arranging the first support member and the second support member relative the base member in the deployed orientation,
utilizing the slidably-biasing force of the biasing member imparted to the pivot pin for
registering the projection of the wedge member within the second key recess for selectively-retaining the first support member and the second support member to the base member in the deployed orientation.

24. The method according to claim 23, further comprising the steps of:
returning the first support member and the second support member to the locked-and-stowed orientation by:
re-applying the force to a distal end of the pivot pin for overcoming the slidably-biasing force of the biasing member imparted to the pivot pin for
de-registering the projection of the wedge member from within the second key recess to pivotably unlock the first support member and the second support member with respect to the base member;
applying a pivoting force that is opposite to and greater than the second spring force that pivotably pushes the first support member and the second support member in a pivoting motion about the pivot axis; and
utilizing the slidably-biasing force of the biasing member imparted to the pivot pin for
returning the wedge member from the second orientation to the first orientation for
re-registering the projection of the wedge member within the first key recess for selectively-retaining the first support member and the second support member to the base member in the locked-and-stowed orientation.

25. An apparatus, comprising:
a base member having an outer side surface, wherein a support-member-receiving channel is formed in the outer side surface of the base member;
at least one support member pivotably-coupled to the base member about a pivot axis with a pivot pin for selective arrangement of the at least one support member relative the base member in one of a locked-and-stowed orientation and a deployed orientation; and a wedge member arranged upon a proximal end of the pivot pin for selectively-retaining the at least one support member to the base member in the locked-and-stowed orientation; and wherein the pivot pin is slidably-biased about the pivot axis by a biasing member that applies a slidably-biasing force for maintaining the wedge member in a first orientation that selectively-retains the at least one support member to the base member in the locked-and-stowed orientation.

26. The apparatus according to claim 25, wherein a force is applied to a distal end of the pivot pin for overcoming the slidably-biasing force for arranging the wedge member in a second orientation that permits the at least one support member to pivot about the pivot axis relative to the base member for arranging the at least one support member relative the base member in the deployed orientation.

27. The apparatus according to claim 26, wherein a support member deployment-assist mechanism is arranged within the support-member-receiving channel for assisting the at least one support member to move from the locked-and-stowed orientation to the deployed orientation after application of the force to the distal end of the pivot pin.

28. The apparatus according to claim 27, wherein the support member deployment-assist mechanism includes:
a support member pivot urging mechanism for imparting a first spring force that pushes the at least one support member away from the base member and imparting a second spring force that pivotably pulls the at least one support member in a pivoting motion about the pivot axis.

29. The apparatus according to claim 28, wherein the support member deployment-assist mechanism includes:
a support member splay urging mechanism for imparting a third spring force that splays a first support member and a second support member of the at least one support member.

30. The apparatus according to claim 29, wherein a pair of lateral recesses are provided in a lower end surface of the base member, wherein, after imparting the third spring force, respectively registering an upper flange portion of each of the first support member and the second support member within a lateral recess of the pair of lateral recess to pivotably lock the first support member and the second support member with respect to the base member in the deployed orientation.

31. The apparatus according to claim 30, wherein the first support member and the second support member are returned to the locked-and-stowed orientation by: respectively de-registering the upper flange portion of each of the first support member and the second support member from within the pair of lateral recess by applying a force to both of the first support member and the second support member that is greater than the third spring force to pivotably unlock the first support member and the second support member with respect to the base member, wherein a pivoting force that is opposite to and greater than the second spring force is applied for pivotably pushing the first support member and the second support member in a pivoting motion about the pivot axis, wherein the slidably-biasing force of the biasing member is utilized for returning the wedge member from the second orientation to the first orientation that selectively-retains the first support member and the second support member to the base member in the locked-and-stowed orientation.

32. The apparatus according to claim 29, wherein the support member deployment-assist mechanism includes a support member pivot mechanism having a bracket joined to the at least one support member, wherein the pivot pin extends through the bracket for permitting the bracket and the at least one support member to pivot about the pivot axis.

33. The apparatus according to claim 32, wherein the bracket includes a passage, wherein wedge member and at least a portion of a length of the pivot pin is permitted to selectively slidably reciprocate within the passage in response to application of either of the force applied to the distal end of the pivot pin and the slidably-biasing force of the biasing member, wherein the passage of the bracket includes at least: a first key recess and a second key recess.

34. The apparatus according to claim 33, wherein, when the wedge member is maintained in the first orientation as a result of the slidably-biasing force of the biasing member imparted to the pivot pin, wherein a projection of the wedge member is registered within the first key recess for selectively-retaining the first support member and the second support member to the base member in the locked-and-stowed orientation.

35. The apparatus according to claim 34, wherein, when the wedge member is arranged in the second orientation after the first support member and the second support member have been pivoted about the pivot axis relative to the base member for arranging the first support member and the second support member relative the base member in the deployed orientation, the slidably-biasing force of the biasing member is imparted to the pivot pin for registering the projection of the wedge member within the second key recess for selectively-retaining the first support member and the second support member to the base member in the deployed orientation.

36. The apparatus according to claim 35, wherein the first support member and the second support member are returned to the locked-and-stowed orientation by: re-applying the force to a distal end of the pivot pin for overcoming the slidably-biasing force of the biasing member imparted to the pivot pin for de-registering the projection of the wedge member from within the second key recess to pivotably unlock the first support member and the second support member with respect to the base member, wherein a pivoting force that is opposite to and greater than the second spring force pivotably pushes the first support member and the second support member in a pivoting motion about the pivot axis, wherein the slidably-biasing force of the biasing member is imparted to the pivot pin for returning the wedge member from the second orientation to the first orientation for re-registering the projection of the wedge member within the first key recess for selectively-retaining the first support member and the second support member to the base member in the locked-and-stowed orientation.

* * * * *